US011976808B2

(12) United States Patent
Lambert et al.

(10) Patent No.: US 11,976,808 B2
(45) Date of Patent: May 7, 2024

(54) LUMINAIRE HEAD ASSEMBLY WITH BRACKET

(71) Applicant: Schreder S.A., Brussels (BE)

(72) Inventors: Jean-Luc Lambert, Liege (BE); Sandro Galloppa, Seraing (BE)

(73) Assignee: Schreder S.A., Brussels (BE)

( * ) Notice: Subject to any disclaimer, the term of this patent is extended or adjusted under 35 U.S.C. 154(b) by 10 days.

(21) Appl. No.: 17/623,470

(22) PCT Filed: Jul. 3, 2020

(86) PCT No.: PCT/EP2020/068889
§ 371 (c)(1),
(2) Date: Dec. 28, 2021

(87) PCT Pub. No.: WO2021/001556
PCT Pub. Date: Jan. 7, 2021

(65) Prior Publication Data

US 2022/0357024 A1 Nov. 10, 2022

(30) Foreign Application Priority Data

Jul. 3, 2019 (NL) ...................................... 2023432
Jul. 3, 2019 (NL) ...................................... 2023433

(51) Int. Cl.
*F21V 21/108* (2006.01)
*F21V 17/10* (2006.01)
(Continued)

(52) U.S. Cl.
CPC .......... *F21V 21/108* (2013.01); *F21V 17/107* (2013.01); *F21V 21/116* (2013.01);
(Continued)

(58) Field of Classification Search
CPC ...... F21S 9/037; F21V 21/108; F21V 17/107; F21V 21/116; F21V 23/002; F21V 23/06; F21Y 2105/16
(Continued)

(56) References Cited

U.S. PATENT DOCUMENTS

2010/0080004 A1 4/2010 Zhang
2010/0254134 A1* 10/2010 McCanless ............. F21S 8/088
362/249.02

(Continued)

FOREIGN PATENT DOCUMENTS

CN 108730866 A 11/2018
CN 208687553 U 4/2019
EP 2706285 A1 3/2014

OTHER PUBLICATIONS

PCT International Search Report and Written Opinion, Application No. PCT/EP2020/068889, dated Oct. 7, 2020, 11 pages.

*Primary Examiner* — Laura K Tso
(74) *Attorney, Agent, or Firm* — McDonnell Boehnen Hulbert & Berghoff LLP

(57) ABSTRACT

Example embodiments relate to luminaire head assemblies with brackets. One example luminaire head assembly includes a housing provided with a socket assembly. The luminaire head assembly also includes a light source arranged in the housing. Additionally, the luminaire head assembly includes a bracket releasably attached to the housing. The bracket is configured to fix the housing to a pole. The bracket has a first end for connection to a pole or pole connector and a second end attached to the housing. The bracket is provided with a through-hole at the second end. The socket assembly extends at least partially in the through-hole.

20 Claims, 30 Drawing Sheets

(51) Int. Cl.

| | |
|---|---|
| ***F21V 21/116*** | (2006.01) |
| ***F21V 23/00*** | (2015.01) |
| ***F21V 23/06*** | (2006.01) |
| ***F21Y 105/16*** | (2016.01) |

(52) U.S. Cl.
CPC ............ *F21V 23/002* (2013.01); *F21V 23/06* (2013.01); *F21Y 2105/16* (2016.08)

(58) Field of Classification Search
USPC .................................................. 362/370, 368
See application file for complete search history.

(56) References Cited

U.S. PATENT DOCUMENTS

| | | | | |
|---|---|---|---|---|
| 2017/0016601 | A1* | 1/2017 | Pouladian | F21S 8/033 |
| 2017/0311424 | A1* | 10/2017 | Vendetti | H05B 39/041 |
| 2019/0017667 | A1 | 1/2019 | Mitchell et al. | |
| 2021/0160994 | A1* | 5/2021 | Vendetti | F21V 23/045 |

* cited by examiner

LUMINAIRE HEAD ASSEMBLY WITH BRACKET

CROSS-REFERENCE TO RELATED APPLICATIONS

The present application is a national stage entry of PCT/NL2020/068889 filed Jul. 3, 2020, which claims priority to NL 2023432 filed Jul. 3, 2019 and to NL 2023433 filed Jul. 3, 2019, the contents of each of which are hereby incorporated by reference.

FIELD OF INVENTION

The present invention relates to luminaire head assemblies, in particular to luminaire head assemblies for outdoor luminaires, and to methods for assembling luminaire heads.

BACKGROUND

Luminaires, in particular outdoor or industrial luminaires, comprise a luminaire housing in which a support with at least one light source is arranged. Typically, the at least one light source comprises a plurality of light-emitting diodes (LEDs). For example, a luminaire may comprise a luminaire pole and a luminaire head formed by the luminaire housing. In other luminaires, the luminaire head may be connected to a wall or suspended to a cable. A drive means for the at least one light source, typically in the form of a LED driver, may be arranged in or on the luminaire head, in or on the luminaire pole, or in any other suitable location of the luminaire system. Further, outdoor or industrial luminaires may typically use control modules containing different control blocks and/or sensors, e.g. a light sensor for sensing the light level of ambient light to automatically control the light sources.

Luminaires, in particular outdoor luminaires are often designed for a particular purpose and/or for a specific customer, and many different luminaires have to be kept in stock for different applications. For example, a luminaire head can be fixed to a pole end following two main configurations. The first configuration corresponds to a pole end oriented in a substantially horizontal direction, referred to as side-entry configuration in the following. The second configuration corresponds to a pole end oriented in a substantially vertical direction, referred to as post-top configuration in the following. A problem with some outdoor luminaires is that luminaire heads are designed either to be fixed according to the post-top configuration, or according to the side-entry configuration, thereby also increasing the manufacturing costs. Indeed, currently several components of a luminaire head are not adapted for being used in both side-entry and post-top configurations, and said components are not meant to serve a large range of different products. Hence, a large number of components are needed to address the needs of different customers, with a lot of different components requiring different molds.

Also, often luminaire are designed with a particular design which is fixed, or which can only be changed to a limited extent. More generally, the modularity of a luminaire is limited.

Some prior art luminaires allow to change the orientation of the luminaire head with respect to the pole but offer only a limited range of illumination products. Moreover, when a different esthetical effect is desirable, a completely new housing has to be created each time. Further, most luminaires cannot be easily upgraded, e.g. with a new LED PCB, a new driver, etc. and cannot be easily adapted based on the desired application. E.g. if the number of LEDs has to be increased in order to have a higher light output and/or a different light distribution depending on the application (e.g. pedestrian area vs road, highway, crossroad), often the housing of the luminaire has to be changed.

SUMMARY

The object of embodiments of the invention is to provide luminaire head assemblies which can be modular, and to provide methods for assembling luminaire heads in a modular manner. The object of more particular embodiments is to provide luminaire head assemblies having various light effects and/or distributions, optionally with a similar global look, and such that a customer can use a single product family for different environments (e.g. road, parks, pedestrian path, highway, etc.).

According to a first aspect of the invention, there is provided a method for assembling luminaire heads. The method comprises providing a plurality of upper covers, a plurality of identical bodies provided with a through-hole, a plurality of identical supports, each support being configured to be releasably attached to a body of the plurality of bodies, providing at least one skirt, preferably a plurality of skirts, and providing at least one, preferably a plurality of light-transmitting protection and connection assemblies. For each luminaire head to be assembled, the following steps are performed: selecting a support of the plurality of supports and mounting an electronic assembly on an upper portion of the support and a light source on a lower portion of the support in order to form a photometric unit, attaching the support to a body of the plurality of bodies, such that the photometric unit at least partially extends in the through-hole of said body, arranging an upper cover of the plurality of upper covers onto the body, such that the photometric unit is arranged at least partially between the body and the upper cover. Further, the method comprises the steps of selecting a skirt of the at least one skirt, preferably the plurality of skirts and attaching the selected skirt to the body such that it surrounds at least partially the body, and/or the steps of selecting a protection and connection assembly of the at least one skirt, preferably the plurality of protection and connection assemblies and attaching said selected protection and connection assembly to the body.

In accordance with said first aspect, the body and the support can be the same for a large range of different products. The products can be readily adjusted according to the desire of the customer by selecting a skirt and/or a protection and connection assembly and by selecting the components (light source, electronic assembly) on the support. It should be noted that according to this first aspect, the skirts may be the same or may be different. It is further noted that the body and/or the support may be molded parts, and that since these parts are the same, the manufacturing costs can be significantly reduced.

Preferred embodiments relate to a method for assembling luminaire heads of outdoor or industrial luminaires. By outdoor luminaires, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas and access roads to private building infrastructures, etc. Such outdoor luminaires may be provided with a side-entry configuration or with a post-top configuration. As will be further set out below, embodiments of the invention allow to assemble both side-entry and post-top luminaires. Industrial luminaires can be used e.g. in warehouses, industry halls, etc.

According to a preferred embodiment, the attaching of the support to the body is performed in a tool-less manner, preferably by means of any one or more of the following elements: clamps, clips, quarter-turn screws.

According to a preferred embodiment, the arranging of the upper cover onto the body comprises providing a hinge between the upper cover and the body, and releasably attaching the body to the upper cover, preferably by means of any one or more of the following elements: screws, locks, clamps, clips, latches, pins, bolts, studs.

In this manner, the body can be swung downward in a side-entry configuration where the pole is connected to the upper cover, or the upper cover can be swung upward in a post-top configuration where a pole is connected to a lower end of the protection and connection assembly. In this way, easy removal of the electronic assembly is provided without having to remove the body or the upper cover.

According to a preferred embodiment, the attaching of the selected skirt to the body is performed in a releasable manner, preferably by means of any one or more of the following elements: screws, locks, clamps, clips, pins, bolts, studs. Alternatively or additionally, the attaching of the selected protection and connection assembly to the body is performed in a releasable manner, preferably by means of any one or more of the following elements: screws, locks, clamps, clips, pins, bolts, studs.

In this manner, a skirt and/or a protection and connection assembly can be easily changed e.g. as a function of the wishes of a customer.

Optionally, when both a skirt and a protection and connection assembly are provided in the same luminaire head, the attaching of the selected skirt to the body and the attaching of the selected protection and connection assembly to the body may be performed using the same fastening elements. In other embodiments, the attaching of skirt and the protection and connection assembly may be done using different fastening means.

For a post-top configuration, the protection and connection assembly may comprise a light-transmitting protective casing and a connection part configured for connecting a lower end of the protective casing to a pole.

Optionally, for a side-entry configuration, in addition to a skirt, a light-transmitting protective casing may be attached to the body without having a connection part at the lower end. In such an embodiment, the light-transmitting protective casing may have a closed bottom and may be e.g. dome shaped or flute shaped. Alternatively or in addition, a flat lower cover may be attached to the body to close the body at a lower end thereof.

Features such as the use of a color filter, the use of a diffusor body, the use of a flux exhauster, the combined use of a lower cover and a protective casing, the use of a bracket, the use of a protection and connection assembly, the skirt, etc., which are described below may also be used in embodiments according to the first aspect.

According to a second aspect of the invention, there is provided a set of at least a first luminaire head and a second luminaire head. The first luminaire head comprises a first body provided with a through-hole between an upper side and a lower side, a first upper cover covering the upper side of the first body, a first photometric unit with a first support which is releasably attached to said first body, said first photometric unit at least partially extending in said through-hole and comprising a first electronic assembly at an upper portion thereof and a first light source at a lower portion thereof, and a skirt releasably attached to said first body and at least partially surrounding said first body. The second luminaire head comprises a second body identical to the first body, a second upper cover covering the upper side of the second body, a second photometric unit with a second support identical to the first support which is releasably attached to said second body, said second photometric unit at least partially extending in the through-hole of the second body and comprising a second electronic assembly at an upper portion thereof and a second light source at a lower portion thereof, and a protection and connection assembly releasably attached to the second body, preferably to the lower side of the second body, said protection and connection assembly comprising a light-transmitting protective casing and a connection part configured for connecting a lower end of the protective casing to a pole.

In other words, the first and the second body and support may be the same in a first luminaire head with a skirt, and in a second luminaire head with a protection and connection assembly. It is noted that the first luminaire head with the skirt may optionally also comprise a protection and connection assembly, and that the second luminaire head with the protection and connection assembly may optionally also comprise a skirt.

The light-transmitting protective casing may be a diffusor casing configured to diffuse the light of the light source. According to a preferred embodiment, the protective casing is releasably attached to the body, said protective casing comprising a transparent or translucent portion.

The photometric unit may comprise a support on which the electronic assembly and the light source are fixed, as explained above. In that case the lower portion of the photometric unit corresponds with a lower portion of the support, and the upper portion of the photometric unit corresponds with an upper portion of the support.

According to an exemplary embodiment, a skirt comprises a peripheral portion and a flange portion intended to be in contact with a lower side of the body. The skirt may be attached at the peripheral portion thereof and/or at the flange portion. When a protection and connection assembly is present, the flange portion may be arranged between the body and the protective casing of the protection and connection assembly. Optionally, a seal may extend between the body and the protective casing, and the flange portion surrounds the seal. In other words, the skirt is arranged outside of the sealed compartment formed by the protection and connection assembly and the body. The skirt may also comprise only a peripheral portion, and optionally this peripheral portion may also surround the protection and connection assembly.

It is noted that the protection and connection assembly may also be releasably attached to a peripheral side of the body.

Optionally, for a side-entry configuration, in addition to a skirt, the first luminaire head may comprise a light-transmitting protective casing attached to the first body without having a connection part at the lower end. In such first luminaire head, the light-transmitting protective casing may have a closed bottom and may be e.g. dome shaped or flute shaped. More generally, the protective casing may have any suitable shape. Alternatively or in addition, a flat lower cover may be attached to the first body to close the first body at a lower end thereof.

Features such as the use of a color filter, the use of a diffusor body, the use of a flux exhauster, the combined use of a lower cover and a protective casing, the use of a bracket, the use of a protection and connection assembly, the skirt, etc., which are described below may also be used in embodiments according to the second aspect.

According to a third aspect of the invention, there is provided a method for assembling luminaire heads. The method comprises providing a plurality of upper covers, a plurality of identical bodies provided with a through-hole, and a plurality of identical supports, each support being configured to be releasably attached to a body of the plurality of bodies. For each luminaire head to be assembled, the following steps are performed: selecting a support of the plurality of supports and mounting an electronic assembly on an upper portion of the support and a light source on a lower portion of the support in order to form a photometric unit, attaching the support to a body of the plurality of bodies, such that the photometric unit at least partially extends in the through-hole of said body, arranging an upper cover of the plurality of upper covers onto the body, such that the photometric unit is arranged at least partially between the body and the upper cover. Further, the method comprises either the step of connecting a bracket to the upper cover, or the step of connecting a light-transmitting protection and connection assembly to said body.

In accordance with said third aspect, the body and the support can be the same for a large range of different products. The products can be readily adjusted for a side-entry configuration or for a post-top configuration of the luminaire head according to the desire of the customer by respectively selecting a bracket or a protection and connection assembly. By having on the one hand an upper cover which allows for the connection of a bracket and on the other hand a body which allows for the connection of a protection and connection assembly, luminaire heads can be readily customized using a limited number of different components.

It is noted that different types of brackets may be connected to the upper cover. For example, either a straight bracket or a curved bracket may be chosen. The bracket may be connected to a central portion of the upper cover. The bracket may be shaped for extending mainly laterally from such central portion of the upper cover, or may be shaped to extend first upwardly and then laterally. Further, when a bracket is used, a lower cover and/or protective casing from among different types of lower covers or protective casings may be selected. Preferably, such lower cover and/or protective casing is connected in a sealed manner with the body. The lower cover or protective casing may be implemented according to any one of the embodiments described in the application.

According to a preferred embodiment, the attaching of the support to the body is performed in a tool-less manner, preferably by means of any one or more of the following elements: clamps, clips, quarter-turn screws.

According to a preferred embodiment, the arranging of the upper cover onto the body comprises providing a hinge between the upper cover and the body, and releasably attaching the body to the upper cover, preferably by means of any one or more of the following elements: screws, locks, clamps, clips, latches, pins, bolts, studs.

In this manner, the body can be swung downward in the side-entry configuration, or the upper cover can be swung upward in the post-top configuration. In this way, easy removal of the electronic assembly is provided without having to remove the body or the upper cover.

According to a preferred embodiment, the connecting of the bracket to the upper cover comprises connecting an end of the bracket to a central portion of the upper cover. Alternatively, the protection and connection assembly comprises a light-transmitting protective casing and a connection part configured for connecting a lower end of the protective casing to a pole, and the connecting of the protection and connection assembly to the body comprises supporting an upper edge of the protective casing on the body, preferably on a lower side or peripheral side of the body.

In this way, in the side-entry configuration connection wires from the pole to the luminaire head assembly enter in a central area of the luminaire head assembly via the bracket and the upper cover for being connected to e.g. the photometric unit, thereby providing easier access to an operator.

Alternatively, in the post-top configuration connection wires from the pole to the luminaire head assembly enter a lower end of the protective casing via the connection part, extend along a length of the protective casing, preferably along a peripheral area of the protective casing, and may pass through the lower side of the body for being connected to e.g. the photometric unit. To that end the body may be provided with one or more small through-holes for one or more cables.

Optionally, for a side-entry configuration, in addition to the bracket, a light-transmitting protective casing may be attached to the body without having a connection part at the lower end. In such an embodiment, the light-transmitting protective casing may have a closed bottom and may be e.g. dome shaped or flute shaped. Alternatively or in addition, a flat lower cover may be attached to the body to close the body at a lower end thereof.

Features such as the use of a color filter, the use of a diffusor body, the use of a flux exhauster, the combined use of a lower cover and a protective casing, the use of a bracket, the use of a protection and connection assembly, the skirt, etc., which are described below may also be used in embodiments according to the third aspect.

According to a fourth aspect of the invention, there is provided a set of at least a first luminaire head and a second luminaire head. The first luminaire head comprises a first body provided with a through-hole between an upper side and a lower side, a first upper cover covering the upper side of the first body, a first photometric unit with a first support which is releasably attached to said first body, said first photometric unit at least partially extending in said through-hole and comprising a first electronic assembly at an upper portion thereof and a first light source at a lower portion thereof, and a bracket releasably attached to said first upper cover. The second luminaire head comprises a second body identical to the first body, a second upper cover covering the upper side of the second body, a second photometric unit with a second support identical to the first support which is releasably attached to said second body, said second photometric unit at least partially extending in the through-hole of the second body and comprising a second electronic assembly at an upper portion thereof and a second light source at a lower portion thereof, and a light-transmitting protection and connection assembly releasably attached to the second body, preferably to the lower side of the second body, said protection and connection assembly comprising a protective casing and a connection part configured for connecting a lower end of the protective casing to a pole.

In other words, the first and the second body and support may be the same in a first luminaire head with a bracket, and in a second luminaire head with a protection and connection assembly.

Optionally, for a side-entry configuration, in addition to the bracket, the first luminaire head may comprise a light-transmitting protective casing attached to the first body without having a connection part at the lower end. In such first luminaire head, the light-transmitting protective casing may have a closed bottom and may be e.g. dome shaped or flute shaped. Alternatively or in addition, a flat lower cover may be attached to the first body to close the first body at a lower end thereof.

Features such as the use of a color filter, the use of a diffusor body, the use of a flux exhauster, the combined use of a lower cover and a protective casing, the use of a bracket, the use of a protection and connection assembly, the skirt, etc., which are described below may also be used in embodiments according to the fourth aspect.

According to a fifth aspect of the invention, there is provided a luminaire head assembly comprising a body provided with a through-hole between an upper side and a lower side, an upper cover to cover said upper side, a hinge between said upper cover and said body, an attachment means configured for releasably attaching said body to said upper cover, a photometric unit releasably attached to said body, preferably in a tool-less manner, and at least partially extending in said through-hole, said photometric unit comprising an electronic assembly at an upper portion thereof and a light source at a lower portion thereof, a skirt releasably attached to said body, supported by a first peripheral area of said body, and at least partially surrounding said body. The luminaire head assembly further comprises a lower cover supported on the lower side of the body, within the first peripheral area, and surrounding said through-hole at the lower side of the body, and/or a protection and connection assembly comprising a light-transmitting protective casing and a connection part configured for connecting a lower end of the protective casing to a pole. When a protection and connection assembly is present, an upper edge of the protective casing is supported on the lower side of the body, within the first peripheral area, and surrounding said through-hole at the lower side of the body.

In accordance with said fifth aspect, the luminaire head assembly can be connected to a pole via the upper cover (side-entry configuration, or post-top configuration via a special bracket) or via the body (by using the protection and connection assembly). When the luminaire head is connected via a bracket connected to the upper cover, the photometric unit can be easily removed by releasing the attachment means and by pivoting the body downwardly. When the luminaire head is connected to a pole via the protection and connection assembly, the photometric unit can be easily removed by releasing the attachment means and by pivoting the top cover upwardly. The skirt can be selected as a function of the desired design. The lower cover and/or protection and connection assembly can be selected as a function of the application (post-top or side-entry) and/or in function of the desired design. Such a configuration allows the use of the same body for post-top and side-entry configurations, whilst allowing easy access to the photometric unit for both configurations.

Further, by providing a luminaire head assembly comprising a photometric unit releasably attached to said lower side of the body, preferably in a tool-less manner, the light source and the electronic assembly can be more easily detached from the remaining components of the luminaire head assembly for maintenance and replacement. By providing said photometric unit at least partially arranged in said through-hole, a more compact luminaire head assembly is obtained, thereby saving space inside the luminaire head assembly, more in particular inside a housing of the luminaire head assembly.

According to a preferred embodiment, the photometric unit comprises a support releasably attached to the body, preferably to the lower side of the body in a tool-less manner and at least partially arranged in the through-hole, said support having an upper portion facing the upper cover and a lower portion opposite said upper portion. The electronic assembly is arranged at the upper portion and the light source is arranged at the lower portion. Optionally a flux exhauster may be fixed to a lower portion of the support, around the light source. In addition or alternatively, the support may be painted or coated to fulfill the function of flux exhauster itself. A flux exhauster in the context of the present invention is typically plate-like and has a surface with good reflective properties. This optional feature may be present in embodiments according to any one of the above disclosed aspects.

In this way, the body and the support can be the same for a large range of different products. The products can be readily adjusted for the post-top or for the side-entry configuration of the luminaire head assembly according to the desire of the customer by selecting the components (light source, electronic assembly) on the support.

Optionally, for a side-entry configuration, the lower cover may comprise a light-transmitting protective curved portion or casing with a closed bottom, e.g. a dome shaped or flute shaped lower cover. Alternatively or in addition, the lower cover may comprise a flat plate-like light-transmitting element. It is noted that the lower cover may be combined with a protective casing.

Features such as the use of a color filter, the use of a diffusor body, the use of a flux exhauster, the combined use of a lower cover and a protective casing, the use of a bracket, the use of a protection and connection assembly, the skirt, etc., which are described below may also be used in embodiments according to the fifth aspect.

According to a sixth aspect of the invention, there is provided a method for assembling luminaire heads. The method comprises providing a plurality of upper covers, a plurality of identical bodies provided with a through-hole, a plurality of identical supports, each support being configured to be releasably attached to a body of the plurality of bodies, and providing a plurality of different skirts. For each luminaire head to be assembled, the following steps are performed: selecting a support of the plurality of supports and mounting an electronic assembly on an upper portion of the support and a light source on a lower portion of the support in order to form a photometric unit, attaching the support to a body of the plurality of bodies, such that the photometric unit at least partially extends in the through-hole of said body, arranging an upper cover of the plurality of upper covers onto the body, such that the photometric unit is arranged at least partially between the body and the upper cover, and selecting a skirt of the plurality of different skirts and attaching the selected skirt to the body such that it surrounds at least partially the body.

In accordance with said sixth aspect, the body and the support can be the same for a large range of different products. The products can be readily adjusted according to the desire of the customer by modifying the skirt and/or the components (light source, electronic assembly) on the support.

According to a preferred embodiment, the attaching of the support to the body is performed in a tool-less manner, preferably by means of any one or more of the following elements: clamps, clips, quarter-turn screws.

According to a preferred embodiment, the arranging of the upper cover onto the body comprises providing a hinge between the upper cover and the body, and releasably attaching the body to the upper cover, preferably by means of any one or more of the following elements: screws, locks, clamps, clips, latches, pins, bolts, studs.

In this manner, the body can be swung downward in the side-entry configuration, or the upper cover can be swung upward in the post-top configuration. In this way, easy removal of the electronic assembly is provided without having to remove the body or the upper cover.

According to a preferred embodiment, the attaching of the selected skirt to the body is performed in a releasable manner, preferably by means of any one or more of the following elements: screws, locks, clamps, clips, pins, bolts, studs. The attachment can be done either at a peripheral side of the skirt or at flange part (if present) of the skirt, as explained above.

In this manner, a skirt can be easily changed e.g. as a function of the wishes of a customer.

Features such as the use of a color filter, the use of a diffusor body, the use of a flux exhauster, the combined use of a lower cover and a protective casing, the use of a bracket, the use of a protection and connection assembly, the skirt, etc., which are described below may also be used in embodiments according to the sixth aspect.

According to a seventh aspect of the invention, there is provided a set of at least a first and a second luminaire head. The first luminaire head comprises a first body provided with a through-hole between an upper side and a lower side, a first upper cover covering the upper side of the first body, a first photometric unit with a first support which is releasably attached to said first body, said first photometric unit at least partially extending in said through-hole and comprising a first electronic assembly at an upper portion thereof and a first light source at a lower portion thereof, and a first skirt releasably attached to said first body and at least partially surrounding said first body. The second luminaire head comprises a second body identical to the first body, a second upper cover covering the upper side of the second body, a second photometric unit with a second support identical to the first support which is releasably attached to said second body, said second photometric unit at least partially extending in the through-hole of the second body and comprising a second electronic assembly at an upper portion thereof and a second light source at a lower portion thereof, and a second skirt releasably attached to said second body and at least partially surrounding said second body, said second skirt being different from said first skirt.

In other words, the first and the second body and support may be the same in a first luminaire head with a first skirt, and in a second luminaire head with a second skirt different from the first skirt.

Features such as the use of a color filter, the use of a diffusor body, the use of a flux exhauster, the combined use of a lower cover and a protective casing, the use of a bracket, the use of a protection and connection assembly, the skirt, etc., which are described below may also be used in embodiments according to the seventh aspect.

The features of the embodiments discussed below are applicable to all aspects discussed above.

According to a preferred embodiment, the support comprises a heat sink. A heat sink enables dissipation of heat generated by the electronic assembly and the light source towards the outside of the luminaire head assembly.

According to an exemplary embodiment, the support is made of a heat conductive material and is shaped to form a heat sink. In this way, the support itself is a heat sink, thereby saving space inside the luminaire head assembly. Preferably, the electronic assembly is arranged at an upper portion of the support and the light source is arranged at a lower portion of the support opposite said upper portion.

Optionally a flux exhauster may be fixed to a lower portion of the support, around the light source. In addition or alternatively, the support may be painted or coated to fulfill the function of flux exhauster itself.

Optionally, a gear plate may be connected to the upper portion of the support and the electronic assembly or a portion thereof may be arranged on the gear plate. In other preferred embodiments, the support itself may function as a gear plate.

According to an exemplary embodiment, the support comprises a carrier provided with a through-hole, and a heat sink releasably attached to the carrier, preferably in a tool-less manner, and arranged at said through-hole. Preferably, the electronic assembly is arranged at an upper portion of the heat sink and the light source is arranged at a lower portion of the heat sink opposite said upper portion. Preferably, the heat sink is releasably attached to the carrier in a tool-less manner. Optionally, the carrier might further play the role of flux exhauster.

In this way, the heat sink, the electronic assembly, and the light source may be detached from the carrier at once, without removing the electronic assembly and the light source from the heat sink.

According to a preferred embodiment, the heat sink is partially in contact with the body. This improves and accelerates the dissipation of heat generated by the electronic assembly and the light source towards the outside of the luminaire head assembly.

According to an exemplary embodiment, the photometric unit comprises a gear plate mounted on the heat sink, and the electronic assembly is mounted on said gear plate. In other embodiments, the heat sink may function as gear plate.

In this manner, all electronic components of the electronic assembly are mounted on a single plate, and said plate may be removed from the heat sink, thereby facilitating the maintenance.

According to a preferred embodiment, the electronic assembly comprises any one or more of the following: a light source driving means, a light source dimming means, surge protection circuitry, electrostatic discharge protection circuitry, connecting means, a fuse, and more generally any driving or control circuitry for any one of the components of the luminaire head.

Surge protection circuitry is provided to absorb energy and protect the light source driving means, typically including a light-emitting diode (LED) driver circuit, and optionally the light source dimming means. The role of an electrostatic discharge (ESD) protection circuitry is to reduce the risk of accumulating electrostatic charge to a critical level so as to avoid that ESD happen through an insulation layer and damage semiconductor components such as LEDs.

According to an exemplary embodiment, the light source comprises a plurality of LEDs, preferably arranged on a LED support, such as a PCB. The LEDs may be arranged in an array of multiple columns and rows. According to a preferred embodiment, one or more optical elements are associated with the light source. The one or more optical elements may comprise a plurality of lens elements associated with the plurality of LEDs, e.g. grouped in a lens plate. However, also other types of optical elements may be additionally or alternatively present, such as reflectors, backlights, prisms, collimators, diffusors, and the like. In the context of the invention, a lens element may include any transmissive optical element that focuses or disperses light by means of refraction. It may also include any one of the following: a reflective portion, a backlight portion, a prismatic portion, a collimator portion, a diffusor portion. For example, a lens element may have a lens portion with a concave or convex surface facing a LED, or more generally a lens portion with a flat or curved surface facing the LED, and optionally a collimator portion integrally formed with said lens portion, said collimator portion being configured for collimating light transmitted through said lens portion. Also, a lens element may be provided with a reflective portion or surface or with a diffusive portion.

According to an exemplary embodiment, the light source may comprise a plurality of first light elements such as LEDs and one or more associated first optical elements configured to output a first light beam having a first color temperature according to a first intensity distribution within a first solid angle, and a plurality of second light elements such as LEDs and one or more associated second optical elements configured to output a second light beam having a second color temperature according to a second intensity distribution within a second solid angle. The second intensity distribution may be different from the first intensity distribution. Also, the second color temperature may be different from the first color temperature. Exemplary embodiments of such light sources are disclosed in Dutch patent application with application number NL2024571 in the name of the applicant which in included herein by reference.

According to an exemplary embodiment, the light source may comprise RGB and/or RGBW and/or RGBA LEDs and associated control circuitry for controlling the color emitted by the light source.

According to a preferred embodiment, the luminaire head assembly further comprises a seal arranged between the upper cover and the upper side of the body.

According to a preferred embodiment, the luminaire head assembly further comprises a seal arranged around the through-hole of the body between the lower cover and the body.

According to an exemplary embodiment, the lower cover comprises a transparent or translucent portion and an annular portion releasably attached to the body, preferably to the lower side of the body. Said transparent or translucent portion is arranged between the light source and said annular portion. The transparent or translucent portion may be a flat plate-like portion or a curved portion, e.g. a dome-shaped or flute-shaped portion.

In this way, the upper cover, the body, and the lower cover may form a housing in which the electronic assembly and the light source are arranged.

According to an exemplary embodiment, the luminaire head assembly further comprises a color filter arranged between the light source and the lower cover. For example the color filter may be a sheet arranged above a transparent or translucent portion of the lower cover. The color filter is configured to absorb a portion of the light emitted by the light source in specific wavelength ranges so as to change the color of the light emitted by the luminaire head assembly. Preferably, the color filter is accessible by opening the upper cover and removing the photometric unit. In that way the color filter can be easily changed. e.g. when it is desirable to change the color of the emitted light for a special occasion or festivity. The features described in this paragraph may be implemented in any one of the aspects mentioned above and below.

According to another exemplary embodiment, the luminaire head assembly further comprises a seal arranged between the protective casing and the body.

According to a preferred embodiment, the lower side of the body is configured to receive at least one of a connection means such as a socket, a communication means such as an antenna or an emitter, a sensor.

The sensor may be a light sensor configured for sensing a signal relating to ambient light levels. The antenna may then be configured for treating signals received from the light sensor and for communicating those treated signals. Apart from a light sensor, various other sensors may be present, such as an image sensor (e.g. a camera), an audio sensor, an air quality sensor, a motion sensor, an environmental sensor sensing e.g. temperature, visibility, vibration, humidity, etc. The antenna may then be further configured to use and/or transmit the data sensed by one or more of those additional sensors. The socket may establish a connection with the electronic assembly using one or more wired or wireless communication protocols.

Also, it is noted that it is possible to provide one or more functionalities in the socket itself, such as a sensor, communication circuitry, control circuitry, protection circuitry (e.g. an SPD or a fuse), an actuator, display unit, an antenna unit, a speaker unit, an air cleaning unit such as a UV light source, etc.

Further a module placed in the socket may comprise any one or more of the following: a sensor (e.g. a light sensor, a motion sensor, a passive infrared sensor, a sound sensor, a pollution sensor such as a $CO_2$, NOx and SOx sensor, a smoke sensor, a biological threat sensor, a thermal sensor, an image capturing sensor such as a camera, a humidity sensor, a visibility sensor, a temperature sensor, a radar sensor, a voice recorder, etc.), communication circuitry, control circuitry, protection circuitry (e.g. an SPD or a fuse), an actuator, etc. More generally the module may comprise any component that needs to be powered, any component involved in the transmission and/or reception of signals, any component completing the circuitry inside the luminaire head, such as protection circuitry, etc. It is further noted that the module may be configured to receive a further module. In other words, a stack of interconnected modules may be arranged in the socket, wherein some functionalities may be included in a first module and other functionalities in a second module. In that manner, the system is given an extra degree of modularity.

According to an exemplary embodiment, a shape of the skirt corresponds to any one of a substantially conical shape, a substantially cylindrical shape, a stepped shape, or a combination thereof. The skirt may be provided in different colors and/or with different textures. Optionally, accessories, such as LEDs may be arranged in the skirt. Optionally, decorative and/or light diffusing elements may be suspended from the skirt or attached to the skirt. For example, ribbons or fringes or strings, e.g. strings with beads may be suspended from the skirt.

According to an exemplary embodiment, a skirt comprises a peripheral portion and a flange portion intended to be in contact with a lower side of the body. When a protection and connection assembly is present, the flange portion may be arranged between the body and the protective casing of the protection and connection assembly. Optionally, a seal may extend between the body and the protective casing, and the flange portion surrounds the seal. In other words, the skirt is arranged outside of the sealed compartment formed by the protection and connection assembly and the body.

More generally, a skirt may either comprise only a peripheral portion or a combination of a peripheral portion with one or more flange portions. Preferably, the skirt extends around a portion of the body, but if a protective casing is present, the skirt may also extend around a portion of the protective casing.

According to an exemplary embodiment, a shape of the protective casing corresponds to any one of a substantially conical shape, a substantially cylindrical shape, or a combination thereof. The protective casing may have a closed or open bottom end.

According to a preferred embodiment, the upper side of the body is releasably attached to the upper cover by means of any one or more of the following elements: screws, locks, clamps, clips, latches, pins, bolts, studs.

According to a preferred embodiment, the photometric unit is releasably attached to the body, preferably to the lower side of the body in a tool-less manner by means of clamps or clips.

According to a preferred embodiment, the skirt is releasably attached to the body by means of any one or more of the following elements: screws, locks, clamps, clips, pins, bolts, studs.

According to a preferred embodiment, the protective casing is releasably attached to the body by means of any one or more of the following elements: screws, locks, clamps, clips, pins, bolts, studs.

According to a preferred embodiment, the support is releasably attached to the body, preferably to the lower side of the body in a tool-less manner by means of clamps or clips.

According to a preferred embodiment, the heat sink is releasably attached to the carrier in a tool-less manner by means of clamps or clips. Further, the carrier may be releasably attached to the body, preferably in a tool-less manner, e.g. in a similar way as the above described attachment means for the support.

According to a preferred embodiment, the annular portion is releasably attached to the lower side of the body by means of any one or more of the following elements: screws, locks, clamps, clips, pins, bolts, studs.

According to embodiments of the invention, the assembled luminaire head assembly can have an overall round shape, i.e. any one or more of the components of the luminaire head assembly such as the body, the upper cover, the lower cover, the protective casing, the diffusor body, the skirt, may have a round shape. In other embodiments, the luminaire head assembly may have an overall polygonal shape, such as a square or rectangular shape. Thus, any one or more of the components of the luminaire head assembly such as the body, the upper cover, the lower cover, the protective casing, the diffusor body, the skirt, may have a polygonal shape. Also mixed shapes are possible. For example the upper cover may be round whilst the protective casing is polygonal or vice versa.

According to a further aspect of the invention, there is provided a luminaire head assembly comprising a body comprising an electronic assembly and carrying a light source at a lower side thereof, an upper cover covering an upper side of the body, a transparent or translucent lower cover covering the lower side of the body, such that the upper cover, the body and the lower cover form a housing in which the electronic assembly and the light source are arranged, and a skirt releasably attached to said body and at least partially surrounding said body.

The features of the embodiments discussed above and below are applicable to all aspects discussed above and below.

According to a preferred embodiment, the luminaire head assembly further comprises a bracket configured to connect said upper cover to a pole. An end of said bracket is connected to the upper cover. Preferably, the bracket is connected to a central portion of the upper cover.

In this way, connection wires from the pole to the housing enter in a central area of the housing, thereby providing easier access to an operator.

According to a preferred embodiment, the luminaire head assembly further comprises a hinge between said upper cover and said body, and an attachment means configured for releasably attaching said body to said upper cover.

In this manner, the body can be swung downward in the side-entry configuration, thereby providing easy removal of the electronic assembly without having to remove the body. Similarly, in the post-top configuration the upper cover can be swung upward.

According to a preferred embodiment, the luminaire head assembly further comprises a photometric unit releasably attached to said body, preferably in a tool-less manner, said photometric unit comprising an electronic assembly at an upper portion thereof and a light source at a lower portion thereof. The photometric unit may comprise a support as described above.

According to a further aspect of the invention, there is provided a luminaire head assembly comprising a housing provided with a socket assembly, a light source arranged in said housing, a and bracket releasably attached to said housing, said bracket being configured to fix the housing to a pole. The bracket is provided with a through-hole at an end thereof, and the socket assembly extends at least partially in said through-hole.

By providing a luminaire head assembly comprising a housing and a bracket releasably attached to said housing, said bracket being configured to fix the housing to a pole, the housing can be more easily detached from the remaining components of the luminaire for maintenance and replacement. By providing a luminaire head assembly comprising a housing provided with a socket assembly and a bracket with a through-hole at an end thereof, the socket assembly extending at least partially in said through-hole, a more compact luminaire head assembly is obtained, thereby saving space inside the luminaire head assembly, more in particular inside a housing of the luminaire head assembly. Preferred embodiments relate to an outdoor luminaire.

The bracket may have a first end for connection to a pole or pole connector and a second end attached to the housing. The through-hole is provided at the second end, i.e. the through-hole extends between two opposite sides of said second end.

Luminaires for roadways, parking lots, industrial areas and other outdoor areas typically use plug twist-lock external modules containing different control blocks and/or sensors, e.g. a light sensor for sensing the light level of ambient light to automatically control the light sources of the lighting equipment. For uniformity throughout the lighting industry, socket assemblies for receiving such external modules are mostly made according to specific standards such as standards approved by American National Standards Institute, Inc. (ANSI). Such socket assemblies are typically mounted on the top of a housing or in an opening in the housing of the lighting equipment and are electrically connected to various components of the luminaire. The socket assembly has a connection interface located on an external side of the housing, so that an external module can be plugged into the socket assembly to provide control for the lighting equipment.

The socket assembly is preferably configured for receiving an external module. An external module typically comprises at least three standard prongs or plug contacts which are inserted into corresponding apertures in the socket assembly. Preferably, the socket assembly and the external module fulfil the requirements of the ANSI C136.10-2017 standard or of the ANSI C136.41-2013 standard or of the Zhaga Interface Specification Standard (Book 18, Edition 1.0, July 2018, see https://www.zhagastandard.org/data/downloadables/1/0/8/1/book_18.pdf).

The external module may comprise any one or more of the following: a sensor (e.g. a light sensor, a motion sensor, a passive infrared sensor, etc.), communication circuitry, control circuitry, protection circuitry (e.g. an SPD or a fuse), an actuator, etc. More generally the external module may comprise any component that needs to be powered, any component involved in the transmission and/or reception of signals, any component completing the circuitry inside the luminaire head, such as protection circuitry, etc.

Also, it is noted that it is possible to provide one or more functionalities in the socket assembly itself, such as a sensor, communication circuitry, control circuitry, protection circuitry (e.g. an SPD or a fuse), an actuator, display unit, an antenna unit, a speaker unit, an air cleaning unit such as a UV light source, etc. The external module may comprise any one or more of the following: a sensor (e.g. a light sensor, a motion sensor, a passive infrared sensor, a sound sensor, a pollution sensor such as a $CO_2$, $NO_x$ and $SO_x$ sensor, a smoke sensor, a biological threat sensor, a thermal sensor, an image capturing sensor such as a camera, a humidity sensor, a visibility sensor, a temperature sensor, a radar sensor, a voice recorder, etc.), communication circuitry, control circuitry, protection circuitry (e.g. an SPD or a fuse), an actuator, etc. More generally the external module may comprise any component that needs to be powered, any component involved in the transmission and/or reception of signals, any component completing the circuitry inside the luminaire head, such as protection circuitry, etc. It is further noted that the external module may be configured to receive a further external module. In other words, a stack of interconnected external modules may be arranged in the socket assembly, wherein some functionalities may be included in a first external module and other functionalities in a second external module. In that manner, the system is given an extra degree of modularity.

According to a preferred embodiment, seen in the mounted position of the luminaire head assembly, the housing has a top surface, and the socket assembly is provided at said top surface. Preferably, the socket assembly is arranged substantially at a center of the top surface. Preferably, the end of the bracket is releasably attached to a portion of the top surface), such that a lower surface of the bracket faces the top surface. Preferably, the through-hole extends between the lower surface of the bracket and an upper surface of the bracket.

According to a preferred embodiment, the end of the bracket is provided with channels configured to receive fastening means for fixing the bracket to the housing.

According to a preferred embodiment, the housing is provided with an outwardly protruding portion extending at least partially in the through-hole and configured to receive the socket assembly.

Preferably, a height of the outwardly protruding portion is substantially equal to a height of the bracket. In this way, a front receptacle portion of the socket assembly entirely protrudes outside the through-hole of the bracket. Hence, if the socket assembly is configured to emit waves in a horizontal direction for communicating with an external device, said waves can be emitted without being perturbed by the presence of the bracket. In other embodiments, the height of the outwardly protruding portion may be lower than the height of the bracket, for example if the socket assembly is configured to emit waves in a horizontal direction and in a vertical direction for communicating with an external device.

According to an alternative embodiment stackable modules may be used. E.g. the module closest to the upper cover may be implemented not to emit/receive data horizontally and can therefore be completely included within the bracket height (e.g. SPD module, metering module, resetting module, . . . ). The second module stacked on the first one may by default protrude from the bracket and can therefore comprise communication features.

According to a preferred embodiment, a shape of the through-hole corresponds to a substantially cylindrical shape. Preferably, a shape of the outwardly protruding portion corresponds to a substantially cylindrical shape, in order to match the substantially cylindrical shape of the through-hole. In addition, a shape of the socket assembly is typically also substantially cylindrical.

According to a preferred embodiment, a diameter of the outwardly protruding portion is between 80% and 95% of a diameter of the through-hole, preferably between 90% and 95% of said diameter.

In this manner, large amounts of water cannot accumulate in the through-hole. In combination with a height of the outwardly protruding portion substantially equal to a height of the bracket, the above-mentioned ranges of diameter for the outwardly protruding portion enable to avoid that water may be contained in a recess, thereby reducing or avoiding the risk that water may penetrate inside the housing and damage the electronic components. In addition to said features, channels may be provided through the end of the bracket in order to evacuate water from the through-hole.

According to a preferred embodiment, the housing is provided with a hole, said hole being configured to pass a cable from the bracket to an inner space of the housing. According to an embodiment wherein the housing is provided with said outwardly protruding portion, the outwardly protruding portion is provided with said hole, e.g. at a lateral surface thereof.

In this way, connection wires from the pole to the luminaire head assembly enter in a central area of the luminaire head assembly, thereby providing easier access to an operator.

According to a preferred embodiment, said cable is connected directly or indirectly to the socket assembly.

Preferably, the bracket extends in a length direction between the first and the second end and the through-hole has an axis which is at an angle with respect to the length direction of the bracket, preferably substantially perpendicular on the length direction of the bracket. It is noted that the length direction may be a straight line for a straight bracket or a curved line for a curved bracket.

Preferably, seen in the mounted position, the bracket has a lower side and an upper side, and wherein the through-hole extends between the lower side and the upper side. Preferably, a portion of the lower side of the bracket faces the housing.

According to a preferred embodiment, the housing comprises an upper cover and a body which carries a photometric unit, said photometric unit comprising said light source at a lower portion thereof and an electronic assembly at an upper portion thereof. Preferably, the second end of the bracket is attached to the upper cover.

Preferably, the body is provided with a through-hole between an upper side and a lower side. Preferably, the photometric unit is releasably attached to said body, preferably in a tool-less manner and at least partially extends in said through-hole.

According to a preferred embodiment, the luminaire head assembly comprises a hinge between said upper cover and said body, and an attachment means configured for releasably attaching said body to said upper cover.

In this manner, the body can be swung downward in the side-entry configuration, thereby providing easy removal of the electronic assembly without having to remove the body.

According to a preferred embodiment, the electronic assembly comprises any one or more of the following: a light source driving means, a light source dimming means, surge protection circuitry, electrostatic discharge protection circuitry, connecting means, a fuse, and more generally any driving or control circuitry for any one of the components of the luminaire head.

According to a preferred embodiment, the socket assembly is connected directly or indirectly to the electronic assembly.

According to a preferred embodiment, the body is configured to receive at least one of a socket, an antenna, a sensor.

According to a preferred embodiment, the luminaire head assembly further comprises a skirt releasably attached to said body. Preferably, the skirt at least partially surrounds said body.

Preferably, a shape of the skirt corresponds to any one of a substantially conical shape, a substantially cylindrical shape, a stepped shape, or a combination thereof. The skirt may be provided in different colors and/or with different textures. Optionally, accessories, such as LEDs may be arranged in the skirt. Optionally, decorative and/or light diffusing elements may be suspended from the skirt or attached to the skirt. For example, ribbons or fringes or strings, e.g. strings with beads may be suspended from the skirt.

According to a preferred embodiment, the skirt is releasably attached to the body by means of any one or more of the following elements: screws, locks, clamps, clips, pins, bolts, studs.

According to a preferred embodiment, the luminaire head assembly further comprises a protective casing releasably attached to the body, said protective casing comprising a transparent or translucent portion.

Preferably, a shape of the protective casing corresponds to any one of a substantially conical shape, a substantially cylindrical shape, or a combination thereof.

According to a preferred embodiment, the protective casing is releasably attached to the body by means of any one or more of the following elements: screws, locks, clamps, clips, pins, bolts, studs.

According to a further aspect of the invention, there is provided a luminaire head assembly comprising a base comprising a light source, a protective casing releasably attached to said base, and a diffusor body. The protective casing comprises a transparent or translucent portion arranged to transmit light of the light source. The diffusor body is arranged in said protective casing such that at least a portion of the light source is arranged to emit light in the diffusor body, and such that the diffusor body is visible through the protective casing.

By providing a luminaire head assembly comprising a diffusor body arranged in said protective casing, an illumination from the light source of the luminaire head assembly can be aesthetically improved without significantly deteriorating the light distribution of the light source. Further, also during the day, when the luminaire is not powered, the diffusor body is visible and can provide the luminaire with a customized identity. For example, luminaires on one side of the street may have a first type of diffusor bodies and luminaires on the other side of the street may have another type of diffusor bodies. Preferred embodiments relate to an outdoor luminaire.

The base may correspond to the body of any one of the embodiments described above. However, the base may also be a portion without a through-hole having a lower side carrying the light source. Also, the protective casing may correspond to the protective casing of any one of the embodiments described above.

Preferably, the diffusor body comprises a wire frame and/or a ribbed frame. By using a wired frame and/or a ribbed frame, the diffusor body can be given a certain length, and can even extend over the full length or over a large portion of the length of the protective casing without significantly disturbing the light distribution of the luminaire head.

In other embodiments, the diffusor body may be an inner casing, preferably a tubular casing with a first open end connected to the base and a second open or closed end inside the protective casing at a distance of the base, e.g. a cylindrical or conical inner casing, wherein the light source is arranged to emit at least a portion of the light in the inner casing. Optionally the inner casing may extend through the entire protective casing. The inner casing may be a transparent or translucent casing. The inner casing may be provided with a relief structure such as a plurality of grooves, preferably downwardly extending grooves. The inner casing may be designed in different colors and may be made of various materials such as metal, glass, plastic, etc.

In some embodiments, the inner casing may be transparent or translucent casing having a relatively large length measured along an axial direction of the casing, e.g. at least 5%, at least 10%, or even at least 20%, of a length a surrounding protective casing measured along the axial direction.

In other embodiments, the inner casing may be an opaque casing with an anti-glare function having a relatively short height measured along an axial direction, e.g. less than 40 mm or even less than 30 mm. Such opaque inner casing may be similar to the light absorbing ring disclosed in Dutch patent application with application number NL2024425 in the name of the applicant, which is included herein by reference. The inner casing is configured to absorb lateral light emissions at large angles emitted by the light source. The inner casing may have a black inner surface facing the light source and an outer surface of a similar or different color.

According to a preferred embodiment, the diffusor body is releasably attached to the base. However, in addition or alternatively, the diffusor body may also be attached to a connection part and/or to the protective casing. When the base comprises a body as described above in which a photometric unit is removably arranged, the diffusor body may also be attached to the photometric unit. In that manner, the diffusor body can be easily removed and changed. A seal may be arranged between the protective casing and the body. When the diffusor body is attached to the photometric unit, it can be removed and/or exchanged without impacting the IP rate/tightness/sealing of the luminaire.

According to a preferred embodiment, the wire frame comprises at least three wires, preferably at least four wires, more preferably at least five wires. Preferably, the wires extend downwardly from the base and/or extend upwardly from a lower end of the protective casing.

According to a preferred embodiment, the wire frame comprises an annular portion releasably attached to the base. This will allow for an easy connection of the wire frame to the base.

According to a preferred embodiment, said wires of the wire frame are fixed to said annular portion and converge at an end of the wire frame opposite the base. The wire frame may comprise a first annular portion at an upper edge of the protective casing and/or a second annular portion at a distance thereof, e.g. at a lower end of the protective casing.

According to a preferred embodiment, said wire frame comprises metal, or plastic or glass. For examples, the wires may be made of a coated material, e.g. a coated metal material. The coating may be e.g. a white coating. In another example, the wire frame may be made of a white plastic material. By using a suitable color such as a white or substantially white color, when using colored light e.g. by using RGB and/or RGBW and/or RGBA LEDs for the light source, the wire frame can be given a predetermined color. Alternatively or in addition, a color filter may be arranged between the light source and the wire frame such that the light emitted on the wire frame has a predetermined color. By varying the color of the light, the look of the luminaire can be changed.

According to a preferred embodiment, said ribbed frame comprises at least two ribs, preferably at least four ribs extending downwardly from the base.

According to a preferred embodiment, the ribbed frame comprises a first annular portion at an upper edge of the protective casing and/or a second annular portion at a lower end of the protective casing.

According to a preferred embodiment, said ribs of the ribbed frame are releasably attached to the first annular portion and/or to the second annular portion.

According to a preferred embodiment, said ribbed frame comprises metal or glass or plastic, preferably transparent or translucent plastic. For examples, the ribbed frame may be made of a coated material, e.g. a coated metal material. The coating may be e.g. a white coating. In another example, the ribbed frame may be made of a white plastic material. By using a suitable color such as a white or substantially white color, when using colored light e.g. by using RGB and/or RGBW and/or RGBA LEDs for the light source, the ribbed frame can be given a predetermined color. Alternatively or in addition, a color filter may be arranged between the light source and the ribbed frame such that the light emitted on the ribbed frame has a predetermined color. By varying the color of the light, the look of the luminaire can be changed.

According to a preferred embodiment, a shape of the protective casing corresponds to any one of a substantially conical shape, a substantially cylindrical shape, a dome shape, a flute shape, or a combination thereof.

According to a preferred embodiment, a shape of the diffusor body corresponds to any one of a substantially conical shape, a substantially cylindrical shape, a dome shape or a combination thereof.

According to a preferred embodiment, for a post-top configuration, the protective casing is provided with a lower end configured to be connected to a pole. Preferably, the luminaire head assembly further comprises a connection part at said lower end configured to connect the lower end and a top end of the pole.

According to a preferred embodiment, for a side-entry configuration, the protective casing is provided with a closed lower end.

According to an exemplary embodiment, the at least two ribs extends along the protective casing between an upper end and the lower end, and the luminaire head assembly further comprises a cable extending from the base, between two ribs of the at least two ribs, to the connection part. In that manner a cable can be guided from the lower end to the upper end whilst the ribs at least partly hide and guide the cable. Optionally the base may be provided with a through-hole for allowing the cable to pass through the base.

According to a preferred embodiment, the protective casing is releasably attached to the base by means of any one or more of the following elements: screws, locks, clamps, clips, pins, bolts, studs.

According to a preferred embodiment, the base is configured to receive at least one of a socket, an antenna, a sensor.

According to a preferred embodiment, the luminaire head assembly further comprises an upper cover releasably attached to the body. Preferably, the upper cover is provided with a socket assembly.

According to an exemplary embodiment, the upper cover is provided with an outwardly protruding portion configured to receive said socket assembly.

According to a preferred embodiment, the base is a body which carries a photometric unit, said photometric unit comprising said light source at a lower portion thereof and an electronic assembly at an upper portion thereof.

According to a preferred embodiment, the body is provided with a through-hole between an upper side and a lower side. Preferably, the photometric unit is releasably attached to said body, preferably in a tool-less manner and at least partially extending in said through-hole. When the base comprises a body as described above in which a photometric unit with a support is removably arranged, the diffusor body may also be attached to the support. In that manner, the diffusor body can be easily removed and changed, together with the light source and the electronic assembly on the support.

According to a preferred embodiment, the electronic assembly comprises any one or more of the following: a light source driving means, a light source dimming means, surge protection circuitry, electrostatic discharge protection circuitry, connecting means, a fuse, and more generally any driving or control circuitry for any one of the components of the luminaire head.

According to a preferred embodiment, the luminaire head assembly further comprises a skirt releasably attached to the base and at least partially surrounding the base.

According to an exemplary embodiment, the skirt comprises a peripheral portion and a flange portion, wherein said flange portion is configured to be arranged between the base and the protective casing. In that manner the skirt may be attached to the base without the need for screws or clamps.

According to an exemplary embodiment, the protective casing has an axial direction extending in a pole direction or parallel to the pole direction, wherein the protective casing has a first length measured along the axial direction, and wherein the diffusor body has a second length measured along the axial direction, said second length being at least 20%, preferably at least 30%, more preferably at least 50% of the first length. Typically, the first length is at least 20 cm, preferably at least 30 cm, more preferably at least 40 cm.

According to an exemplary embodiment the protective casing has an inner surface which is provided at an upper end with a plurality of threaded holes, and wherein screws or bolts or pins or studs extend through the base into the threaded holes. Optionally, two ribs of the at least two ribs extend along the protective casing from an upper end downwardly, next to the threaded holes.

It is noted that a diffusor body may be included in any one of the embodiments of all aspects, and that the different embodiments of the diffusor body may be used in embodiments according to any one of the aspects above.

It is further noted that a lower cover may be combined with a protective casing in the same luminaire assembly in any one of the embodiments disclosed above, wherein the protective casing may have a closed or an open bottom. Preferably the lower cover is planar in such embodiments.

According to further embodiments of the invention, the luminaire head assembly has the features of any one of the following clauses:

1. A luminaire head assembly (1) comprising:

a base (200) comprising a light source (310);

a protective casing (420) releasably attached to said base (200), said protective casing (420) comprising a transparent or translucent portion arranged to transmit light of the light source; and a diffusor body (430) arranged in said protective casing (420) such that at least a portion of the light source is arranged to emit light in the diffusor body, and such that the diffusor body is visible through the protective casing.

2. The luminaire head assembly according to clause 1, wherein the diffusor body (430) comprises a wire frame (440) and/or a ribbed frame (450).

3. The luminaire head assembly according to clause 2, wherein the wire frame (440) comprises at least three wires, preferably at least four wires, more preferably at least five wires (441) extending downwardly from the base (200).

4. The luminaire head assembly according to clause 2 or 3, wherein the wire frame (440) comprises an annular portion releasably attached to the base (200); and/or wherein the wire frame (440) comprises a first annular portion at an upper end of the protective casing (420) and a second annular portion at a distance of the upper end of the protective casing (420).

5. The luminaire head assembly according to clauses 3 and 4, wherein said wires (441) of the wire frame (440) are fixed to said annular portion and converge at an end of the wire frame (440) opposite the base (200).

6. The luminaire head assembly according to any one of the clauses 2-5, wherein the wire frame (440) comprises metal or plastic or glass.

7. The luminaire head assembly according to any one of the clauses 2-6, wherein the ribbed frame (450) comprises at least two ribs, preferably at least four ribs (451) extending downwardly from the base (200).

8. The luminaire head assembly according to any one of the previous clauses, further comprising a connection part (422) at a lower end (421) of the protective casing, said connection part (422) being configured to connect the lower end (421) and a top end (E') of a pole (P').

9. The luminaire head according to clause 7 and 8, wherein the at least two ribs extends along the protective casing between an upper end and the lower end, and further comprising a cable from the base, between two ribs of the at least two ribs, to the connection part (422).

10. The luminaire head assembly according to any one of the clauses 2-9, wherein the ribbed frame (450) comprises a first annular portion (452) at an upper edge (423) of the protective casing (420) and a second annular portion (453) at a lower end (421) of the protective casing (420).

11. The luminaire head assembly according to clauses 7, 8 or 9 and 10, wherein said ribs (451) of the ribbed frame (450) are releasably attached to the first annular portion (452) and to the second annular portion (453).

12. The luminaire head assembly according to any one of the clauses 2-11, wherein the ribbed frame (450) comprises metal or plastic, and may non-transparent or transparent or translucent.

13. The luminaire head assembly according to any one of the previous clauses, wherein the diffusor body (430) is releasably attached to the base (200).

14. The luminaire head according to clause 8 or 9, wherein the diffusor body (430) is releasably attached to the connection part.

15. The luminaire head assembly according to any one of the previous clauses, wherein a shape of the protective casing (420) corresponds to any one of a substantially conical shape, a substantially cylindrical shape, or a combination thereof.

16. The luminaire head assembly according to any one of the previous clauses, wherein a shape of the diffusor body (430) corresponds to any one of a substantially conical shape, a substantially cylindrical shape, or a combination thereof.

17. The luminaire head assembly according to any one of the previous clauses, wherein a seal is arranged between the protective casing and the base.

18. The luminaire head assembly according to any one of the previous clauses, wherein the protective casing (420) is releasably attached to the base (200) by means of any one or more of the following elements: screws (SC3'), locks, clamps, clips.

19. The luminaire head assembly according to any one of the previous clauses, wherein the base (200) is configured to receive at least one of a socket (230), an antenna, a sensor.

20. The luminaire head assembly according to any one of the previous clauses, further comprising an upper cover (100) releasably attached to the base (200), wherein preferably a seal is arranged between the upper cover and the base.

21. The luminaire head assembly according to the previous clause, wherein the upper cover (100) is provided with a socket assembly (700).

22. The luminaire head assembly according to the previous clause, wherein the upper cover (100) is provided with an outwardly protruding portion (120) configured to receive said socket assembly (700).

23. The luminaire head assembly according to any one of the previous clauses, wherein the base (200) is a base (200) which carries a photometric unit (300), said photometric unit (300) comprising said light source (310) at a lower portion thereof and an electronic assembly (320) at an upper portion thereof.

24. The luminaire head assembly according to the previous clause, wherein the base (200) is provided with a through-hole (H1) between an upper side (220) and a lower side (210); and wherein the photometric unit (300) is releasably attached to said base (200), preferably in a tool-less manner and at least partially extending in said through-hole (H1).

25. The luminaire head assembly according to clause 23 or 24, wherein the electronic assembly (320) comprises any one or more of the following: a light source driving means (321), a light source dimming means, surge protection circuitry (322), electrostatic discharge protection circuitry (323), connecting means (324), a fuse (325), control and/or driving circuitry for controlling and/or driving a component of the luminaire head assembly.

26. The luminaire head assembly according to any one of the previous clauses, further comprising a skirt (410) releasably attached to the base (200) and at least partially surrounding the base (200).

27. The luminaire head according to the previous clause, wherein the skirt (410) comprises a peripheral portion (415) and a flange portion (412), wherein said flange portion (412) is configured to be arranged between the base (200) and the protective casing.

28. The luminaire head assembly according to any one of the previous clauses, wherein the protective casing has an axial direction extending in a pole direction, wherein the protective casing has a first length (11) measured along the axial direction, and wherein the diffusor body has a second length (12) measured along the axial direction, said second length being at least 20%, preferably at least 30%, more preferably at least 50% of the first length.

29. The luminaire head assembly according to the previous clause, wherein the first length (11) is at least 20 cm, preferably at least 30 cm, more preferably at least 40 cm.

30. The luminaire head assembly according to any one of the previous clauses, wherein the protective casing has an inner surface which is provided at an upper end with a plurality of threaded holes, and wherein screws extend through the base into the threaded holes.

31. The luminaire head according to clause 7 and 30, wherein two ribs of the at least two ribs extend along the protective casing from an upper end downwardly, next to the threaded holes.

32. The luminaire head assembly according to any one of the previous clauses, wherein the diffusor body is an inner casing, preferably a tubular casing with a first open end and a second open or closed end inside the protective casing at a distance of the base, wherein the light source is arranged to emit at least a portion of the light in the inner casing.

33. The luminaire head assembly according to the previous clause, wherein the inner casing is a substantially cylindrical or substantially conical inner casing.

34. The luminaire head assembly according to clause 32 or 33, wherein inner casing is a transparent or translucent casing, and wherein the inner casing is provided with a relief structure.

35. The luminaire head assembly according to the previous clause, wherein the relief structure comprises a plurality of grooves, preferably downwardly extending grooves.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

DESCRIPTION OF EMBODIMENTS

The luminaire head assembly 1 of FIGS. 1A-8B may be included in a luminaire comprising said luminaire head assembly 1 and a luminaire pole P. P'. The luminaire head assembly 1 may be connected to the luminaire pole P. P' in any manner known to the skilled person. Typical examples of such systems are street lights. In other embodiments, the luminaire head assembly 1 may be connected to a wall or a surface, e.g. for illuminating buildings or tunnels.

Figure 1A:
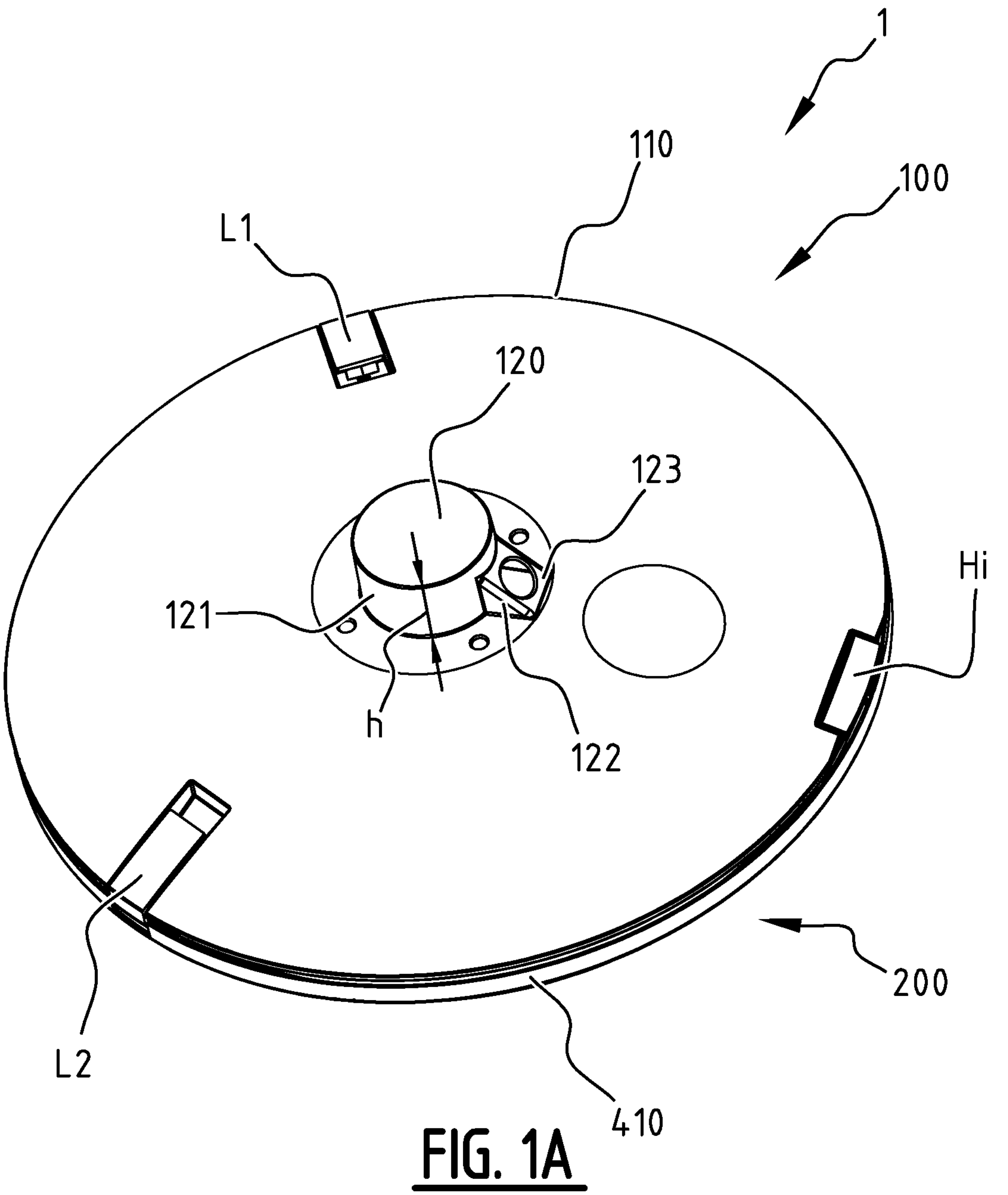
FIGS. 1A-1F respectively illustrate a perspective top view, a perspective bottom view in the open state, a perspective top view in the open state, a perspective top view in the open state, an exploded view, and a partial cross section of an exemplary embodiment of a luminaire head assembly.
Figure 1B:
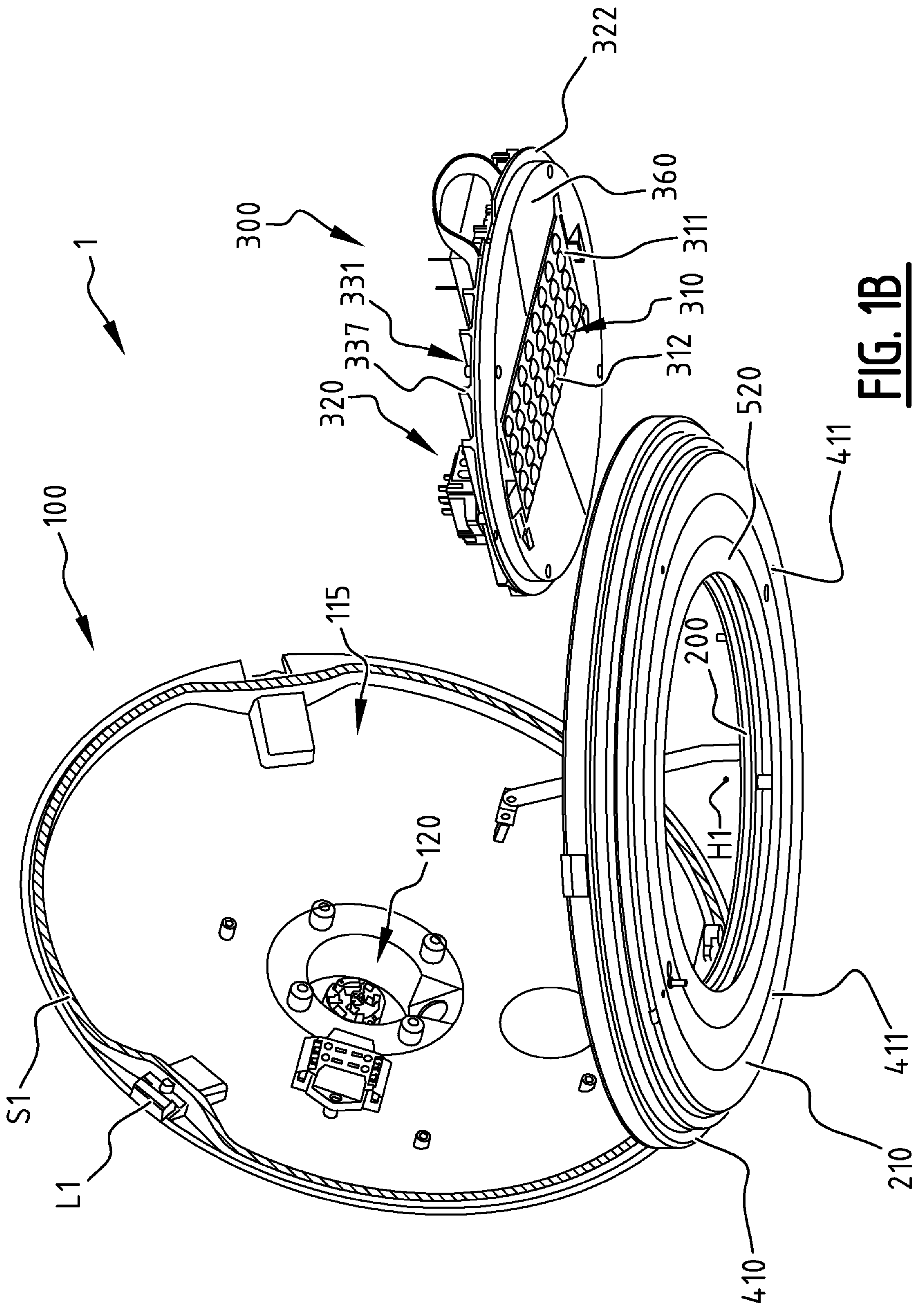
Figure 1C:
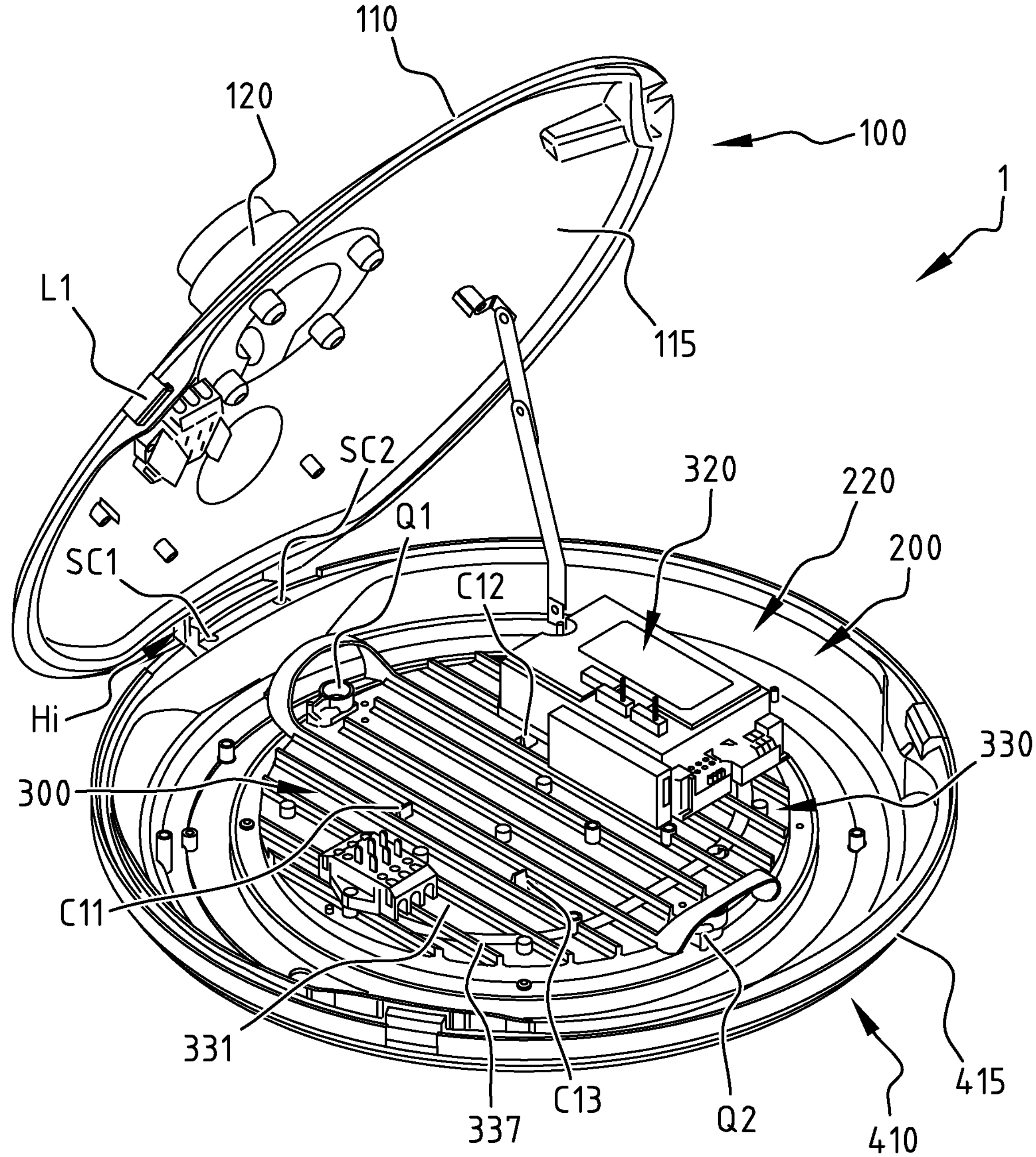
Figure 1D:
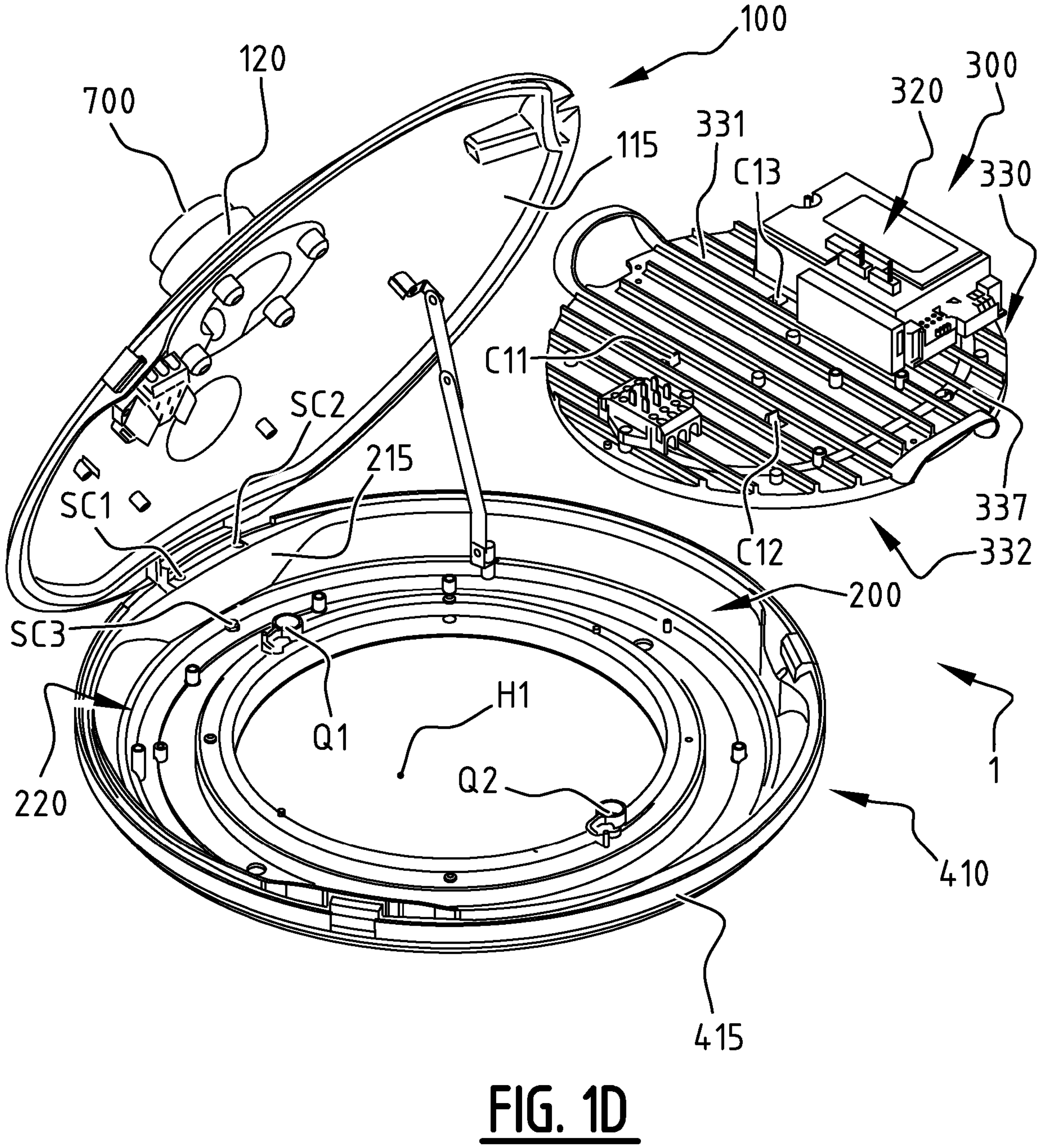
Figure 1E:
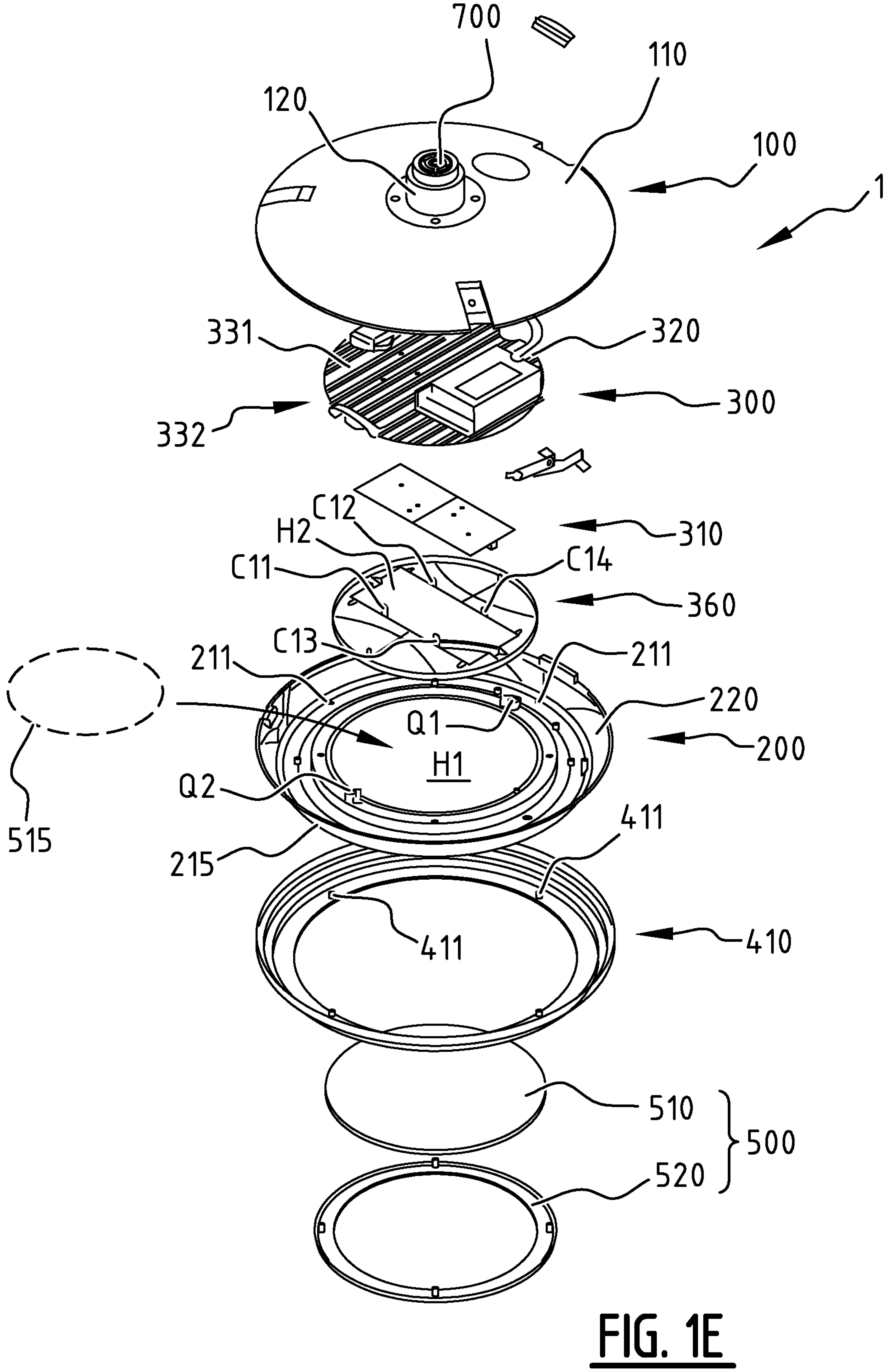
Figure 1F:
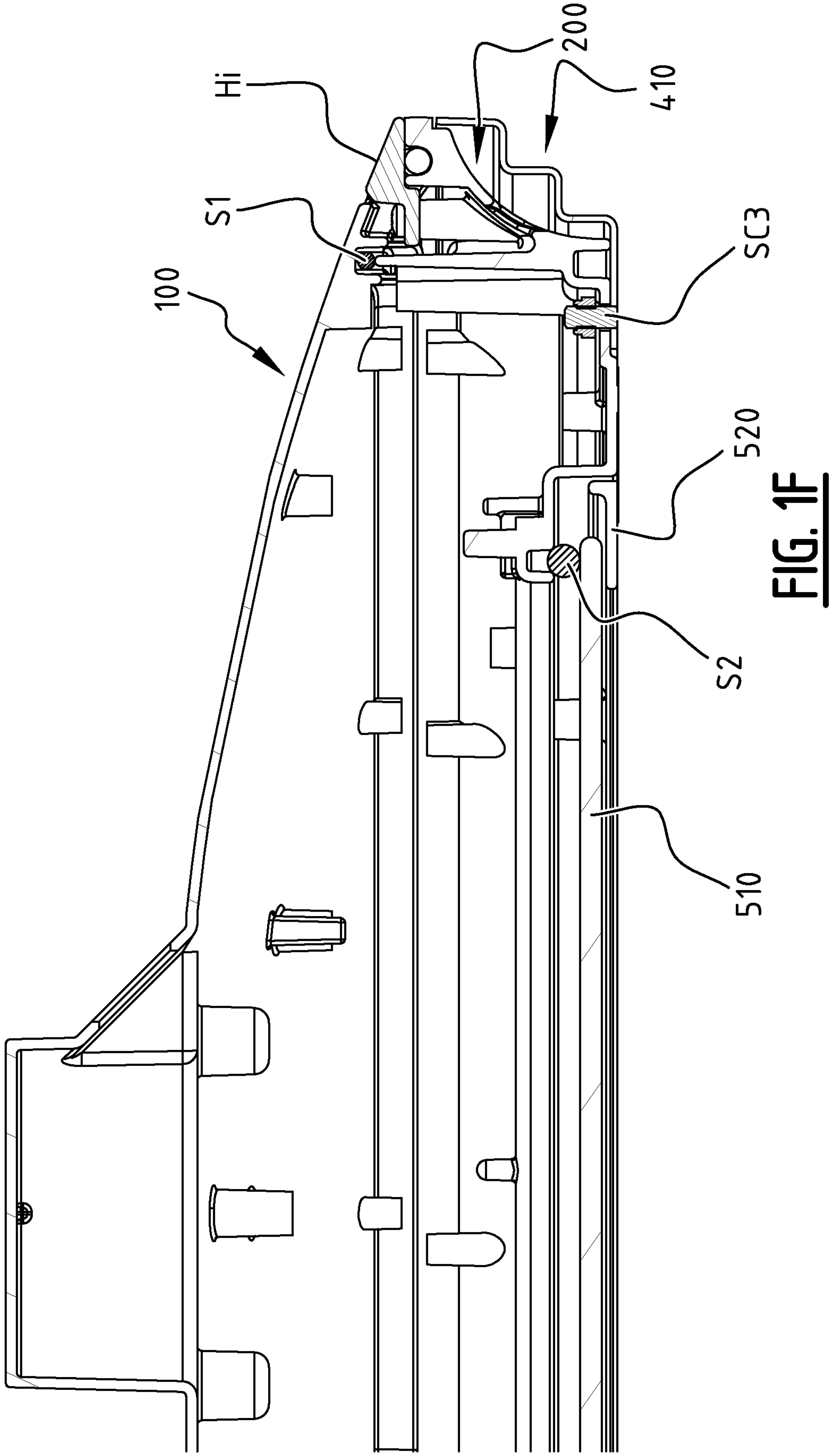

FIGS. 1A-1E illustrate various perspective views of an exemplary embodiment of a luminaire head assembly in the closed state (FIG. 1A) and open state (FIGS. 1B-1D), as well as an exploded view (FIG. 1E) and a cross sectional view (FIG. 1F). FIGS. 2A-2D respectively illustrate two perspective top views (with and without upper cover), an exploded view, and a cross sectional view of another exemplary embodiment of a luminaire head assembly.

As illustrated in FIGS. 1A-2C, the luminaire head assembly 1 comprises a ring-shaped body 200 provided with a through-hole H1 (best visible in FIGS. 1B, 1D, 1E and 2B) between an upper side 220 and a lower side 210, and a photometric unit 300 releasably attached to the body 200 in a tool-less manner and at least partially extending in the through-hole H1. The luminaire head assembly 1 further comprises an upper cover 100 to cover the upper side 220 of the body 200, a hinge Hi between the upper cover 100 and the body 200, and an attachment means L1, L2 configured for releasably attaching the body 200 to the upper cover 100. The body 200 may be releasably attached to the upper cover 100 by means of any one or more of the following elements: screws SC1, SC2, locks, clamps, clips, latches L1, L2 as illustrated in FIGS. 1A-2C. The upper cover has an upper side 110 and a lower side 115, wherein the lower side 115 faces the upper side 220 of the body 200.

The photometric unit 300 comprises a light source 310 at a lower portion thereof and an electronic assembly 320 at an upper portion thereof. The light source 310 comprises a plurality of LEDs 311 arranged on a PCB 312. Optionally, one or more optical elements, such as a lenses or reflectors, may be arranged over the plurality of LEDs 311. The optical elements may be integrated in a plate comprising a plurality of optical elements, e.g. a lens plate. A light flux exhauster 360 provided with a through-hole H2 and surrounding the light source 310 may be releasably attached to the support 330, preferably in a tool-less manner by means of clamps, or clips C11-C14 as illustrated in FIGS. 1D and 1E.

The body 200 may be a ring-shaped body 200 as in the embodiments illustrated in FIGS. 1A-2C, or may be a square or rectangular body in other non-illustrated embodiments, or in general may have any polygonal or curved shape.

As illustrated in FIGS. 1A-2C, the luminaire head assembly 1 comprises a skirt 410 releasably attached to the body 200, preferably to the lower side 210 of the body 200, and preferably surrounding a peripheral side 215 of the body 200. The skirt 410 at least partially surrounds the through-hole H1 in the body 200. A shape of the skirt 410 may correspond to any one of a substantially conical shape, a substantially cylindrical shape, a stepped shape as illustrated in FIGS. 1A-2C, or a combination thereof. The skirt 410 may be releasably attached to the body 200 by means of any one or more of the following elements: screws SC3 as illustrated in FIG. 1D, locks, clamps, clips. In the embodiment of FIGS. 1A-1F, the skirt 410 is fixed with screws SC3, the skirt 410 is provided with through-holes 411 for the screws SC3, and the body may be provided with corresponding holes 211 for receiving the screws SC3. In the embodiment of FIGS. 2A-2D, a circumferential flange 412 of the skirt 410 may be fixed between the protector and connection assembly 410' (see further) and the body 200 without the need for screws.

In the embodiment of FIGS. 1A-1E, the luminaire head assembly 1 comprises a lower cover 500 supported on the lower side 210 of the body 200, within the first peripheral area, and surrounding the through-hole H1 at the lower side 210 of the body 200. The lower cover 500 may comprise a transparent or translucent portion 510 and optionally a ring or annular portion 520 as illustrated in FIGS. 1B. 1D and 1E. Optionally a color filter 515 (see FIG. 1E) may be arranged between the light source 310 and the lower cover 500. For example the color filter 515 may be a sheet or coating arranged above the transparent or translucent portion 510 of the lower cover 500. The color filter 515 is configured to absorb a portion of the light emitted by the light source 310 in specific wavelength ranges so as to change the color of the light emitted by the luminaire head assembly. In the illustrated embodiment, the transparent or translucent portion 510 is a flat portion, but the skilled person understands that this may also be a curved portion, e.g. a dome or flute shaped portion. By arranging the color filter 515 in this manner, the color filter can be easily removed or replaced, e.g. with a different color filter for another occasion, by opening the upper compartment (see also FIG. 4A) and removing the photometric unit 300.

The luminaire head assembly 1 of FIGS. 1A-1E may further comprise a bracket (not shown; see element 600 of FIG. 4A) configured to fix the upper cover 100 to a pole (not shown; see element P of FIGS. 9B-9F), wherein an end (not shown; see element E of FIGS. 9B-9F) of said bracket is connected to the upper cover 100. In this manner, the embodiment of FIGS. 1A-1E corresponds to the above-mentioned side-entry configuration of the luminaire head assembly 1.

Figure 2A:
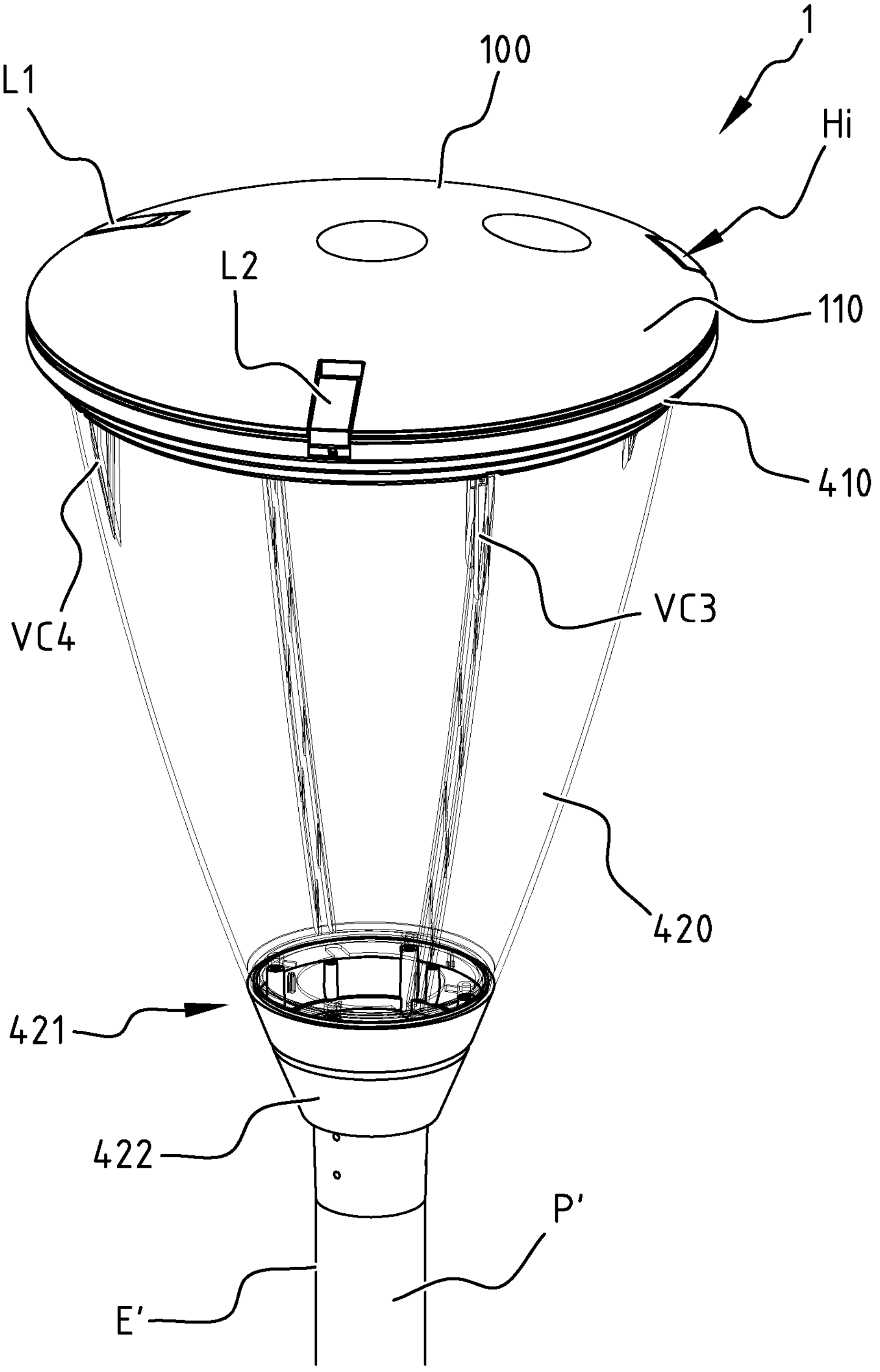
FIGS. 2A-2D respectively illustrate two perspective top views, an exploded view, and a partial cross section of another exemplary embodiment of a luminaire head assembly.
Figure 2B:
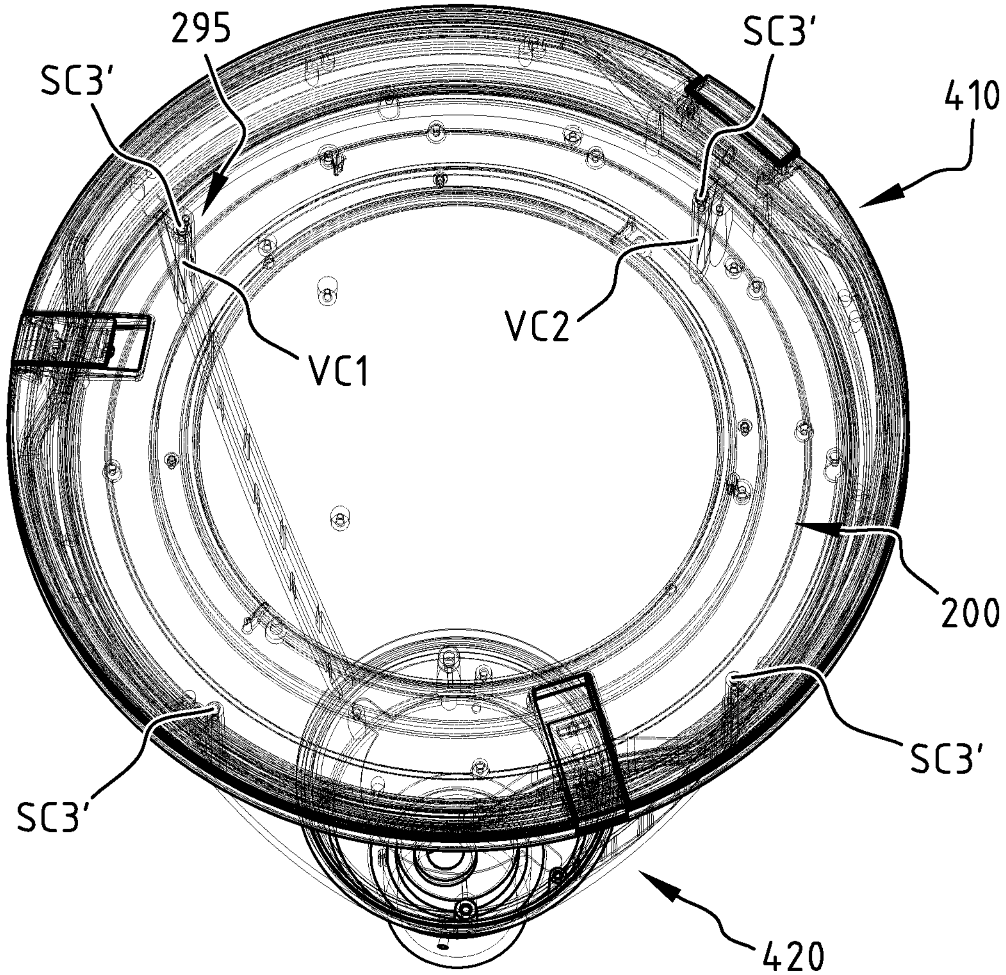
Figure 2C:
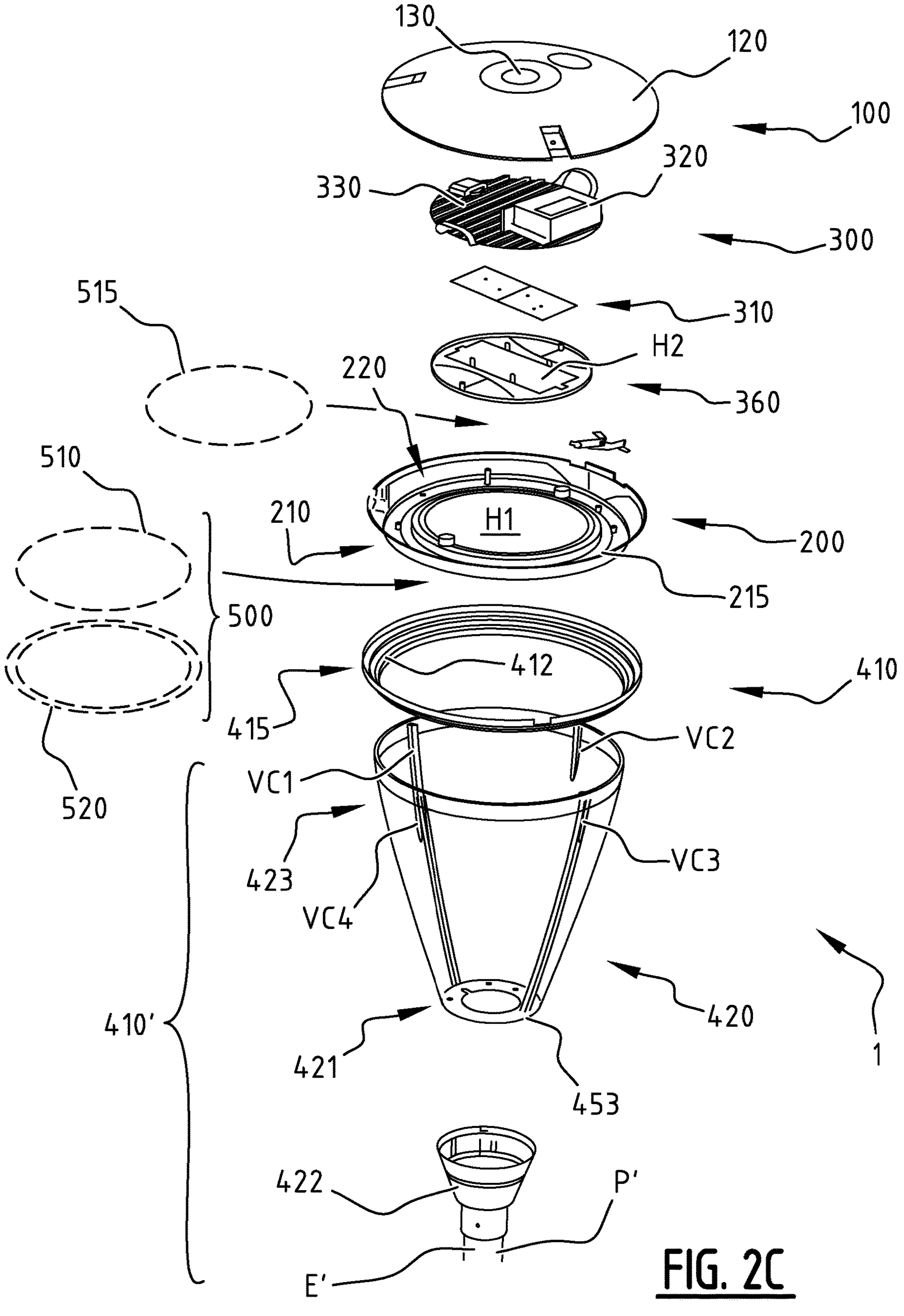

In the embodiment of FIG. 2A-2C, the luminaire head assembly 1 comprises a protection and connection assembly 410' (see FIG. 2C) comprising a light-transmitting protective casing 420 and a connection part 422 configured for connecting a lower end 421 of the protective casing 420 to a pole P'. An upper edge 423 of the protective casing 420 is supported on the lower side 210 of the body 200, within the first peripheral area, and surrounding the through-hole H1 at the lower side 210 of the body 200. The protective casing 420 may comprise a transparent or translucent portion as illustrated in FIGS. 2A-2C, and may be configured to diffuse light emitted by the light source. In this manner, the embodiment of FIGS. 2A-2C corresponds to the above-mentioned post-top configuration of the luminaire head assembly 1.

While in the side-entry configuration the upper cover 100 may be provided with an outwardly protruding portion 120, as illustrated in FIGS. 1A-1E, in the post-top configuration the latter may be replaced with a simple cap 130, as illustrated in FIG. 2C, configured to cover the hole left by the removal of the outwardly protruding portion 120. Also, the upper cover 100 may be closed as illustrated in FIG. 2A. In addition, while in the side-entry configuration the lower cover 500 comprising a transparent or translucent portion 510 and optionally an annular portion 520 is present, as illustrated in FIGS. 1D and 1E, in the post-top configuration the lower cover 500 may be replaced with the protection and connection assembly 410', as illustrated in FIGS. 2A-2C.

Although not illustrated, it should be noted that in other embodiments a protective casing may also be used in the side-entry configuration. In this case, the lower cover 500 may be removed and replaced with a protective casing, as in the post-top configuration, wherein the bottom end of the protective casing may then be closed or provided with a lower cover. In other embodiments, the lower cover and protective casing can be combined, notably in case a color filter is desired and/or if the lower cover is configured as a diffusing or translucent element.

Figure 3A:
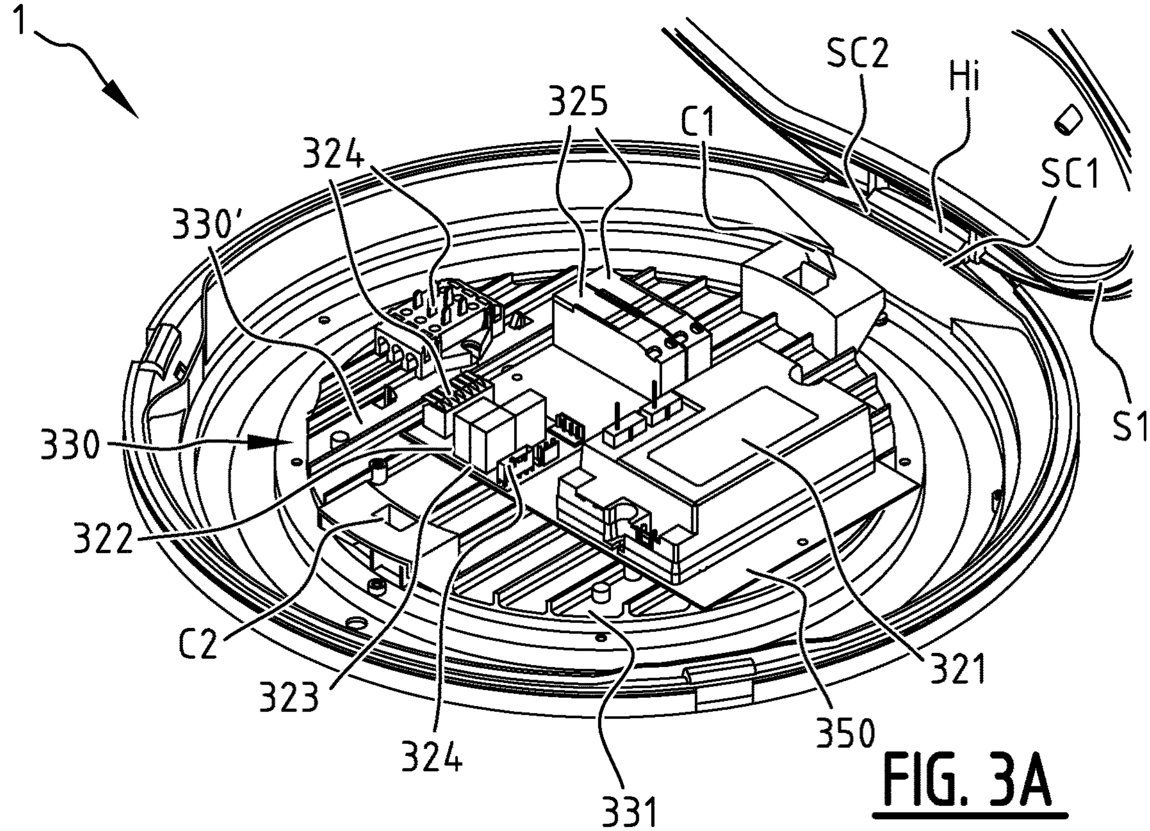
FIGS. 3A and 3B respectively illustrate a perspective view and a bottom view of an exemplary embodiment of a luminaire head assembly.
Figure 3B:
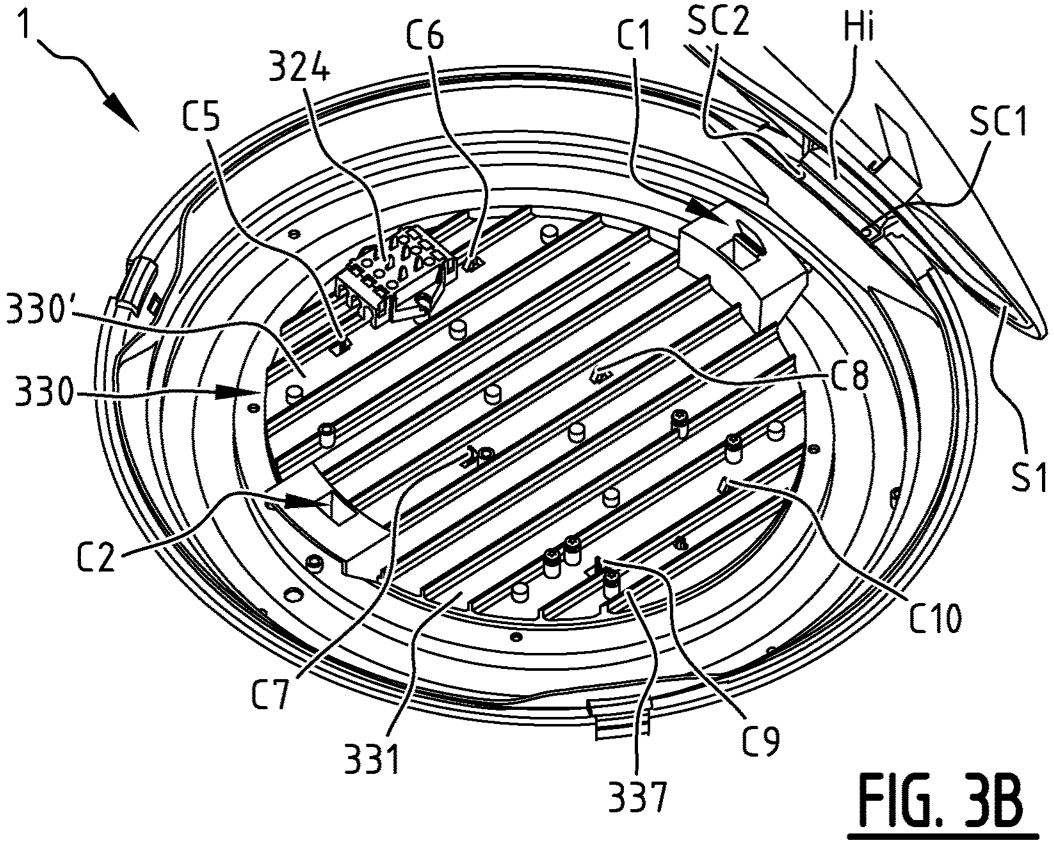
Figure 4A:
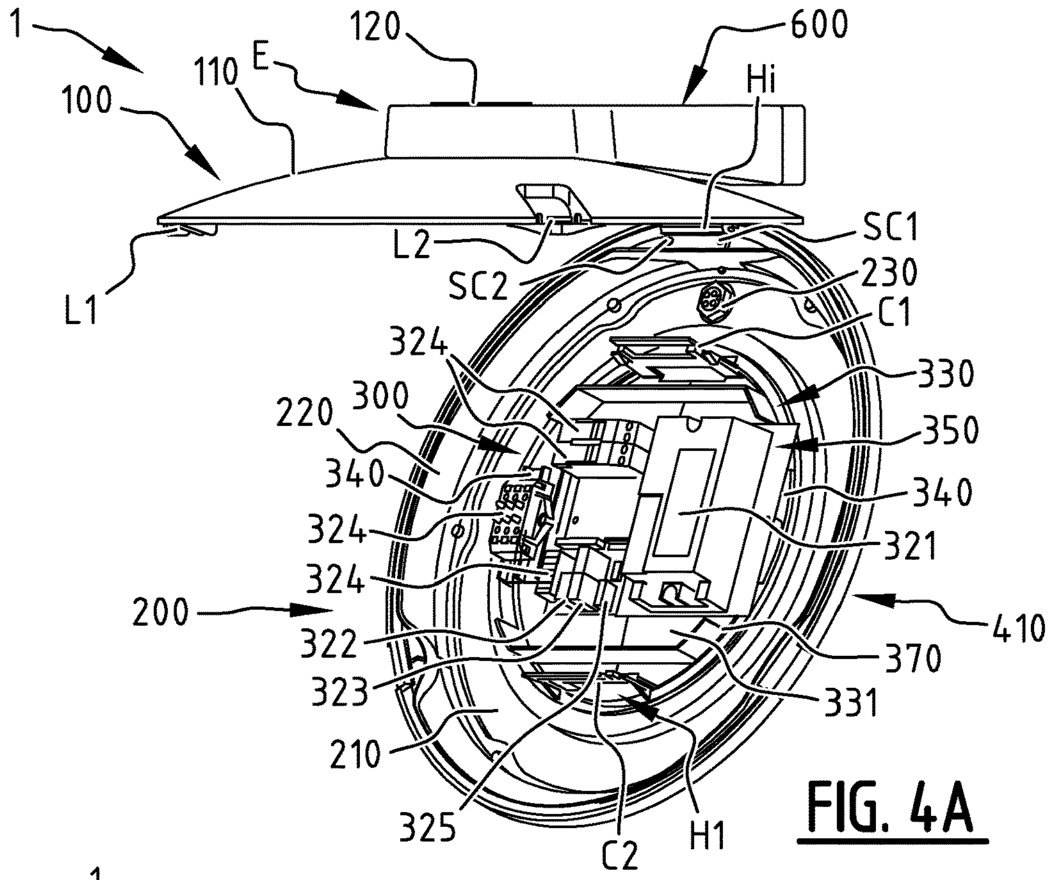
FIGS. 4A and 4B respectively illustrate a perspective view and a bottom view of another exemplary embodiment of a luminaire head assembly.

As illustrated in FIGS. 1C and 2C, the photometric unit 300 comprises a support 330 releasably attached to the lower side 210 of the body 200 in a tool-less manner and typically at least partially extending in the through-hole H1 such that the light source 310 can emit light through the through-hole H1 or such that the light source 310 extends partially in the through-hole H1. The support 330 has an upper portion 331 facing the upper cover 100 and a lower portion 332 opposite the upper portion 331. The electronic assembly 320 is arranged at the upper portion 331 and the light source 310 is arranged at the lower portion 332. The support 330 may be releasably attached to the lower side 210 of the body 200 in a tool-less manner, for example by means of clamps, or clips C1, C2 as illustrated in FIGS. 3A, 3B, and 4A, or quarter-turn screws Q1, Q2 as illustrated in FIGS. 1B-1E. In the embodiment of FIGS. 1A-1F and 2A-2D, the support may function at the same time as a heat sink, a gear plate for supporting the electronic assembly 320 and a support for the light source 310. To improve the heat removal, the support 330 may be provided with ribs 337 or other surface increasing elements.

As illustrated in FIG. 1B, the luminaire head assembly 1 may comprise a seal S1 arranged between the upper cover 100 and the upper side 220 of the body 200. The same seal S1 may be provided in the embodiment of FIGS. 2A-2D between the upper cover 100 and the body 200, see FIG. 2D. In the embodiment of FIGS. 1A-1F, the luminaire head assembly 1 may further comprise a seal S2 arranged around the through-hole H1 of the body 200 between the lower cover 500 and the body 200, see FIG. 1F. As illustrated in FIGS. 1B and 1E, the lower cover 500 may comprise an annular portion 520 releasably attached to the lower side 210 of the body 200. The annular portion 520 may be releasably attached to the lower side 210 of the body 200 by means of any one or more of the following elements: screws, locks, clamps, clips. The transparent or translucent portion 510 may be arranged between the light source 310 and the annular portion 520. The annular portion 520 may be configured to exert a vertical pressure on the transparent or translucent portion 510 when attached to the lower side 210 of the body 200, such that the transparent or translucent portion 510 is sandwiched between the light source 310 and the annular portion 520 in a sealed manner thanks to the presence of the seal S2, see FIG. 1F, between the body 200 and the transparent or translucent portion 510.

Also in the embodiment of FIGS. 2A-2D, optionally a color filter 515 (see FIG. 2C) may be arranged between the light source 310 and the protective casing 420, and in particular between the light source 310 and a lower cover 500 which may be similar to the lower cover 500 of FIG. 1D and which is attached to the body 200. By arranging the color filter 515 in this manner, the color filter can be easily removed or replaced, e.g. with a different color filter for another occasion, by opening the upper compartment (see also FIG. 3A) and removing the photometric unit 300.

Figure 2D:
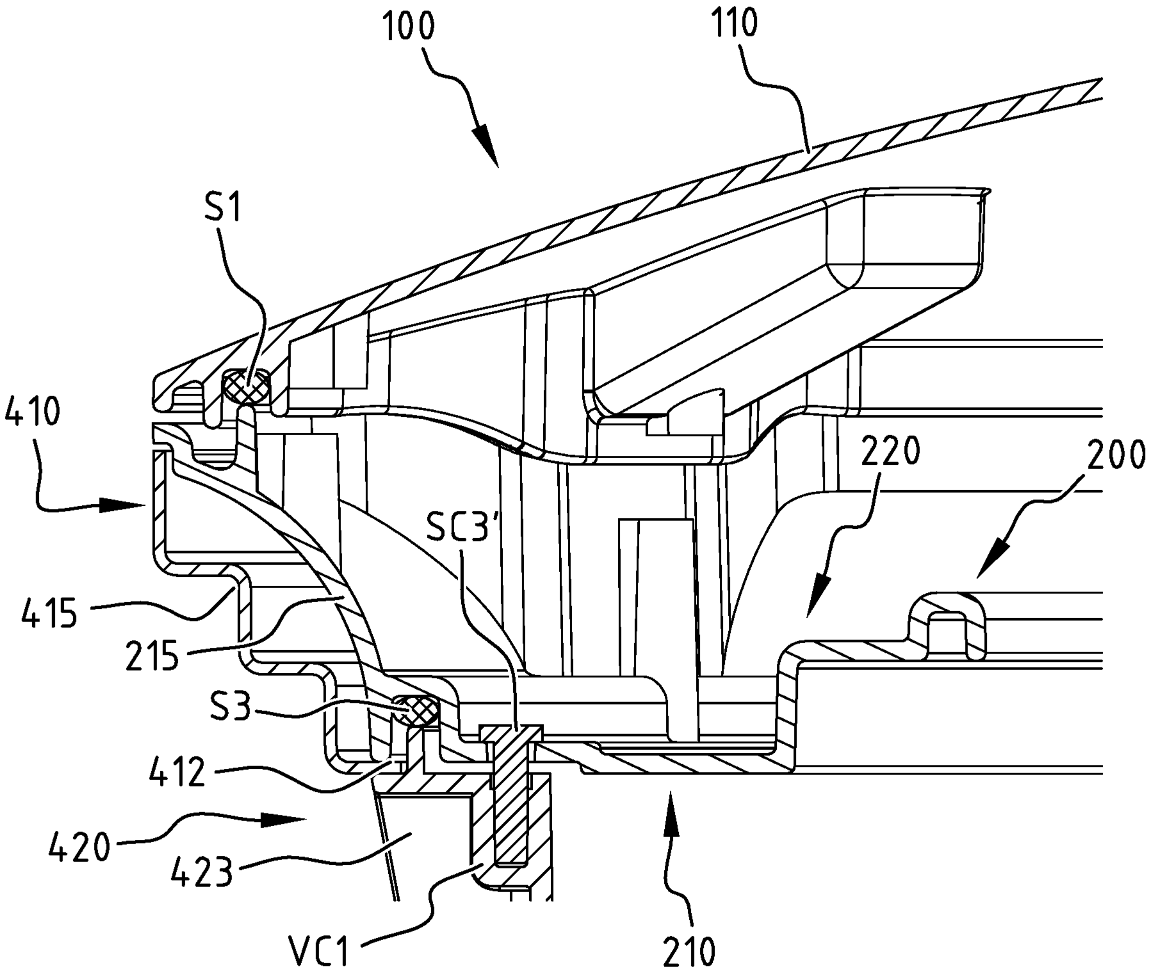

In the embodiment of FIGS. 2A-2D, the protective casing 420 may be releasably attached to the body 200 by means of any one or more of the following elements: screws SC3' as illustrated in FIGS. 2B and 2D, locks, clamps, clips. In this case, an upper end 423 of the protective casing 420 may be provided with threaded holes (see elements VC1, VC2, VC3, VC4 of FIGS. 2A-2C and FIGS. 8A, 8C) extending at the upper edge 423 of the protective casing 420 and configured to receive the screws SC3. Alternatively, the protective casing could be provided with simple holes for screws extending into threaded holes in the body, or bolts extending through holes in the protective casing and through the body and fixed with nuts. If a skirt 410 is present, the skirt 410 may have circumferential flange 412 configured to be fixed between and upper edge of the protective casing 420 and the body 200 without the need for additional screws. Alternatively the skirt 410 may be fixed independently of the protective casing with separate screws.

The screws SC1, SC2, SC3, SC3' may also be replaced with pins, bolts or studs.

A shape of the protective casing 420 may correspond to any one of a substantially conical shape as illustrated in FIGS. 2A-2C, a substantially cylindrical shape, or a combination thereof. The luminaire head assembly 1 may further comprise a seal S3 arranged between the protective casing 420 and the body 200, see FIG. 2D.

In the illustrated embodiment the skirt 410 comprises a peripheral portion 415 extending around a peripheral side 215 of the body 200, but the skirt 410 may also comprise a peripheral portion (not illustrated) extending around an upper portion of the protective casing 410. More generally, the skirt 410 may be adapted to give the luminaire an attractive look without hindering the good operation of the luminaire, in the sense that the skirt 410 may be arranged outside of the sealed compartment containing the light source 310 and may hide standard design components and/or interfaces between different components.

It should be noted that the body 200 and the support 330 of the embodiment of FIGS. 1A-1F may be the same as the body 200 and the support 330 of the embodiment of FIGS. 2A-2D. In other words, the body 200 and support 330 may be the same in a first luminaire head assembly 1 with a skirt 410, and in a second luminaire head assembly 1 with a protection and connection assembly 410', and/or may be the same in a first luminaire head assembly 1 with a bracket 600, and in a second luminaire head assembly 1 with a protection and connection assembly 410', and/or may be the same in a first luminaire head assembly 1 with a first skirt 410, and in a second luminaire head assembly 1 with a second skirt 410 different from the first skirt 410, and/or may be the same in a first luminaire head assembly 1 with a first protection and connection assembly 410', and in a second luminaire head assembly 1 with a second protection and connection assembly 410' different from the first protection and connection assembly 410'. It is further noted that the skirt 410 is optional, and may be omitted both in the embodiment of FIGS. 1A-1F and in the embodiment of FIGS. 2A-2D.

Hence, the body 200 and the support 330 may be the same for a large range of different products. The products can be readily adjusted according to the desire of the customer by selecting a skirt 410 and/or a protection and connection assembly 410' and by selecting the components (light source 310, electronic assembly 320) on the support 330. Further, the products can be readily adjusted for a side-entry configuration or for a post-top configuration of the luminaire head assembly 1 according to the desire of the customer by respectively selecting a lower cover 500 and a bracket 600, or a protection and connection assembly 410'. It is further noted that the body 200 and/or the support 330 may be molded parts, and that since these parts are the same, the manufacturing costs can be significantly reduced.

Figure 4B:
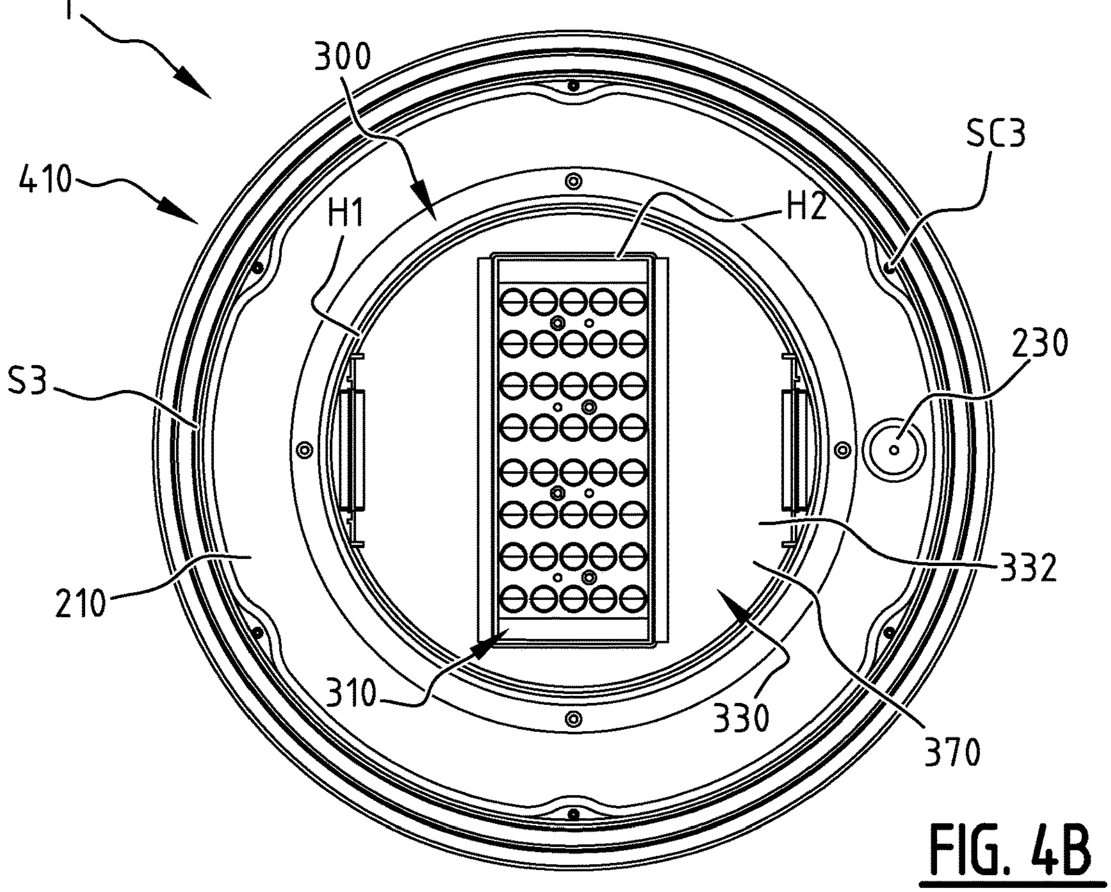

FIGS. 3A-3B respectively illustrate a perspective view and a bottom view of another exemplary embodiment of a luminaire head assembly. FIGS. 4A and 4B respectively illustrate a perspective view and a bottom view of another exemplary embodiment of a luminaire head assembly. The same or similar components of the luminaire head assembly of FIGS. 3A-3B and 4A-4B are indicated with the same reference numeral and will not be described again.

As illustrated in FIGS. 3A, 3B, and 4A, the support 330 may be releasably attached to the lower side 210 of the body 200 in a tool-less manner, for example by means of clamps, or clips C1, C2. As illustrated in FIGS. 3A and 4A, the electronic assembly 320 may comprise a light source driving means 321, surge protection circuitry 322, electrostatic discharge protection circuitry 323, connecting means 324, and a fuse 325. The electronic assembly 320 may comprise further electronic and/or electrical components, such as a light source dimming means (not shown). As illustrated in FIG. 4B, the light source 310 may comprise a plurality of light-emitting diodes (LEDs). In the embodiment of FIG. 4B, the light source 310 comprises 40 LEDs arranged in a two-dimensional array of 8 rows and 5 columns, but other arrangements may be considered, as well as other amounts of LEDs. The light source 310 may be releasably attached to the support 330.

In the embodiments of FIGS. 3A-3B, the support 330 comprises a heat sink 330'. The support 330 comprises a heat sink 330' made of a heat conductive material. The heat sink 330' may be partially in contact with the body 200. The light source 310 may be releasably attached to the support 330 by means of screws, as illustrated in FIG. 3B. A light flux exhauster (not visible, but similar to the flux exhauster of FIGS. 1B-1E) may be releasably attached to the support 330, preferably in a tool-less manner, for example by means of clamps, or clips C5-C10 as illustrated in FIG. 3B, in a similar way as described above for the embodiment of FIGS. 1B-1E. The photometric unit 300 may comprise a gear plate 350 mounted on the heat sink 330', and the electronic assembly 320 may be mounted on said gear plate 350. In other embodiments, the heat sink 330' may be painted in white or in any bright color in order to play the role of the light flux exhauster 360. In this case, the light flux exhauster 360 may be optional, or even removed from the luminaire head assembly 1.

In the embodiment of FIGS. 4A and 4B, the support 330 comprises a heat sink 340. The support 330 comprises a carrier 370 provided with a through-hole H2 (see FIG. 4B). The carrier 370 is releasably attached to the body 200. The heat sink 340 may be releasably attached to the carrier 370, preferably in a tool-less manner, and arranged at the through-hole H2. The carrier 370 of the embodiments of FIGS. 4A and 4B may play the role of the light flux exhauster 360 of the embodiments of FIG. 3A-3B. The heat sink 340 may be releasably attached to the carrier 370 in a tool-less manner by means of clamps, or clips (not shown; see elements C3, C4 in FIG. 5A). The electronic assembly 320 is arranged at an upper portion of the heat sink 340 and the light source 310 is arranged at a lower portion of the heat sink 340 opposite the upper portion. Since the heat sink 340 may be releasably attached to the carrier 370 in a tool-less manner and the light source 310 is arranged at the lower portion of the heat sink 340, the light source 310 may be releasably attached to the support 330 in a tool-less manner. The heat sink 340 may be partially in contact with the body 200. The photometric unit 300 may comprise a gear plate 350 mounted on the heat sink 340, and the electronic assembly 320 may be mounted on said gear plate 350.

It should be clear for the skilled person that the embodiments illustrated in FIGS. 3A-3B, 4A-4B are compatible with both side-entry (FIGS. 1A-1F) and post-top configurations (FIGS. 2A-2D), although the bracket 600 and the outwardly protruding portion 120 are represented in FIG. 4A. As illustrated in FIG. 4B, the luminaire head assembly 1 may further comprise a seal S3 arranged between the protective casing 420 of FIGS. 2A-2D and the body 200.

FIG. 5A-5D respectively illustrate a sectional view, an enlarged sectional view, another sectional view, and another enlarged sectional view of another exemplary embodiment of a luminaire head assembly.

Figure 5A:
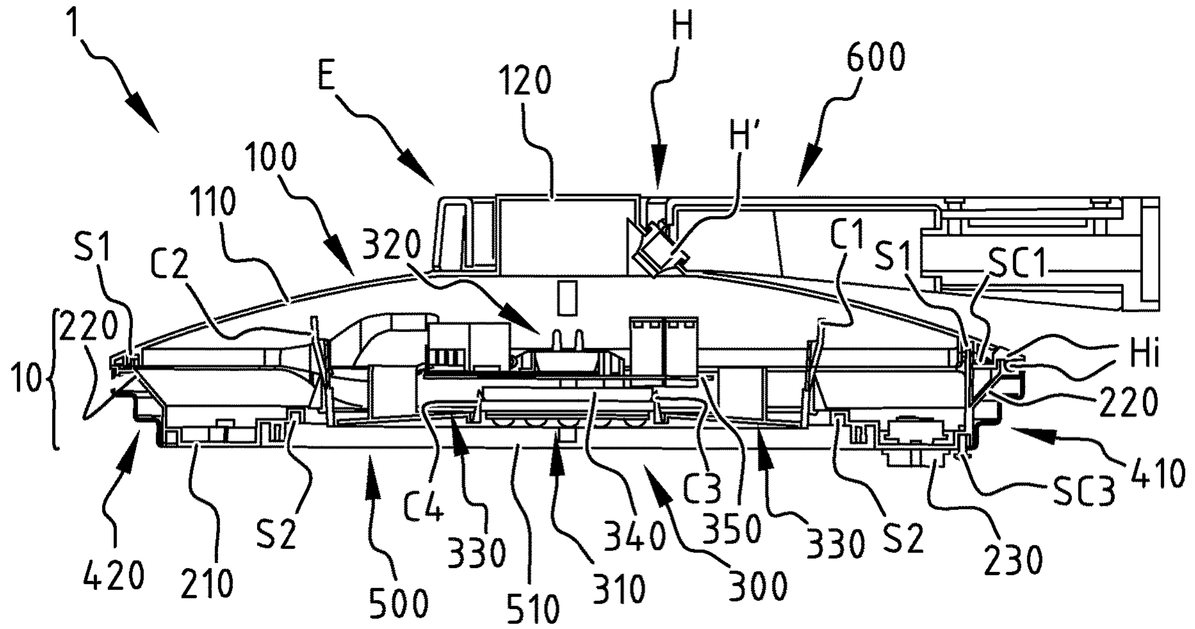
FIG. 5A-5D respectively illustrate a sectional view, an enlarged sectional view, another sectional view, and another enlarged sectional view of an exemplary embodiment of a luminaire head assembly.
Figure 5B:
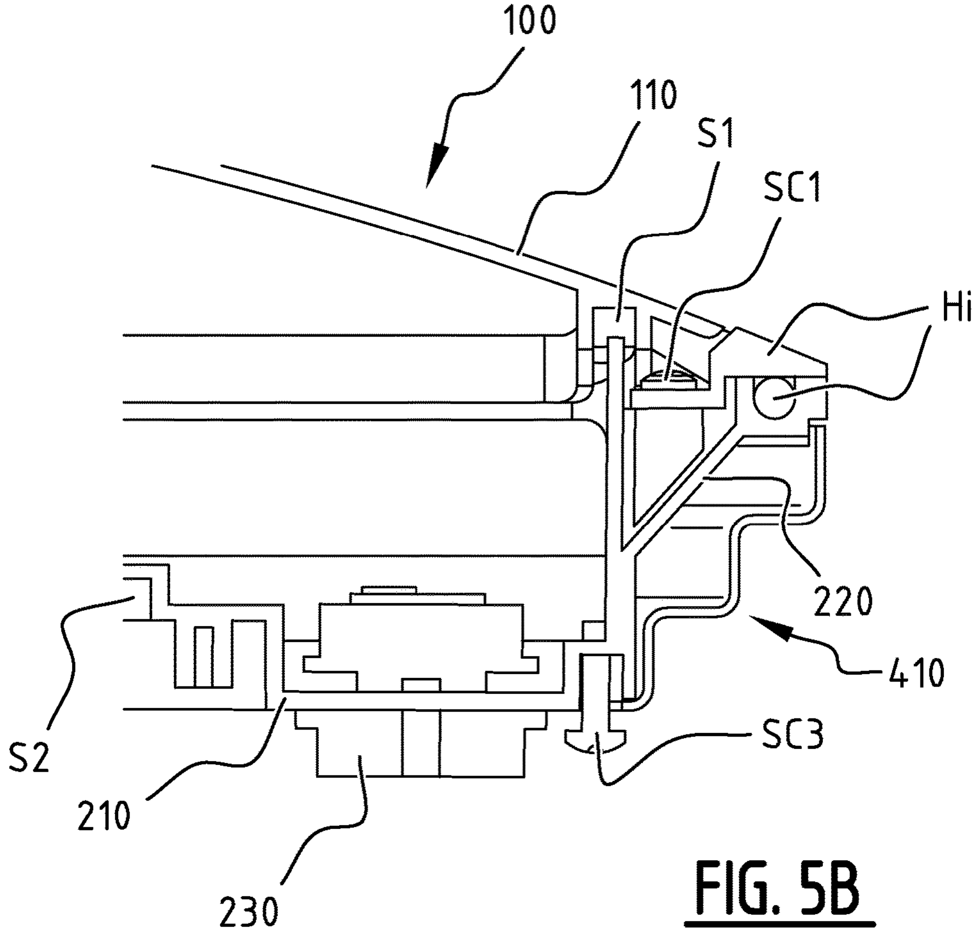

FIGS. 5A and 5B illustrate the luminaire head assembly 1 in a closed position, i.e. in a position where the body 200 and the upper cover 100 are attached at one side by means of a hinge Hi between the upper cover 100 and the body 200 and screws SC1, SC2, and at another side by means of an attachment means, e.g. the latches L1, L2, and define part of a housing 10 enclosing the photometric unit 300. A transparent or translucent lower cover 500 covering the lower side 210 of the body 200, such as the lower cover 500 illustrated in FIGS. 1E-1F, may form the housing 10 together with the body 200 and the upper cover 100, in which the photometric unit 300 comprising the electronic assembly 320 and the light source 310 are arranged.

Figure 5C:
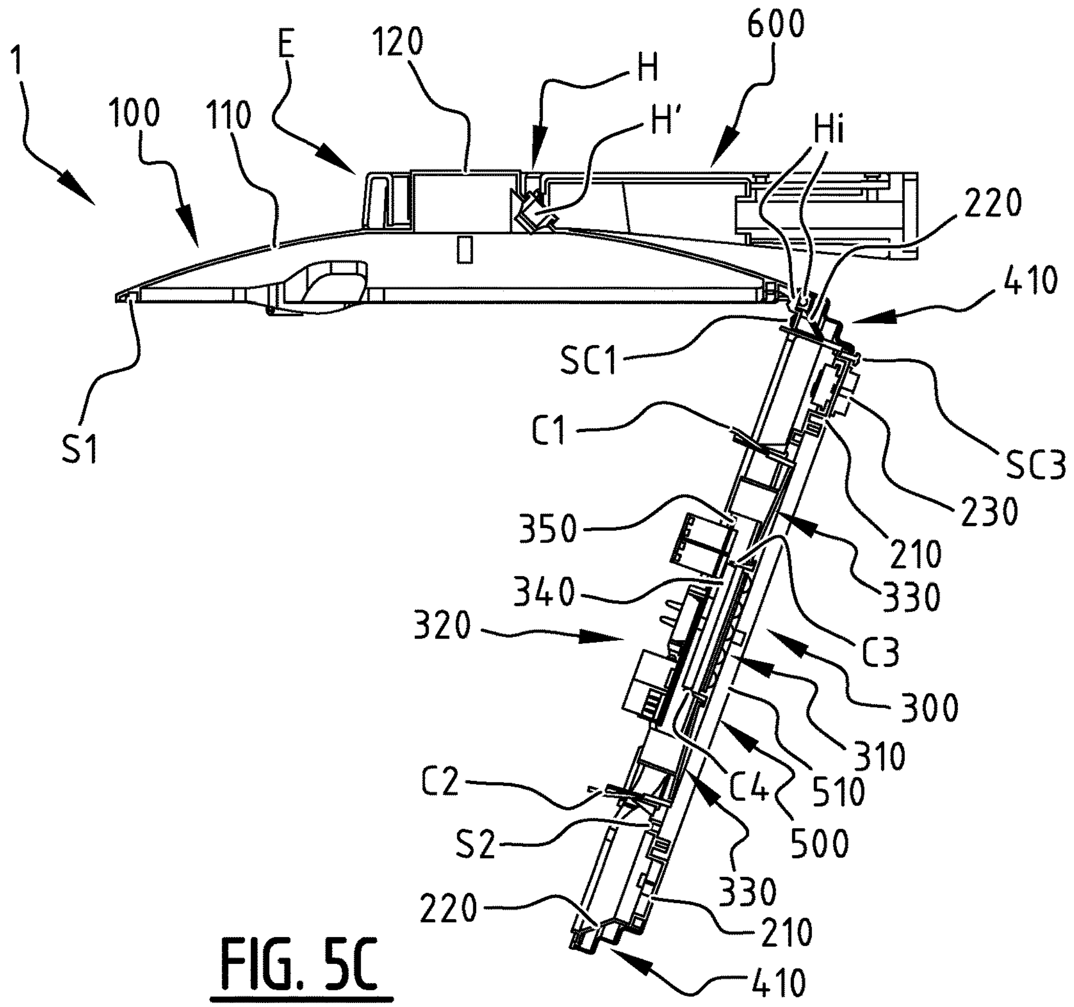
Figure 5D:
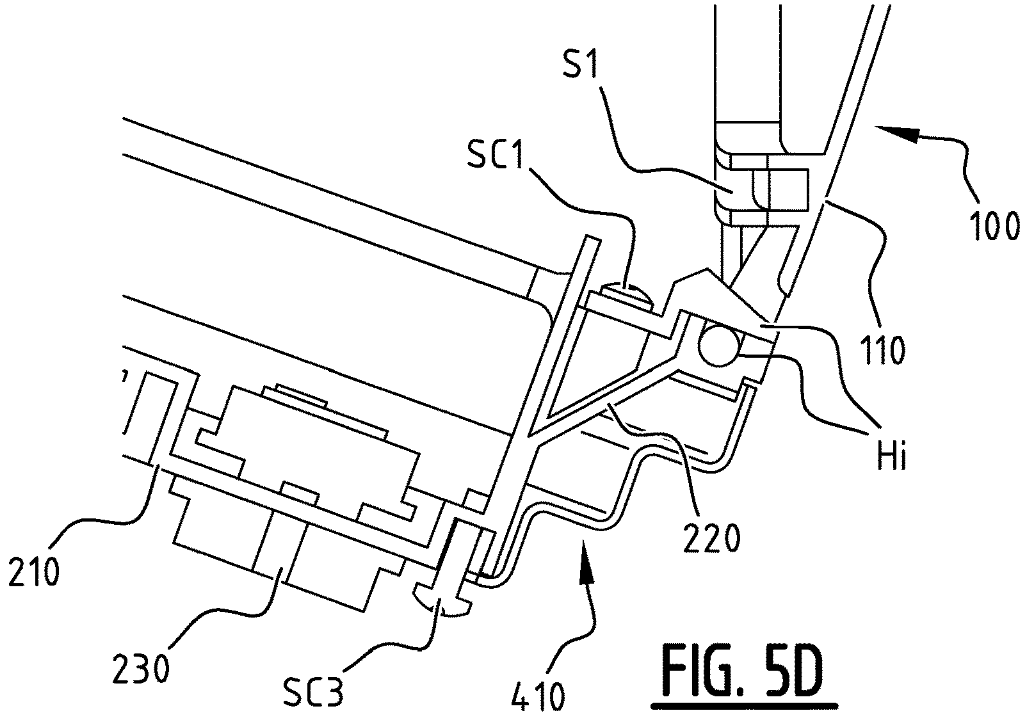

By contrast, FIGS. 5C and 5D illustrate the luminaire head assembly 1 in an open position, i.e. in a position where the body 200 and the upper cover 100 are attached only at one side by means of the hinge H1 between the upper cover 100 and the body 200 and the screws SC1, SC2.

The embodiment illustrated in FIGS. 5A-5D corresponds to the embodiment of FIGS. 4A and 4B. Hence, the configuration and arrangement of the luminaire head assembly 1 discussed above with respect to FIGS. 4A and 4B apply to the luminaire head assembly 1 of FIGS. 5A-5D and will not be repeated here.

The lower side 210 of the body 200 may be configured to receive at least one of a socket 230 as illustrated in FIGS. 5A-5D, an antenna, a sensor. The sensor may be a light sensor configured for sensing a signal relating to ambient light levels. The antenna may then be configured for treating signals received from the light sensor and for communicating those treated signals. Apart from a light sensor, various other sensors may be present, such as an image sensor (e.g. a camera), an audio sensor, an air quality sensor, a motion sensor, an environmental sensor sensing e.g. temperature, visibility, vibration, humidity, etc. The antenna may then be further configured to use and/or transmit the data sensed by one or more of those additional sensors. The antenna may or may not be highly directional. Also omnidirectional antennas may be used. The antenna may be any type of antenna, such as an RF antenna, a Bluetooth antenna, a near field communication antenna, etc. Also, there may be provided a plurality of antennas. The socket 230 may establish a connection with the electronic assembly 320 using one or more wired communication protocols such as Communication Area Network (CAN), Digital Addressable Lighting Interface (DALI), Universal Asynchronous Receiver-Transmitter (UART), 1-10V, I2C, RS485, USB, Ethernet, Local Interconnect Network (LIN), an analogue communication protocol such as an analog 4-20 mA current loop protocol used for electronic signaling. The socket 320 may then be used to receive and/or send at least one input and/or output signal using said one or more wired communication protocols. In other embodiments, it may also be possible to use wireless communication protocols, such as EnOcean, Bluetooth Low Energy (BLE), ZigBee control, NFC (Near Field Communication), Sigfox, Narrow-Band Internet of Things (NB-IoT), LoRaWAN, Li-Fi control, Low-Power Wide-Area Network (LPWAN), but this is generally not preferred.

Figure 6A:
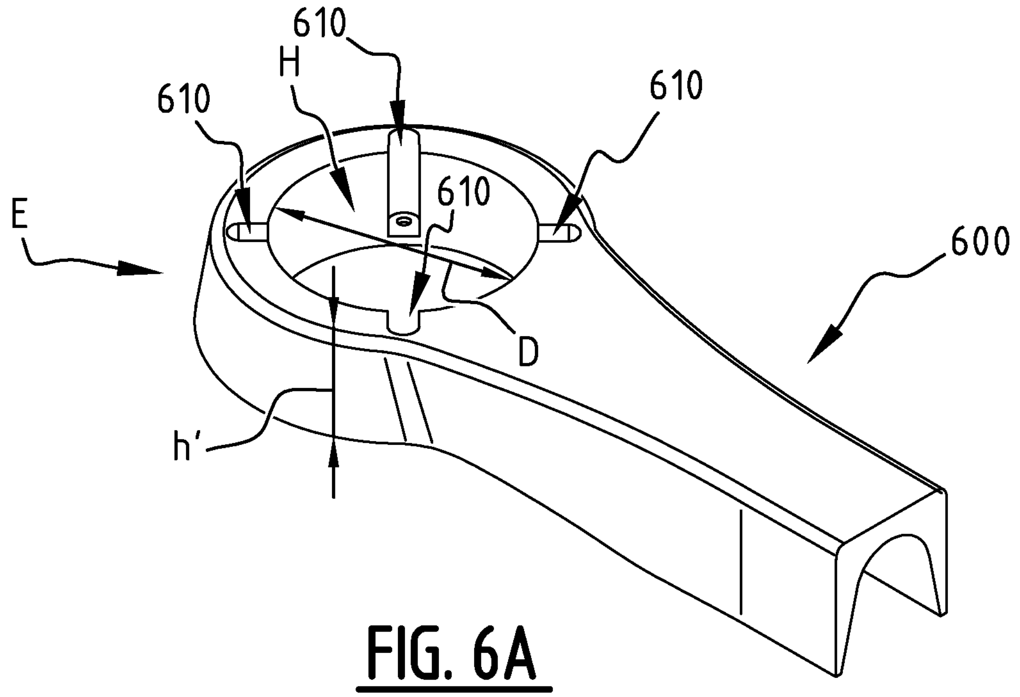
FIGS. 6A-6D respectively illustrate a perspective top view of a bracket, a perspective top view of an exemplary embodiment of a luminaire head assembly provided with a socket assembly, a perspective top view of a socket assembly, and schematic view of an external module connected to an exemplary embodiment of a luminaire head assembly provided with a socket assembly.
Figure 6B:
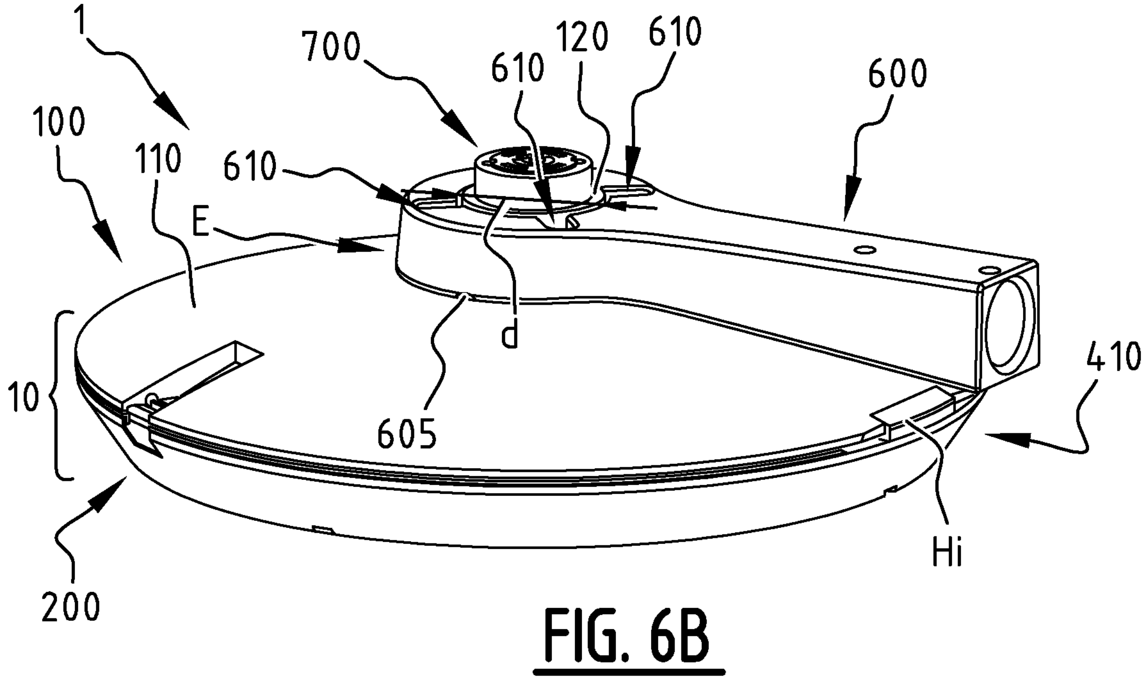
Figure 6C:
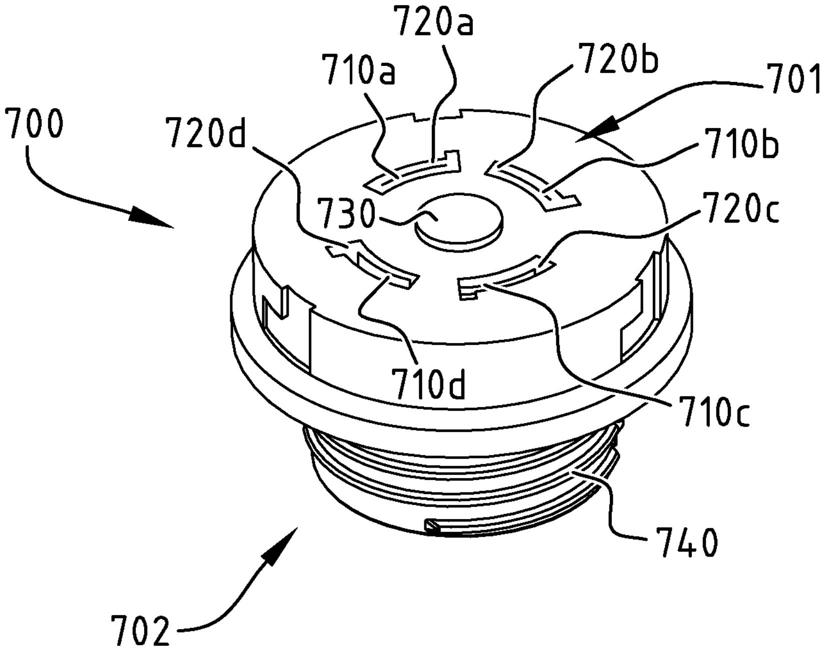
Figure 6D:
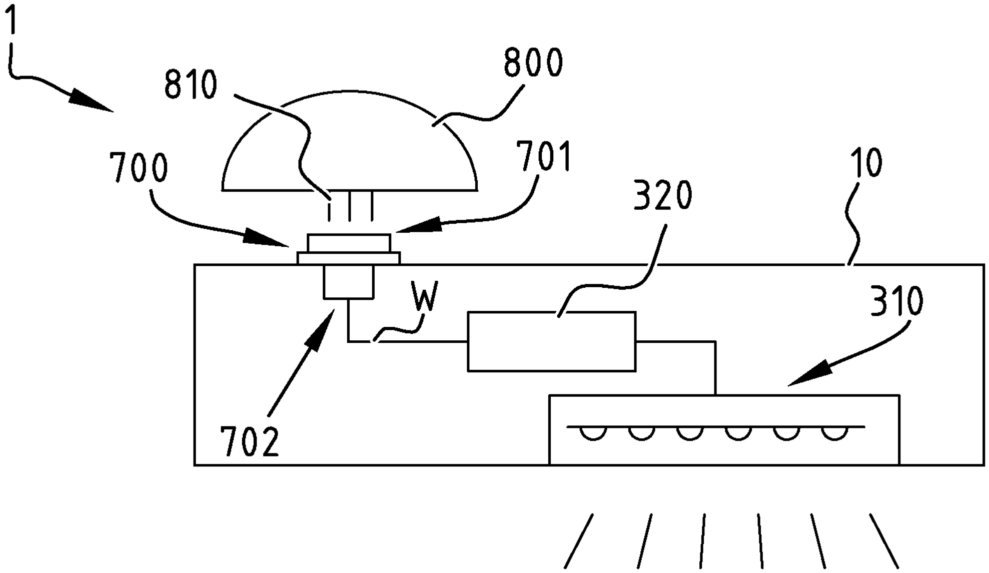

FIGS. 6A and 6B respectively illustrate a perspective top view of a bracket, a perspective top view of an exemplary embodiment of a luminaire head assembly provided with a socket assembly. FIGS. 6C and 6D respectively illustrate a perspective top view of a socket assembly, and schematic view of an external module connected to an exemplary embodiment of a luminaire head assembly provided with a socket assembly.

As illustrated in FIGS. 6B and 6D, the luminaire head assembly 1 comprises a housing 10 provided with a socket assembly 700 (see also FIG. 6C), a light source 310 (see FIG. 6D) arranged in the housing 10, and a bracket 600 (see FIG. 6B) releasably attached to the housing 10, the bracket 600 being configured to fix the housing 10 to a pole (not shown; see element P of FIGS. 9B-9F). As illustrated in FIG. 6A, the bracket 600 is provided with a through-hole H at an end E thereof. As illustrated in FIG. 6B, the socket assembly 700 extends at least partially in said through-hole H. The housing 10 may be defined by the body 200, the upper cover 100, and the lower cover 500 of the embodiments of FIGS. 1A-1F, as illustrated in FIG. 6B, or by the body 200, the upper cover 100, and the protective casing 420 of the embodiments of FIGS. 2A-2D. However, it should be clear for the skilled person that the housing 10 is not limited thereto, as schematically illustrated in FIG. 6D. The housing 10 encloses the light source 310. The housing 10 may also enclose other components, such as electronic assembly 320 for driving the light source and/or performing controlling tasks. The light source 310 may correspond to the light source 310 of any one of the previous embodiments.

As illustrated in FIG. 6B, the housing 10 has a top surface 110, and the socket assembly 700 is provided at the top surface 110. The end E of the bracket 600 is releasably attached to a portion of the top surface 110. In this manner, the embodiment of FIG. 6B corresponds to the side-entry configuration of the luminaire head assembly 1. The end E of the bracket 600 is provided with four channels 610 configured to receive fastening means for fixing the bracket 600 to the housing 10. It should be clear for the skilled person that the number and/or shape of channels 610 may vary in other embodiments, and that the bracket 600 may also be fixed in a different manner.

As illustrated in FIG. 6B, the housing 10 is provided with an outwardly protruding portion 120 extending at least partially in the through-hole H and configured to receive the socket assembly 700. The outwardly protruding portion 120 may correspond to the outwardly protruding portion 120 illustrated in FIGS. 1A-F, 5A, and 5C. A height h (see FIG. 1A) of the outwardly protruding portion 120 may be substantially equal to a height h' (see FIG. 6A) of the bracket 600. A shape of the outwardly protruding portion 120 may correspond to a substantially cylindrical shape as illustrated in FIG. 1A, but is not limited thereto. Although a cylindrical shape is preferred, in other embodiments said shape may be substantially conical, rectangular, or square. Similarly, a shape of the through-hole H may correspond to a substantially cylindrical shape as illustrated in FIG. 6A, but is not limited thereto. Although a cylindrical shape is preferred, in other embodiments said shape may be substantially conical, rectangular, or square. A diameter d of the outwardly protruding portion 120 may be e.g. larger than 80% of a diameter D of the through-hole H, preferably larger than 90% of said diameter D, as illustrated in FIGS. 6A and 6B. Preferably, the diameter d of the outwardly protruding portion 120 is smaller than 99% of a diameter D of the through-hole H. Further, as shown in FIG. 6B, channels or passage 605 may be provided through the end of the bracket in order to evacuate water from the through-hole H. Such drainage channels or passages 605 are preferably provided at a lower side of the bracket, and extend from the through-hole H to an outer periphery of the bracket.

The housing 10 may be provided with a hole H', said hole H' being configured to pass a cable from the bracket 600 to an inner space of the housing 10. As in the embodiment of FIGS. 1A-1F, the outwardly protruding portion 120 may be provided with the hole H' at a lateral surface thereof. In a preferred embodiment illustrated in FIG. 1A, the outwardly protruding portion 120 comprises a cylindrical portion 121 and an adjoining cable guidance portion 122 provided with the hole H'. The cable guidance portion 122 may comprise an cable entrance surface 123 which is inclined with respect to the upper surface 110 of the upper cover 100. The cable may be connected directly or indirectly to the socket assembly 700.

As mentioned before, the housing 10 may comprise an upper cover 100 and a body 200 which carries a photometric unit 300 comprising the light source 310 and an electronic assembly 320. The body 200 may be provided with a through-hole, and may be releasably attached to the upper cover 100. The photometric unit 300 may be releasably attached to the body 200 in a tool-less manner. The electronic assembly 320 may comprise any one or more of the following: a light source driving means, a light source dimming means, surge protection circuitry, electrostatic discharge protection circuitry, connecting means, a fuse. The socket assembly 700 may be connected directly, as illustrated in FIG. 6D, or indirectly to the electronic assembly 320. As in the embodiment of FIGS. 5A-5D, the body 200, in particular the lower side 210 of the body 200, may be configured to receive at least one of a socket 230, an antenna, a sensor. The types of socket 230, antenna, and sensor discussed in connection with FIGS. 5A-5D apply to the embodiment of FIGS. 6A-6D.

Although not illustrated in FIGS. 6A-6D, the luminaire head assembly 1 may further comprise a protective casing 420 releasably attached to the body 200, as in the embodiment of FIGS. 2A-2D. The protective casing 420 may comprise a transparent or translucent portion. A shape of the protective casing 420 may correspond to any one of a substantially conical shape, a substantially cylindrical shape, or a combination thereof. The protective casing 420 may be releasably attached to the body 200 by means of any one or more of the following elements: screws, locks, clamps, clips.

As illustrated in FIGS. 6C and 6D, the socket assembly 700 has a front side 701 and a rear side 702. Although FIG. 6C shows schematically a socket assembly more or less according to the Zhaga standard, it is noted that the socket assembly 700 may be in accordance with the NEMA standard (the ANSI C136.10-2017 standard or of the ANSI C136.41-2013 standard), or with the Zhaga standard (see LEX-R in book 18, Edition 1.0, July 2018). The front side 701 may be configured for receiving electrical contacts of an external module 800 (see FIG. 6D). The external module 800 may be configured to cooperate with such socket assemblies. The rear side 702 is intended for being electrically connected to the electronic assembly 320. The socket assembly 700 may house a plurality of contacts 710*a-d* in apertures 720*a-d* arranged in the front side 701. Each contact 710*a-d* may be provided, at a front end, with a front contact portion configured for being electrically connected with a contact of the external module 800, e.g. a prong 810 (see FIG. 6D), and, at a rear end, with at least one wire W (see FIG. 6D) is fixed. The front contact portions of the plurality of contacts 710*a-d* extend near the front side 701.

The plurality of contacts 710*a-d* may extend substantially along a first cylindrical surface around a central axis of the socket assembly 700. The front side 701 may be provided with a central recess 730 configured for receiving a central pin of the external module 800, preferably in accordance with the above-mentioned Zhaga standard. Optionally, the socket assembly 700 comprises an RFID tag (not shown), preferably at the front side 701. Other components may be included in the socket assembly 700, such as wireless communication means, sensor means, an antenna, protection circuitry, etc. The rear side 702 may be provided with a screw-thread 740. The housing 10, in particular the outwardly protruding portion 120, may further comprise a nut (not shown) configured to be screwed on the screw-thread 740.

Preferably, the plurality of contacts 710*a-d* comprises: at least one receptacle contact for carrying power signals, and/or at least one receptacle contact for carrying data or control signals, and/or at least one receptacle contacts for carrying a power signal and a data or control signal. For example, contact 710*b* may be a DC power supply (e.g. 24 V), contact 710*c* may be a positive pole for a dimming protocol (e.g. DALI), contact 710*a* may be a general digital I/O (e.g. greater than 7 V), and contact 710*d* may be at the same time a negative pole for the dimming protocol, a ground for the power supply, a ground for the general digital I/O.

More generally, the plurality of receptacle contacts may comprise at least one receptacle contact for carrying a power signal and/or at least one receptacle contact for carrying a data or control signal and/or at least one receptacle contact for carrying both a power signal and a data or control signal. In an exemplary embodiment, the plurality of receptacle contacts comprises at least three receptacle contacts for carrying power signals and/or at least two receptacle contacts for carrying data or control signals. In another exemplary embodiment, the plurality of receptacle contacts comprises one receptacle contact for carrying a power signal, one receptacle contact for carrying a power signal as well as a data/control signal, and/or at least two receptacle contacts for carrying data or control signals. It is noted that the at least two power signals may comprise DC and/or AC signals. For example, a DC power supply signal may be transferred through the receptacle, wherein there is provided a first DC terminal contact for a positive DC voltage (e.g. a 24V DC signal) and a second DC terminal contact for a ground connection (wherein optionally the ground connection may also be used as a ground terminal for a data or control signal). Such an embodiment may be conforming the Zhaga standard mentioned above. Alternatively or in addition, an AC power supply signal (e.g. a 230V AC signal to feed a driver of a luminaire) may be transferred through the receptacle, wherein there is provided a first, second and third AC terminal contact for a three-phase AC signal. Such an embodiment may be conforming the NEMA standards mentioned above.

Figure 7A:
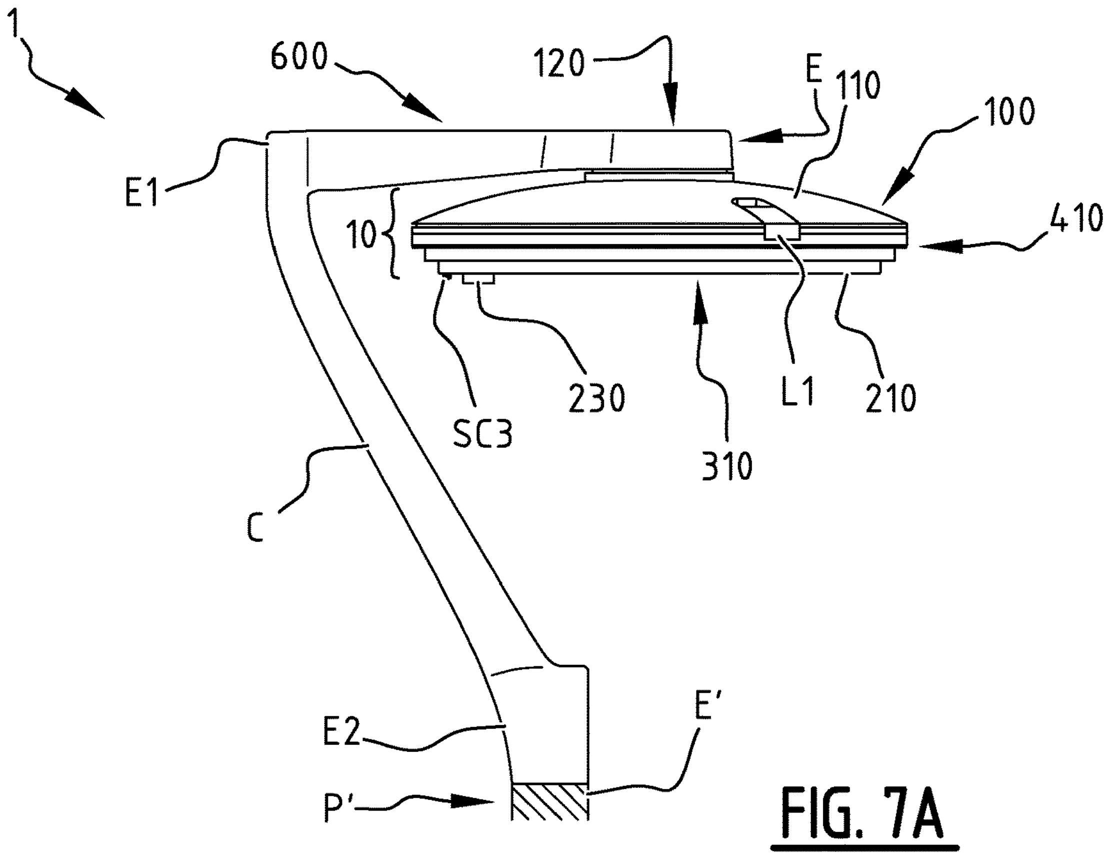
FIGS. 7A and 7B respectively illustrate two front views of another exemplary embodiment of a luminaire head assembly.
Figure 7B:
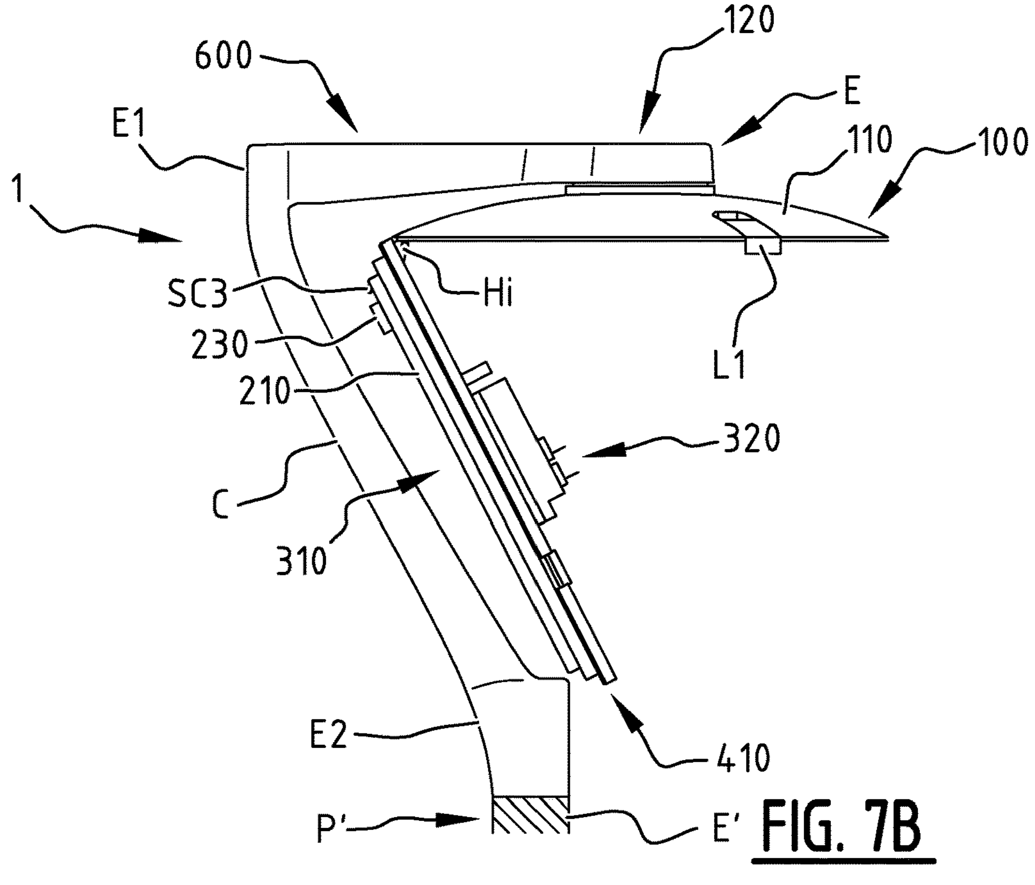

FIGS. 7A and 7B respectively illustrate two front views of another exemplary embodiment of a luminaire head assembly.

FIG. 7A illustrates the luminaire head assembly 1 in a closed position, i.e. in a position where the body 200 and the upper cover 100 are attached at one side by means of a hinge Hi between the upper cover 100 and the body 200 and e.g. screws, and at another side by means of an attachment means, e.g. the latches L1, L2, and define part of a housing 10 enclosing the photometric unit 300. The lower cover 500 as illustrated in FIGS. 1E and 1F may form the housing 10 together with the body 200 and the upper cover 100, in which the electronic assembly 320 and the light source 310 are arranged.

By contrast, FIG. 7B illustrates the luminaire head assembly 1 in an open position, i.e. in a position where the body 200 and the upper cover 100 are attached only at one side by means of the hinge Hi between the upper cover 100 and the body 200 and e.g. the screws.

The embodiment illustrated in FIGS. 7A and 7B corresponds to the embodiment of FIGS. 1A-1F. Hence, the configuration and arrangement of the luminaire head assembly 1 discussed above with respect to FIGS. 1A-1D apply to the luminaire head assembly 1 of FIGS. 7A and 7B and will not be repeated here. Moreover, the bracket 600 illustrated in FIGS. 7A and 7B corresponds to the bracket illustrated in FIGS. 6A and 6B. Hence, the configuration and arrangement of the bracket 600 discussed above with respect to FIGS. 6A and 6B apply to the bracket 600 of FIGS. 7A and 7B and will not be repeated here.

The luminaire head assembly 1 of FIGS. 7A and 7B may be included in a luminaire comprising said luminaire head assembly 1 and a pole P'. As illustrated in FIGS. 7A and 7B, the bracket 600 is releasably attached to the housing 10, and is configured to fix the housing 10 to the pole P'. The bracket 600 is provided with a through-hole (not shown; see FIG. 6A) at an end E thereof, and the housing 10 is provided with an outwardly protruding portion 120 extending at least partially in the through-hole. At an end opposite said end E, the bracket 600 is fixed to a pole connector C. The pole connector has a first end E1 where the bracket 600 is fixed to the pole connector C, and a second end E2 opposite said first end E1. The pole connector C is fixed to a top end E' of the pole P' at said second end E2. Hence, the pole connector C is configured to use the luminaire head assembly 1 in the side-entry configuration together with a vertical pole P', i.e. with a pole P' suitable for the post-top configuration. In other words, the pole connector C enables a "hybrid" configuration made from a combination of features of the side-entry configuration and of the post-top configuration of a luminaire. A shape of the pole connector C may enable an opening of the housing 10 that is convenient for a user or an operator, as illustrated in FIG. 7B. For example, a length of the pole connector C may be substantially the same as a diameter of the body 200.

Although not illustrated in FIGS. 7A and 7B, the luminaire head assembly 1 may further comprise a protective casing 420 releasably attached to the body 200, as in the embodiment of FIGS. 2A-2C. The protective casing 420 may comprise a transparent or translucent portion. A shape of the protective casing 420 may correspond to any one of a substantially conical shape, a substantially cylindrical shape, or a combination thereof. The protective casing 420 may be releasably attached to the body 200 by means of any one or more of the following elements: screws, locks, clamps, clips.

FIGS. 8A-8I respectively illustrate several front views, an enlarged front view, and five detailed front views of yet another exemplary embodiment of a luminaire head assembly.

As illustrated in FIGS. 8A-8D, the luminaire head assembly 1 comprises a base 200 comprising a light source 310, a protective casing 420 releasably attached to the base 200 and comprising a transparent or translucent portion, and a diffusor body 430 arranged in the protective casing 420. The diffusor body 430 comprises a wire frame 440 and/or a ribbed frame 450.

The base 200 may correspond to the body 200 of the embodiments of FIGS. 1A-7B, but is not limited thereto. The luminaire head assembly 1 may further comprise an upper cover 100. The base 200 may be releasably attached to the upper cover 100. The upper cover 100 may correspond to the upper cover 100 of FIGS. 1A-1F, i.e., to an upper cover suitable for the side-entry configuration of the luminaire head assembly 1, or may correspond to the upper cover 100 of FIGS. 2A-2D, i.e., to an upper cover suitable for the post-top configuration of the luminaire head assembly 1. In other words, the upper cover may be provided with an outwardly protruding portion 120 as illustrated in FIGS. 1A-1F, or may be provided with a cap 130 as illustrated in FIGS. 2A-2D. The base 200 may be configured to receive at least one of a socket (not shown; see element 230 of FIGS. 5A-5D), an antenna, a sensor. The outwardly protruding portion 120 may be configured to receive a socket assembly 700, as illustrated in FIGS. 6A-6D. Alternatively, when the upper cover 100 is not provided with an outwardly protruding portion 120, e.g. in the post-top configuration of the luminaire head assembly 1, the socket assembly 700 may be received on a top surface 110 of the upper cover 100 (see FIG. 8C). The luminaire head assembly 1 may further comprise a skirt 410 releasably attached to the base 200. The skirt 410 may surround the base 200.

Figure 8A:
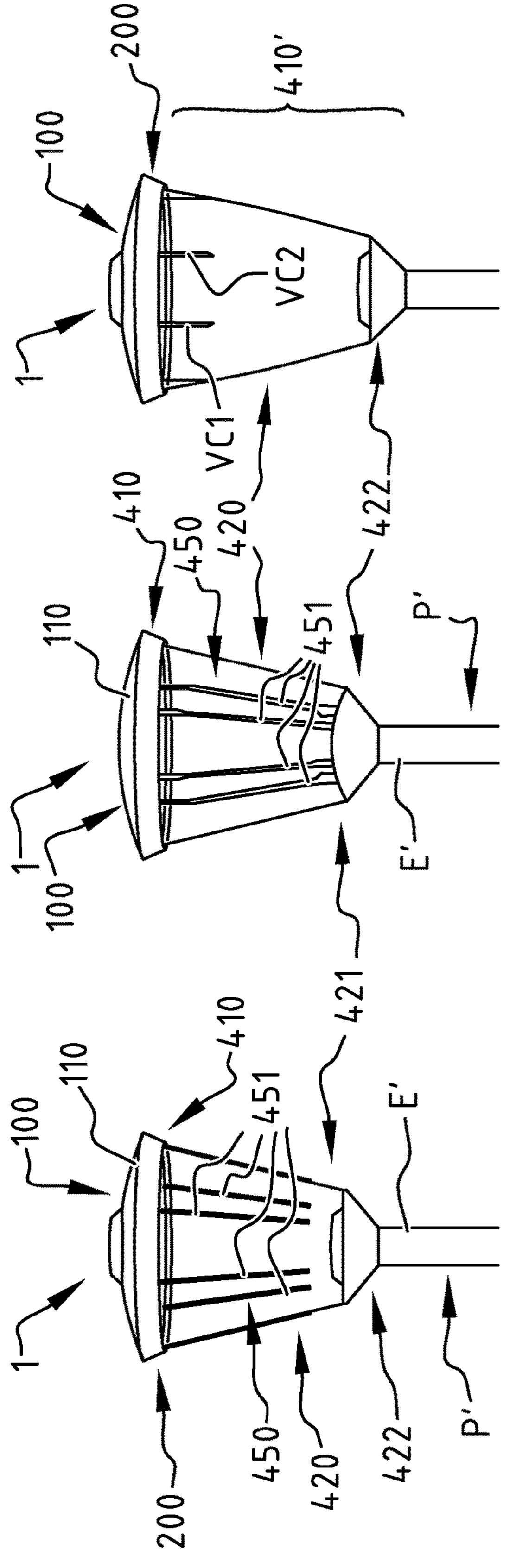
FIGS. 8A-8I respectively illustrate several front views, an enlarged front view, and five detailed front views of yet another exemplary embodiment of a luminaire head assembly.
Figure 8B:
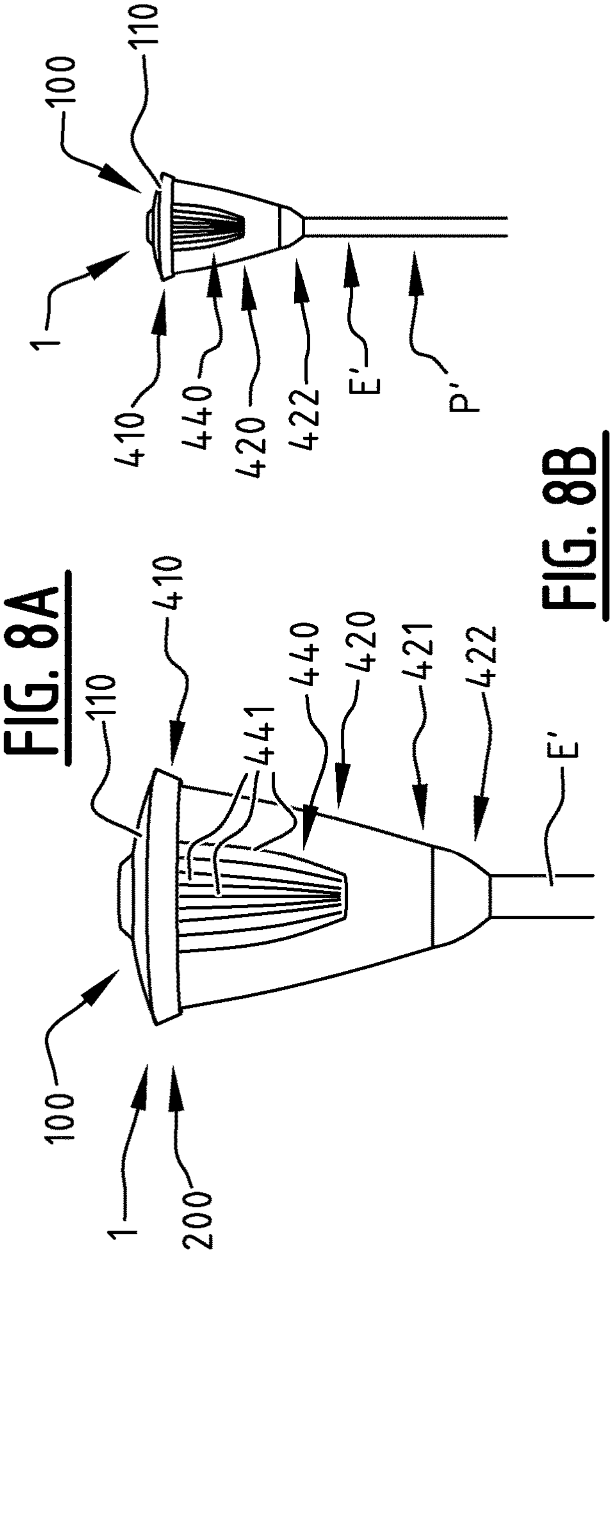
Figure 8C:
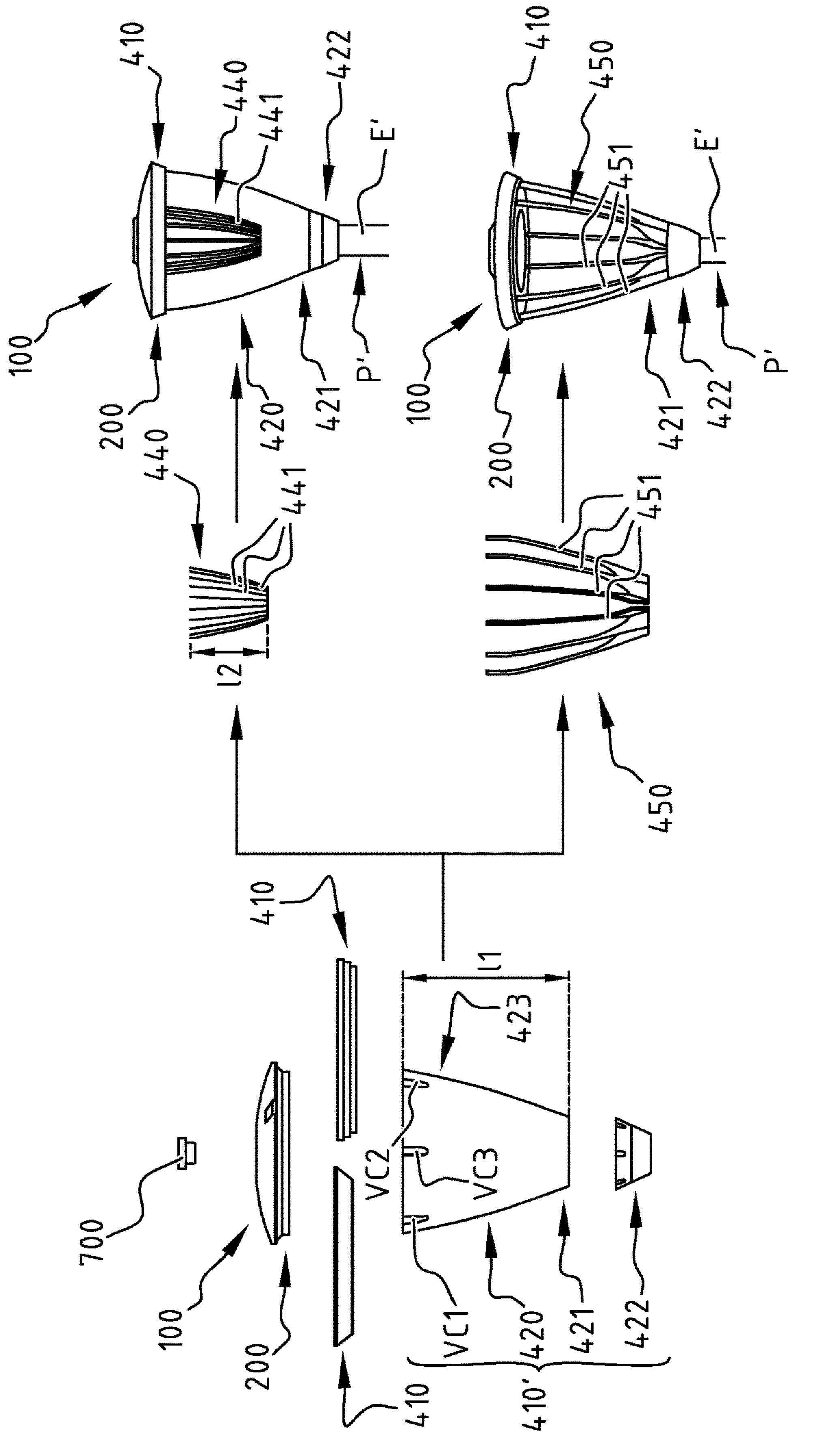
Figure 8D:
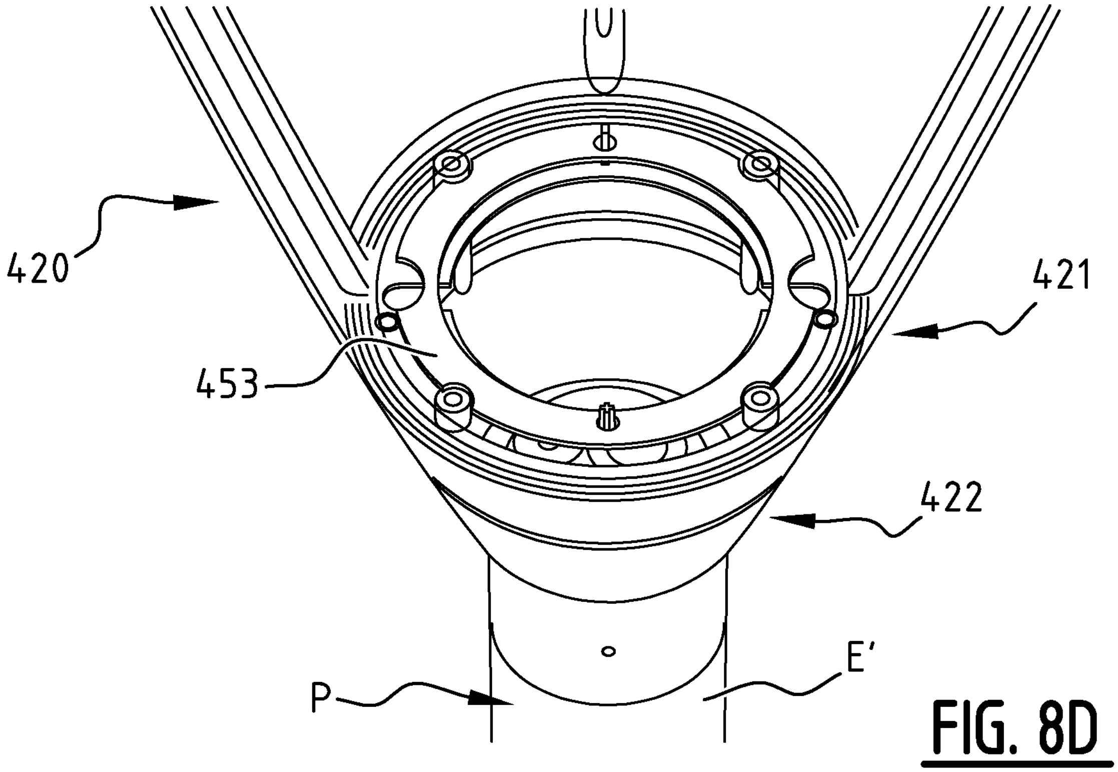

The protective casing 420 may correspond to the protective casing 420 of the embodiments of FIGS. 2A-2D. A shape of the protective casing 420 may correspond to any one of a substantially conical shape as illustrated in FIGS. 8A-8D, a substantially cylindrical shape, or a combination thereof. The protective casing 420 may be releasably attached to the base 200 by means of any one or more of the following elements: screws, locks, clamps, clips. The light source 310 may correspond to the light source 310 of the embodiments of FIGS. 1A-7B. As illustrated in FIGS. 8A-8C, the luminaire head assembly 1 may comprise a protection and connection assembly 410' comprising the protective casing 420 and a connection part 422 configured for connecting a lower end 421 of the protective casing 420 to a top end E' of a pole P'. If the base 200 corresponds to the body 200 of the embodiments of FIGS. 1A-7B, an upper edge 423 of the protective casing 420 may be supported on a lower side of the base 200, and surround the through-hole at the lower side of the base 200. In other embodiments, the base may carry the light source at a lower portion thereof, without having a though-hole. In other words the light source does not have to be provided on a support which is removable from the body.

Optionally a color filter (not shown) may be arranged between the light source 310 and the protective casing 420. For example the color filter may be a sheet or coating arranged above a transparent or translucent portion arranged over the light source 310 in a similar manner as transparent or translucent portion 510 shown in FIG. 1D. The transparent or translucent portion may be fixed to the base 200 using a ring or annular portion similar to annular portion 520 in FIG. 1D. Optionally, such ring or annular portion may then also be used to fix the diffusor body 430. The color filter is preferably arranged such that light with a predetermined color is emitted on the diffusor body 430.

Optionally, it is possible to use a translucent portion, e.g. made of sand-blasted glass, similar to portion 510 shown in FIG. 1D between the light source 310 and the protective casing 420. Such translucent portion may be used with or without filter. The translucent portion may be fixed to the base 200 using a ring or annular portion similar to annular portion 520 in FIG. 1D. Optionally, such ring or annular portion may then also be used to fix the diffusor body 430.

The diffusor body 430 may be releasably attached to the base 200. A shape of the diffusor body 430 may correspond to any one of a substantially conical shape as illustrated in FIGS. 8A-8C, a substantially cylindrical shape, or a combination thereof.

As illustrated in FIGS. 8B and 8C, the wire frame 440 comprises at least five wires, preferably at least eight wires, more preferably at least ten wires extending downwardly from the base 200. The wire frame 440 may comprise an annular portion (not shown) releasably attached to the base 200. The wires 441 of the wire frame 440 may be fixed to the annular portion and may converge at an end of the wire frame 440 opposite the base 200. The wire frame 440 may comprise metal, e.g. a coated metal. For example, the wire frame 400 may have a white or substantially white color. The wires may be relatively thin. For example, the wires may have a substantially cylindrical shape with a diameter of less than 1 cm.

As illustrated in FIGS. 8A and 8C, the ribbed frame 450 comprises at least four ribs extending downwardly from the base 200. In the embodiment of FIGS. 8A and 8C, the ribbed frame 450 may comprise a first annular portion (not shown) at an upper edge 423 of the protective casing 420 and a second annular portion 453 (see FIG. 8D and FIG. 2C) at a lower end 421 of the protective casing 420. The ribs 451 of the ribbed frame 450 may be releasably attached to the first annular portion 452 and to the second annular portion 453. In an embodiment, such as the embodiments of FIGS. 1A-7B, the base 200 may be a body which carries a photometric unit, said photometric unit comprising the light source 310 and an electronic assembly. In such embodiment, the ribs 451 of the ribbed frame 450 may be releasably attached to the photometric unit, or to a lower side of the body. The ribbed frame 450 may comprise plastic, preferably transparent or translucent plastic.

It is noted that, when the base is implemented as in the embodiment of FIGS. 2A-2D, the diffusor body 440, 450 may be connected, preferably in a removable manner, to the body 200 and/or to the photometric unit 300 and/or to the connection part 422.

Preferably, the protective casing 420 has an axial direction extending in a direction of the pole P. and the protective casing 420 has a first length (11) measured along the axial direction. The diffusor body 440, 450 has a second length (12) measured along the axial direction, said second length being at least 20%, preferably at least 30%, more preferably at least 50% of the first length. Typically, the first length (11) is at least 20 cm, preferably at least 30 cm, more preferably at least 40 cm.

Figure 8E:
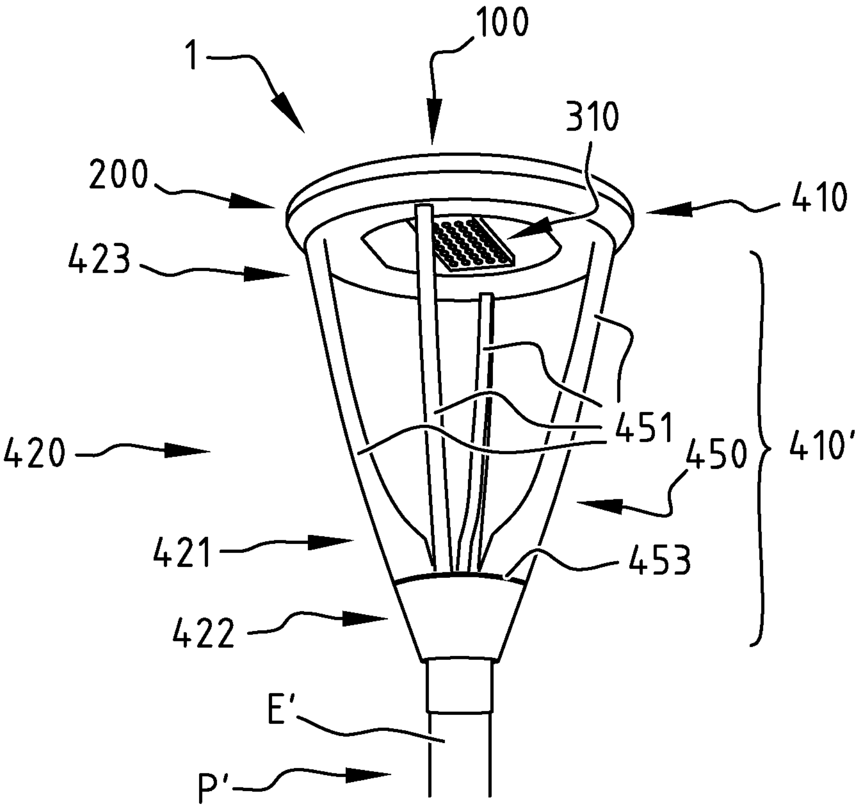
Figure 8F:
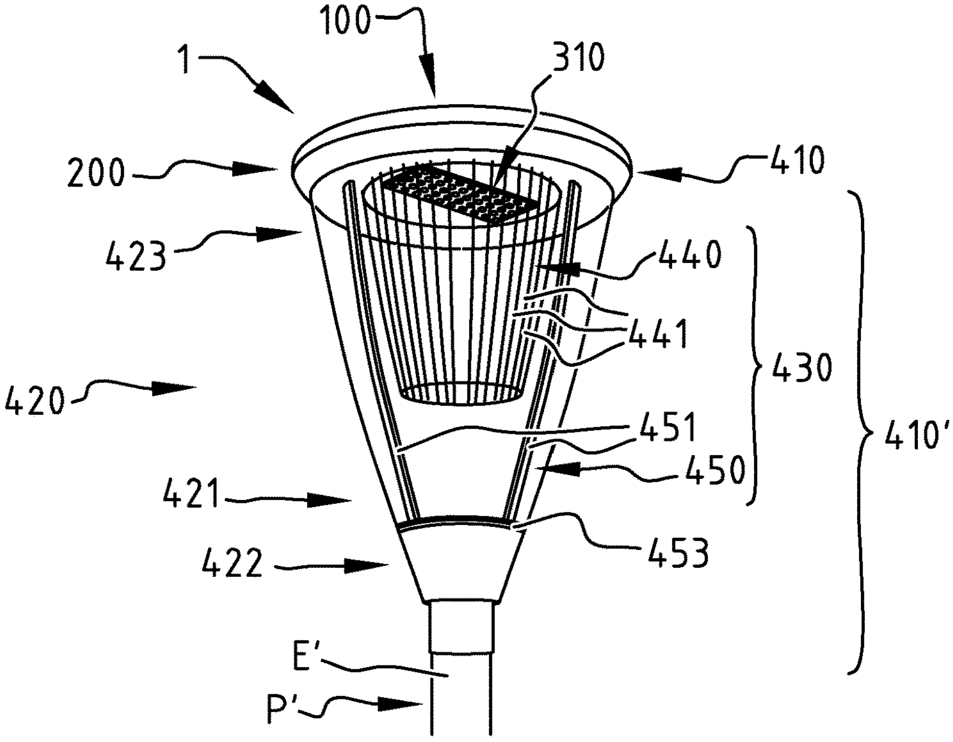

FIGS. 8E and 8F illustrate two detailed front views of the embodiment of FIGS. 8A-8D.

As illustrated in FIGS. 8E and 8F, the luminaire head assembly 1 comprises a base 200 comprising a light source 310, a protective casing 420 releasably attached to the base 200 and comprising a transparent or translucent portion, and a diffusor body 430 arranged in the protective casing 420. In the embodiment of FIG. 8E, the diffusor body 430 comprises a ribbed frame 450 with four pairs of ribs 451. In the embodiment of FIG. 8E, the diffusor body 430 comprises a wire frame 440 and a ribbed frame 450. The configuration and arrangement of the wire frame 440 and of the ribbed frame 450 discussed above with respect to FIGS. 8A-8D apply to the luminaire head assembly 1 of FIGS. 8E and 8F and will not be repeated here.

The ribs of ribbed frame 450 extend along the protective casing between an upper end and the lower end. The luminaire head further comprises one or more cables, wherein each cable extends from the base, between two ribs of the ribbed frame 450, to the connection part 422. The cable may further extend through a through-hole in the base. When the base corresponds with the body of FIG. 2B, the body 200 may be provided with one or more cable passages 295 through the body. The protective casing 420 may have an inner surface which is provided at an upper end with a plurality of threaded holes, as explained above in connection with FIGS. 2A-2D. Screws or bolts may then extend through the base 200 into the threaded holes. Two ribs 451 may also extend along the inner surface of the protective casing 420 from an upper end thereof, downwardly, next to the threaded holes, so as to at least partially hide the threaded holes. The ribs 451 may be relatively thin elongate slats shaped to follow the shape of the inner surface of the protective casing 420, and the slats may be oriented in a radial direction, perpendicular on the inner surface of the protective casing 420.

Figure 8G:
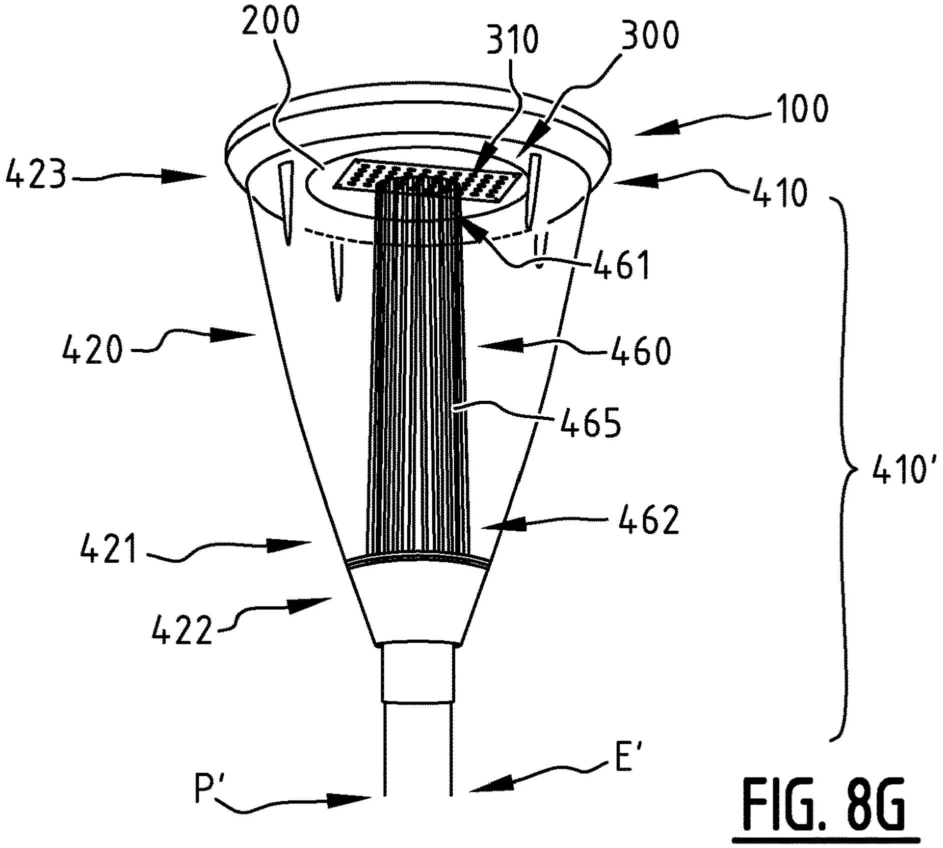
Figure 8H:
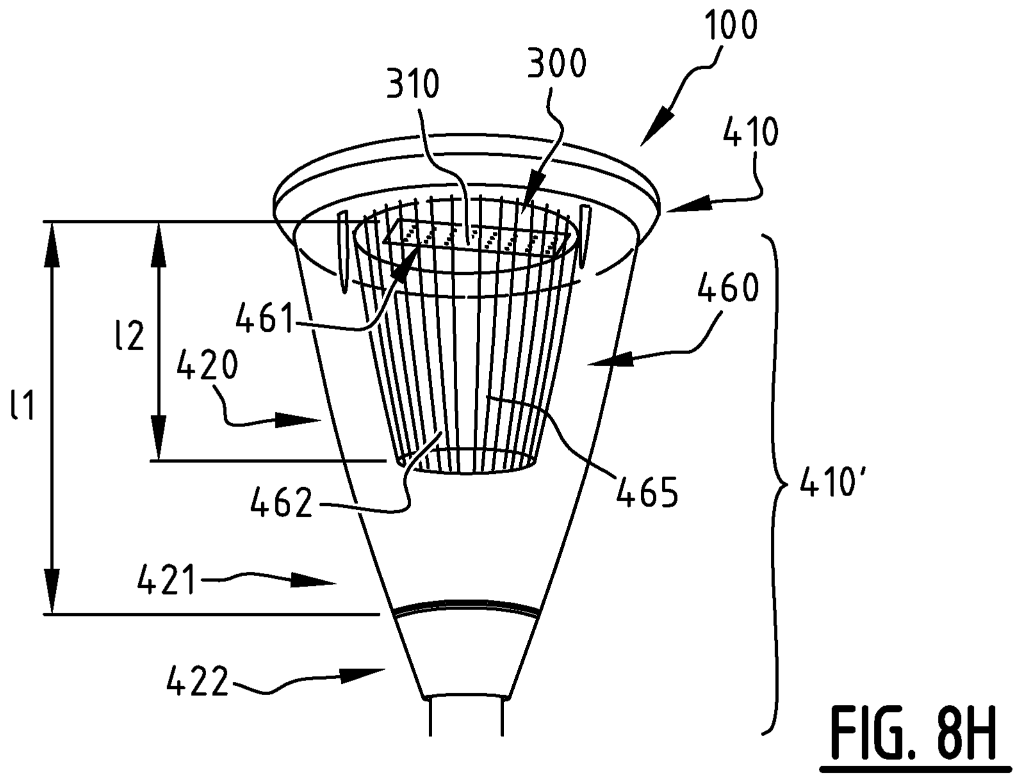
Figure 8I:
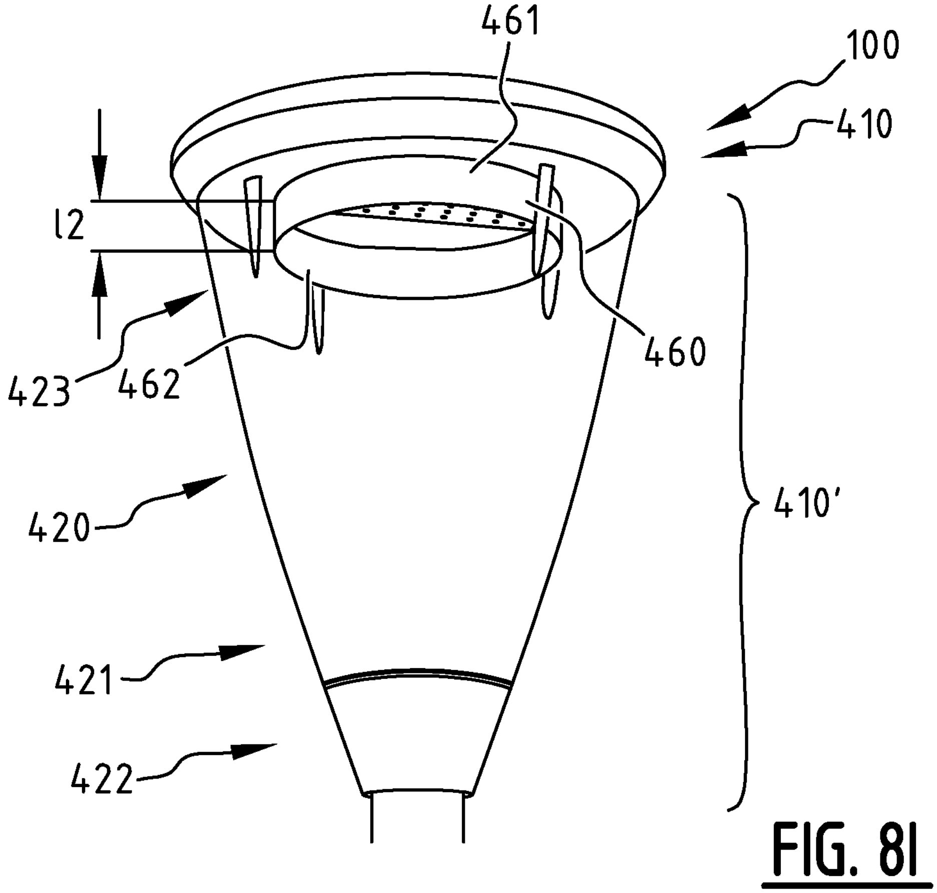

FIGS. 8G-8I illustrate three further variants with a diffusor body in the form of an inner casing 460. In the embodiment of FIG. 8G, the inner casing is a cylindrical tubular casing 460 between the base 200 and the connection part 422, and in particular between a PCB carrying LEDs 310 and the connection part 422. The PCB carrying the LEDs 310 may be mounted on a support which is part of a photometric unit 300, as described above for the other embodiments. The cylindrical tubular casing 460 may have a first open end 461 and a second open or closed end 462. A portion of the plurality of LEDs is arranged within the first open end 461, and a portion of the LEDs may be arranged outside of the open end 461 so that at least a portion of the light of the LEDs is emitted in the inner casing 460. The inner casing 460 may be a transparent or translucent casing. The inner casing 460 may be provided with a relief structure such as a plurality of grooves 465, preferably downwardly extending grooves. The inner casing 460 may be designed in different shapes and colors and may be made of various materials such as glass, plastic, etc. The grooves are shown to be lines, but any pattern of grooves is possible. For example, the grooves may form special shapes and/or text and/or a logo, or any other pattern desirable to see within the luminaire.

In the embodiment of FIG. 8H, the inner casing is a substantially conical tubular casing 460 extending from the base 200 downwardly. The PCB carrying the LEDs 310 may be mounted on a support which is part of a photometric unit 300, as described above for the other embodiments. The tubular casing 460 may have a first open end 461 and a second open or closed end 462. The PCB with the plurality of LEDs 310 is arranged within the first open end 461, so that the light of the plurality of LEDs 310 is emitted in the inner casing 460. The inner casing 460 may be a transparent or translucent casing. The inner casing 460 may be provided with a relief structure such as a plurality of grooves 465, preferably downwardly extending grooves. The inner casing 460 may be designed in different shapes and colors and may be made of various materials such as glass, plastic, etc. Again, the grooves are shown to be lines, but any pattern of grooves or other relief structures are possible. For example, the grooves may form special shapes and/or text and/or a logo, or any other pattern desirable to see within the luminaire.

In the embodiment of FIG. 8I, the inner casing is a substantially cylindrical tubular casing 460 extending from the base 200 downwardly. The PCB carrying the LEDs 310 may be mounted on a support which is part of a photometric unit 300, as described above for the other embodiments. The tubular casing 460 has a first open end 461 and a second open end 462. The PCB with the plurality of LEDs 310 is arranged within the first open end 461, so that the light of the plurality of LEDs 310 is emitted in the inner casing 460. The inner casing 460 may be a non-transparent casing, or a transparent or translucent casing. Optionally, the inner casing 460 may be provided with a relief structure. The inner casing 460 may be designed in different shapes and colors and may be made of various materials such as metal, glass, plastic, etc.

In an embodiment, the protective casing 420 has an axial direction extending in a direction of the pole P. and the protective casing 420 has a first length (11) measured along the axial direction. The inner casing 460 has a second length (12) measured along the axial direction. The lengths 11 and 12 are illustrated in FIGS. 8H and 8I. The second length 12 is preferably at least 5%, more preferably at least 10%, even more preferably at least 20%, or even at least 30% of the first length 11. Typically, the first length 11 is at least 20 cm, preferably at least 30 cm, more preferably at least 40 cm. In the embodiment of FIG. 8G, the first and the second length are substantially the same.

FIGS. 11A-D illustrate a more detailed embodiment of a luminaire head assembly with an upper cover 100, a body 200, a protective casing 420, an inner casing 460, and a skirt 410. Similar components have been indicated with the same reference numerals as in the previous embodiments and will not be described again. The inner casing 460 is an opaque casing with an anti-glare function having a relatively short length 12 measured along an axial direction, e.g. less than 40 mm. The inner casing 460 may be configured to absorb lateral light emissions by the light source 310. The inner casing 460 may have a black inner surface facing the light source 310 and an outer surface of a similar or different color.

Optionally a color filter 515 may be arranged between the light source 310 and the protective casing 420, and in particular between the light source 310 and a lower cover 500. The lower cover 500 may comprise a transparent or translucent portion 510 and an annular ring 520 and may be similar to the lower cover 500 of FIG. 1D. The lower cover 500 is attached to the body 200. Further, also the inner casing 460 may be fixed by the ring 520. To that end the inner casing may be provided with a peripheral flange 467 which is arranged between the annular ring and the transparent or translucent portion 510. Seals S1, S3 may be provided in a similar manner as described for FIG. 2D.

Figure 11A:
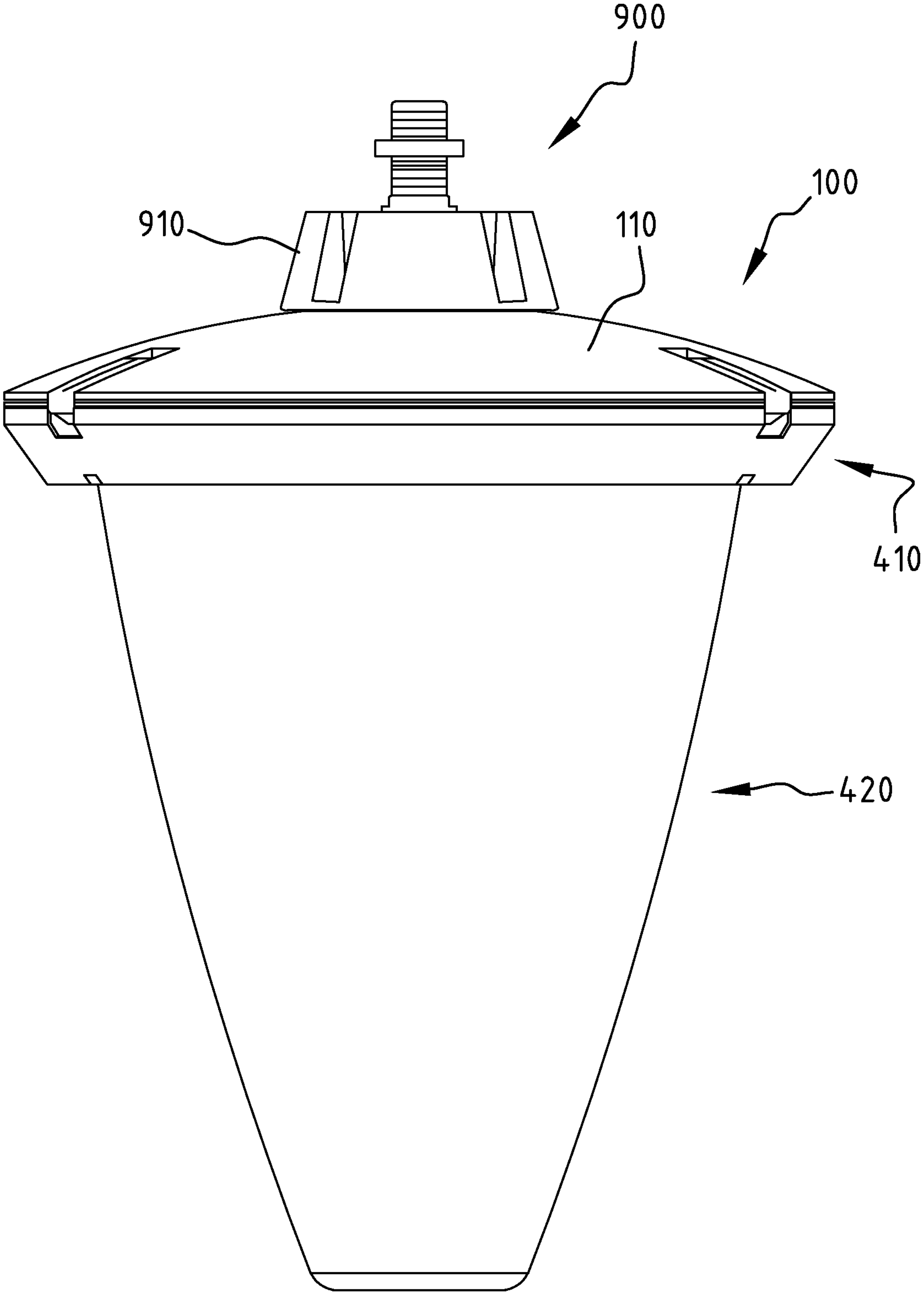
FIGS. 11A, 11B, 11C and 11D show a perspective view, a sectional view, a detailed sectional view of the connection between body and skirt, and a detailed sectional view of the mounting of the inner casing for another exemplary embodiment.
Figure 11B:
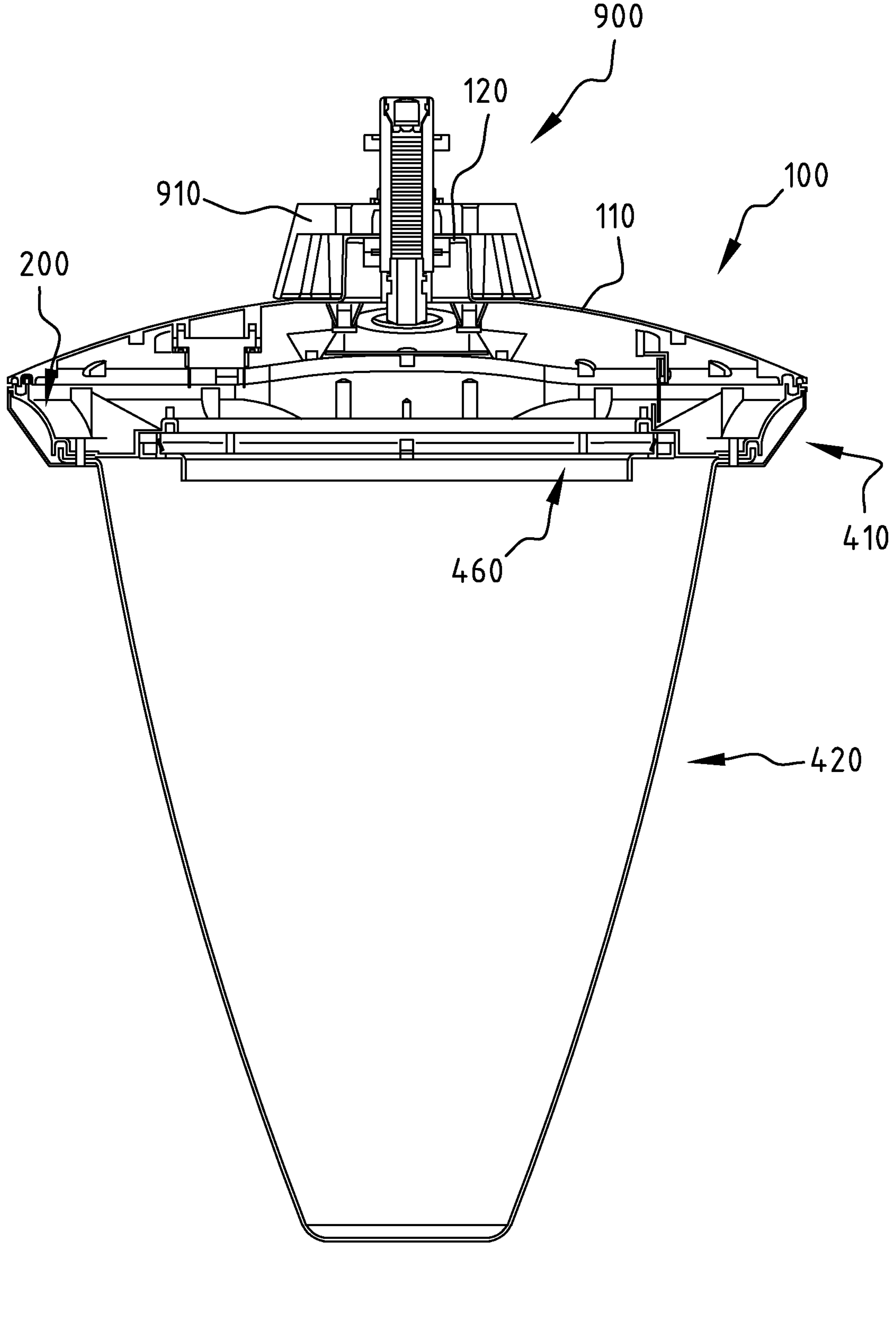
Figure 11C:
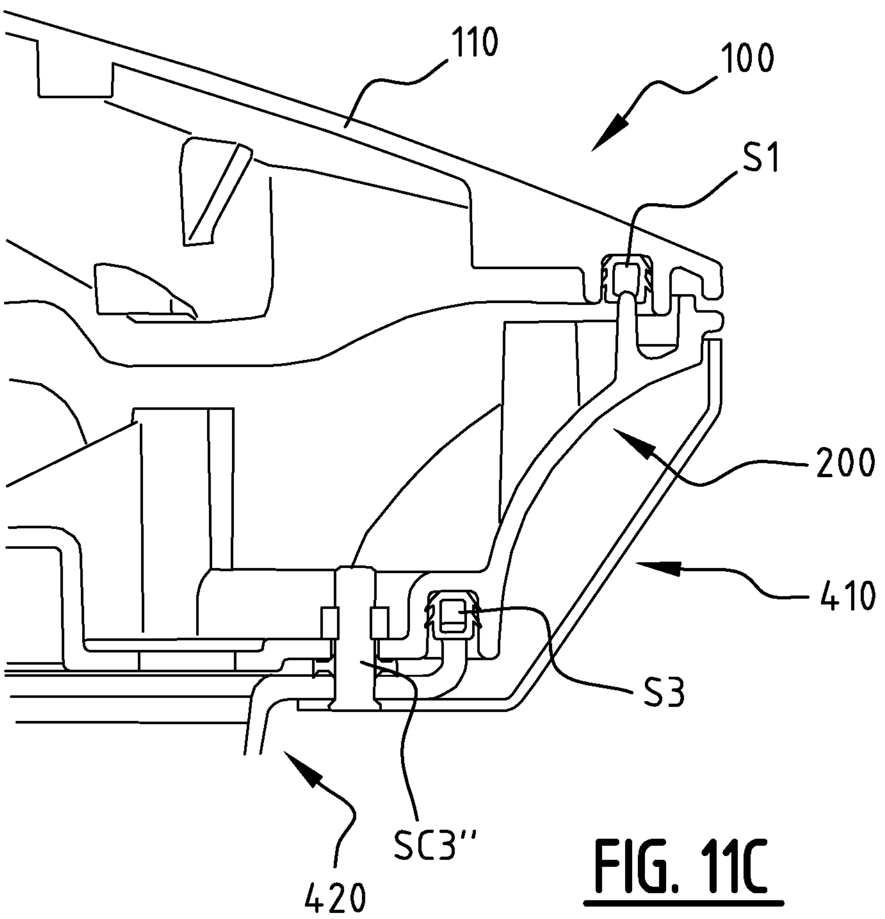
Figure 11D:
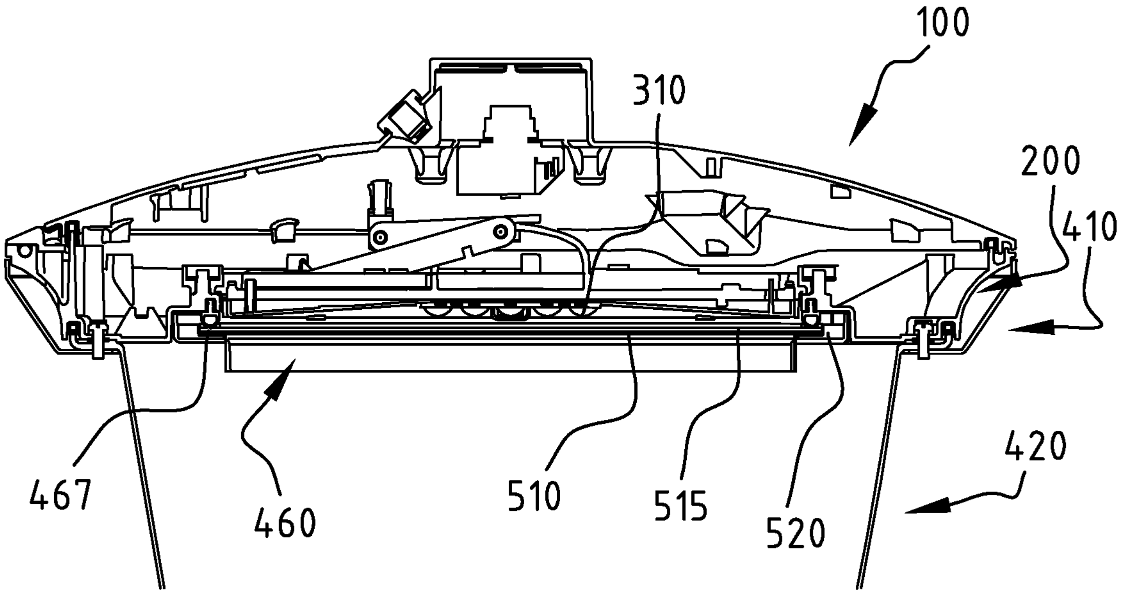

As shown in FIGS. 11A and 11B a central portion of the upper cover 100 may be provided with an outwardly protruding portion 120 on an upper surface 110 thereof, and the outwardly protruding portion 120 may be used for fixing a connection means 900 to the upper cover 100. The connection means 900 is configured for connecting the upper cover 100 to a bracket extending upwardly from the upper cover, e.g. a bracket as illustrated in FIG. 9F. The fixation means 900 may comprise a fixation part 910 arranged around the outwardly protruding portion 120. Thus the outwardly protruding portion 120 may be used in some embodiments for mounting a socket and in other embodiments for mounting a connection means for connecting a bracket.

The protective casing 420 and the skirt 410 may be releasably attached to the body 200 by means of bolts SC3", extending through a peripheral flange of the protective casing 420 and through an inner flange of the skirt 410.

Figure 12:
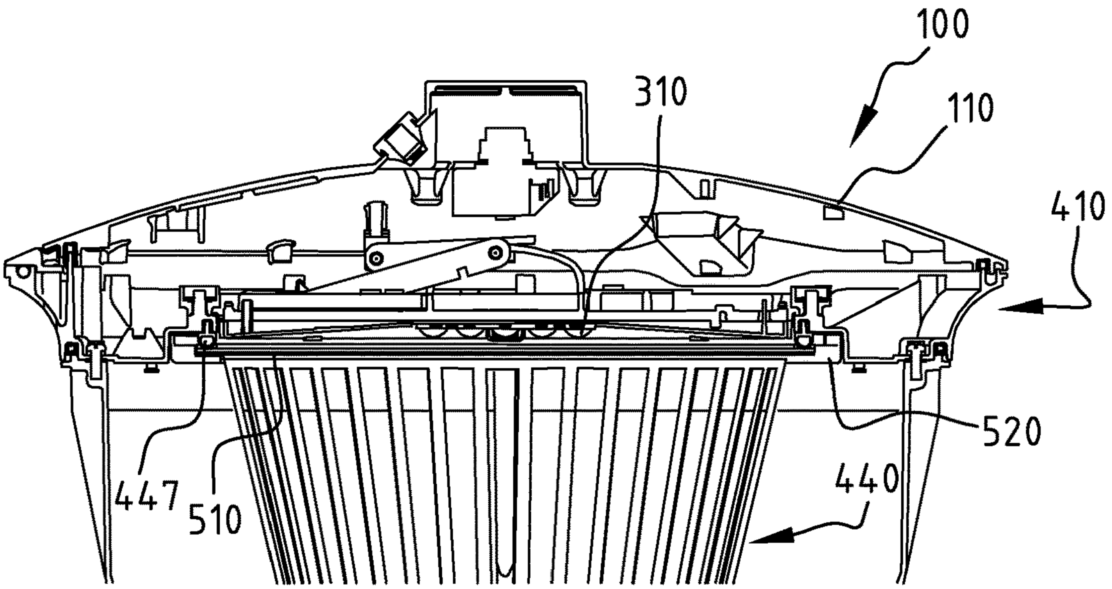
FIG. 12 is a partial sectional view of a further embodiment with a wire frame.

FIG. 12 illustrates a more detailed embodiment of a luminaire head assembly with an upper cover 100, a body 200, a protective casing 420, a wire frame 440, and a skirt 410. Similar components have been indicated with the same reference numerals as in the previous embodiments and will not be described again. Optionally a color filter 515 may be arranged between the light source 310 and the protective casing 420, and in particular between the light source 310 and a lower cover 500. The lower cover 500 may comprise a transparent or translucent portion 510 and an annular ring 520 and may be similar to the lower cover 500 of FIG. 1D. The lower cover 500 is attached to the body 200. Further, also the wire frame 440 may be fixed by the ring 520. To that end the inner casing may be provided with a peripheral flange 447 which is arranged between the annular ring 520 and the transparent or translucent portion 510.

Figure 13:
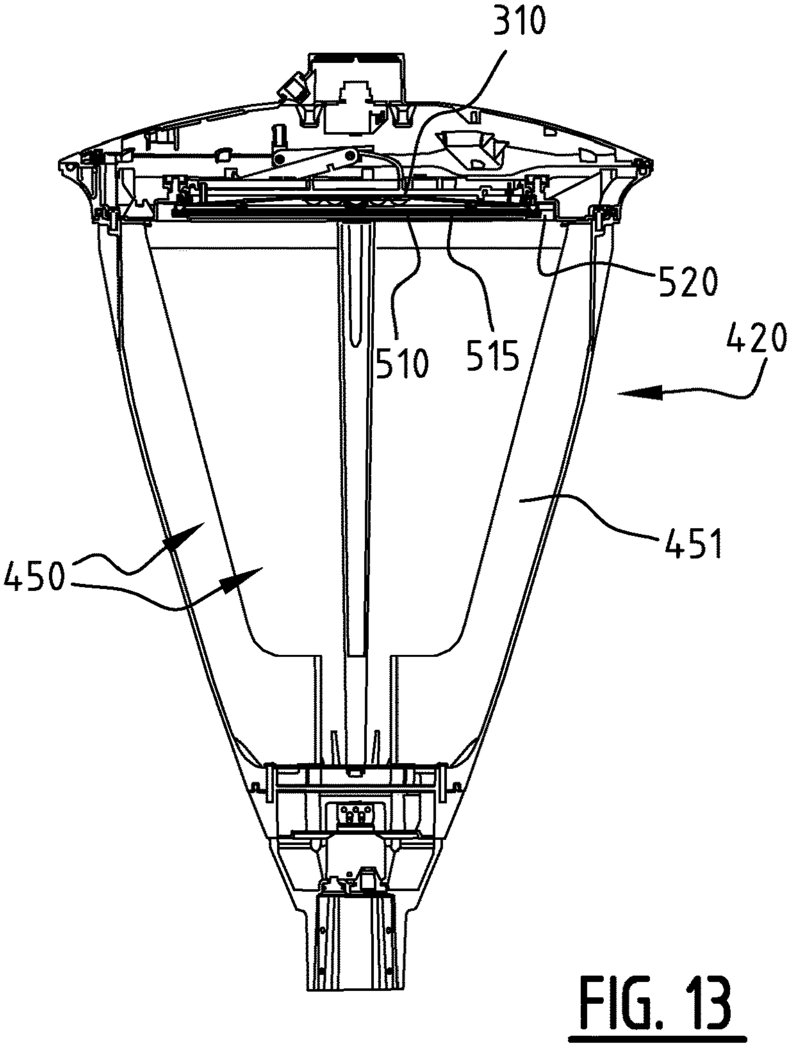
FIG. 13 is a sectional view of a further embodiment with a ribbed frame.

FIG. 13 illustrates a more detailed embodiment of a luminaire head assembly with an upper cover 100, a body 200, a protective casing 420, a ribbed frame 450 with ribs 451, and a skirt 410. Similar components have been indicated with the same reference numerals as in the previous embodiments and will not be described again. Optionally a color filter 515 may be arranged between the light source 310 and the protective casing 420, and in particular between the light source 310 and a lower cover 500. The lower cover S00 may comprise a transparent or translucent portion 510 and an annular ring 520 and may be similar to the lower cover 500 of FIG. 1D. FIGS. 9A-9F respectively illustrate three exemplary embodiments of a luminaire head assembly and several exemplary embodiments of a luminaire comprising a luminaire head assembly.

Figure 9A:
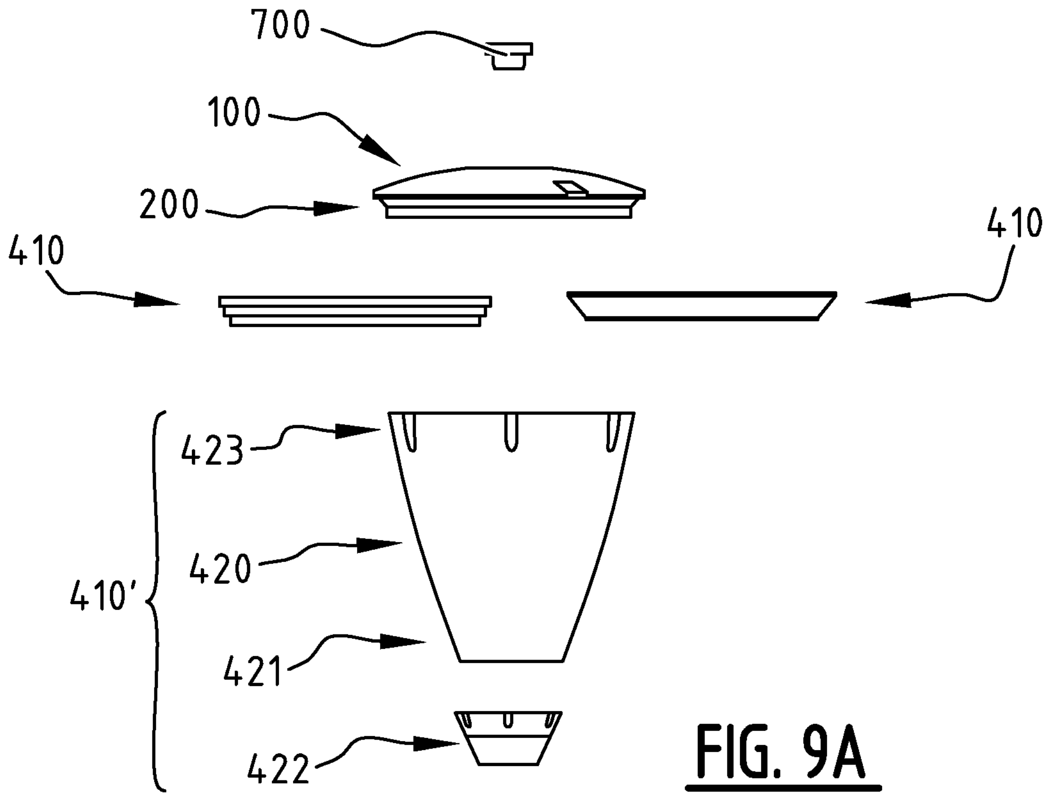
FIGS. 9A-9F respectively illustrate three exemplary embodiments of a luminaire head assembly and several exemplary embodiments of a luminaire comprising a luminaire head assembly.
Figure 9B:
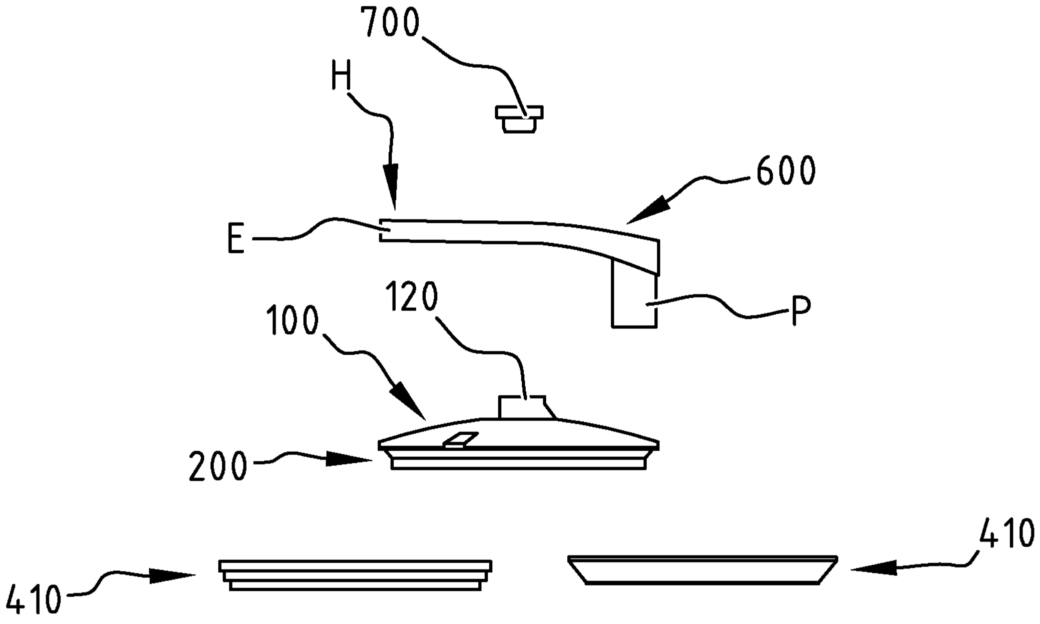
Figure 9C:
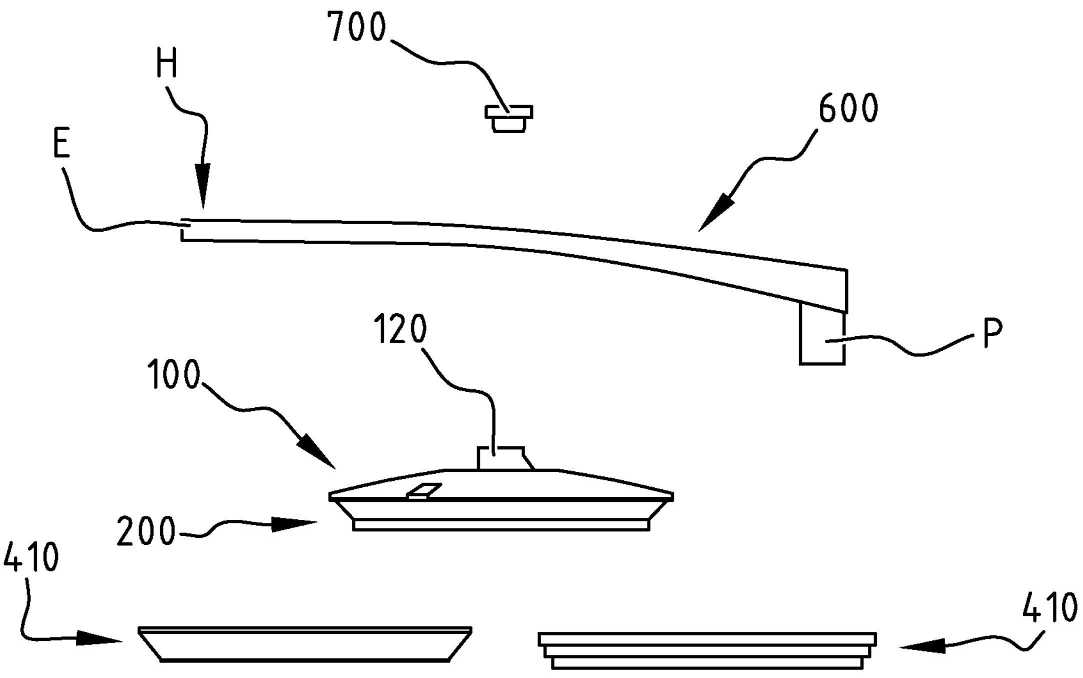
Figure 9D:
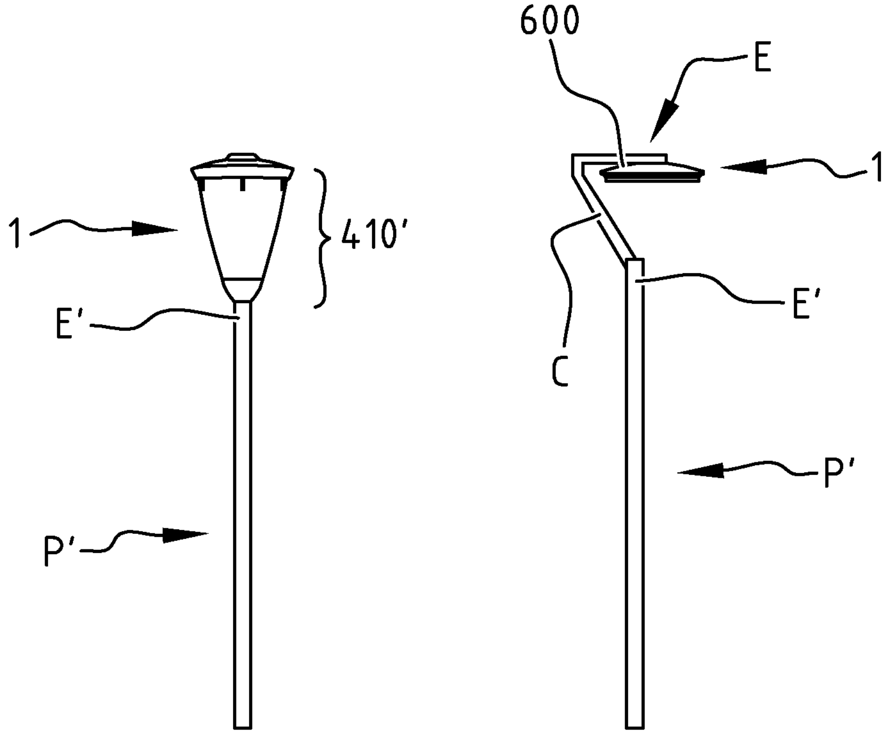

FIGS. 9A and 9D illustrate a luminaire head assembly according to the post-top configuration. The luminaire head assembly comprises a body 200 provided with a through-hole (not shown) between an upper side and a lower side, an upper cover 100 releasably attached to the upper side of the body 200, and a photometric unit (not shown) releasably attached to the body 200, preferably in a tool-less manner. The photometric unit may comprise a light source at a lower portion thereof and an electronic assembly at an upper portion thereof. The luminaire head assembly may further comprise a skirt 410 releasably attached to the body 200, supported by a first peripheral area of the body 200, and at least partially surrounding the body 200. Two shapes of the skirt 410 are shown: a substantially conical shape and a stepped shape.

As illustrated in the left part of FIG. 9D, the luminaire head assembly may further comprise a protection and connection assembly 410' comprising a protective casing 420 and a connection part 422 configured for connecting a lower end 421 of the protective casing 420 to a pole P'. An upper edge 423 of the protective casing 420 may be supported on the lower side of the body 200, within the first peripheral area, and surrounding the through-hole at the lower side of the body 200. The protective casing 420 may comprise a transparent or translucent portion. Hence, the embodiment of FIG. 9A may correspond to the embodiment of FIGS. 2A-2D.

Alternatively, as illustrated in the right part of FIG. 9D, the luminaire head assembly 1 may further comprise a bracket 600 configured to fix the upper cover 100 to a pole P'. An end E of the bracket 600 may be connected to the upper cover 100. At an end opposite the end E, the bracket 600 may be fixed to a pole connector C as described in FIGS. 7A and 7B. Hence, the embodiment of FIG. 9A may also correspond to the embodiment of FIGS. 7A and 7B.

Figure 9E:
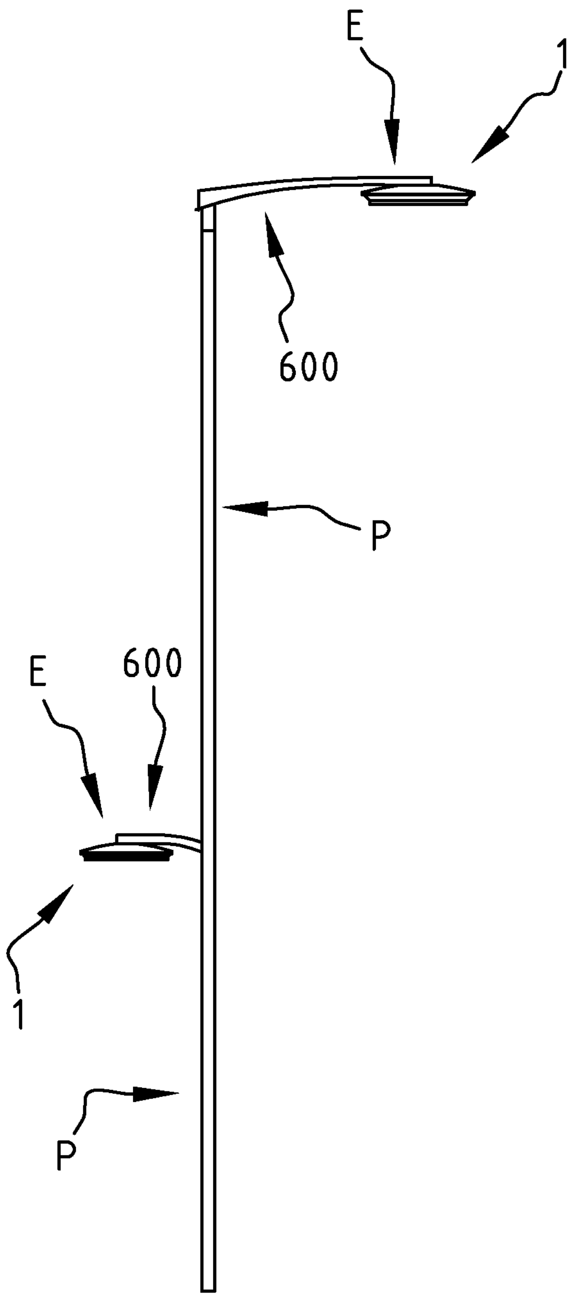
Figure 9F:
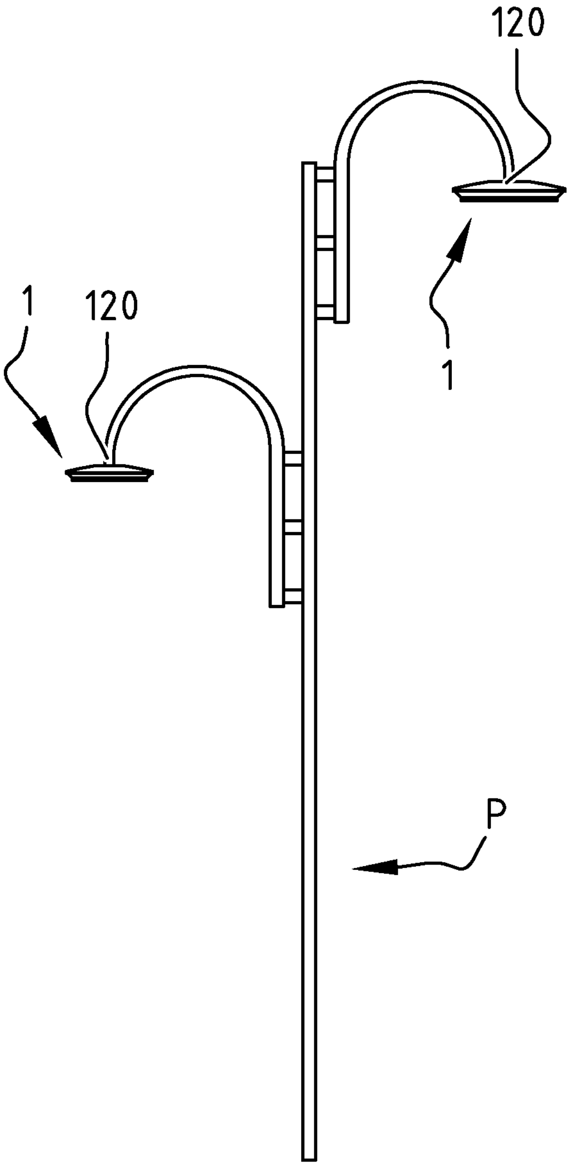

FIGS. 9B, 9C, and 9E illustrate a luminaire head assembly 1 according to the side-entry configuration. The luminaire head assembly comprises a body 200 provided with a through-hole (not shown) between an upper side and a lower side, an upper cover 100 releasably attached to the upper side of the body 200, and a photometric unit (not shown) releasably attached to the body 200, preferably in a tool-less manner. The photometric unit may comprise a light source at a lower portion thereof and an electronic assembly at an upper portion thereof. The luminaire head assembly may further comprise a skirt 410 releasably attached to the body 200, supported by a first peripheral area of the body 200, and at least partially surrounding the body 200. Two shapes of the skirt 410 are shown: a substantially conical shape and a stepped shape.

As illustrated in FIGS. 9B, 9C, and 9E, the luminaire head assembly 1 further comprises a bracket 600 releasably attached to the upper cover 100 and configured to fix the upper cover 100 to a pole P. The bracket 600 is provided with a through-hole H at an end E thereof. A socket assembly 700 may extend at least partially in the through-hole H. The upper cover 100 is provided with an outwardly protruding portion 120 extending at least partially in the through-hole H and configured to receive the socket assembly 700. At an end opposite the end E, the bracket 600 is fixed to the pole P. Hence, the embodiment of FIG. 9A corresponds to the embodiment of FIGS. 1A-1D.

As illustrated in FIGS. 9B and 9C, the luminaire head assembly may exist in two different sizes: a smaller size as shown in FIG. 9B, and a larger size as shown in FIG. 9C. Apart from their dimensions, the design, configuration, and arrangement of the two sizes of luminaire head assembly may be equal. Another difference between both sizes may reside in the length of the bracket 600, which may be longer in the larger size than in the smaller size, as illustrated in FIGS. 9B and 9C. In FIG. 9E, the smaller size of luminaire head assembly 1 may be fixed to the pole P at a first height using a smaller bracket 600, and the larger size of luminaire head assembly 1 may be fixed to the pole P at a second height using a larger bracket 600. Preferably, the first height is smaller than the second height.

As illustrated in FIG. 9F, the luminaire head assembly 1 of FIGS. 9B and 9C may be fixed to another type of pole P. Here, the bracket 600 may not be used in the luminaire head assembly 1. Instead, the outwardly protruding portion 120 may be configured to fix the luminaire head assembly 1 to said other type of pole P. The pole P may comprise one or more curved pole portions, e.g. two curved pole portions as illustrated in FIG. 9F. An end of the one or more curved pole portions opposite the pole P may be fixed to the outwardly protruding portion 120. In this case, a socket assembly 700 may be received on a top surface of the upper cover 100. Hence, the embodiment of FIG. 9F corresponds to the so-called "suspended" configuration of the luminaire head assembly 1.

As in FIG. 9E, in FIG. 9F the smaller size of luminaire head assembly 1 may be fixed to the pole P at a first height, and the larger size of luminaire head assembly 1 may be fixed to the pole P at a second height. Preferably, the first height is smaller than the second height.

Hence, as illustrated in FIGS. 9A-9E, there is provided a set of at least a first luminaire head (see FIGS. 9B, 9C, and 9E) and a second luminaire head (see FIGS. 9A and 9D).

The first luminaire head comprises a first body 200 provided with a through-hole between an upper side and a lower side, a first upper cover 100 covering the upper side of the first body 200, and a first photometric unit with a first support which is releasably attached to the first body 200. The first photometric unit is at least partially extending in the through-hole and comprises a first electronic assembly at an upper portion thereof and a first light source at a lower portion thereof.

The first luminaire head further comprises a first skirt 410 or a second skirt 410 releasably attached to the first body 200 and at least partially surrounding the first body 200. The first skirt 410 may be different from the second skirt 410. In particular, a shape of the first skirt 410 (e.g. a stepped shape) may be different from a shape of the second skirt 410 (e.g. a conical shape). The first luminaire head further comprises a bracket 600 releasably attached to the first upper cover 100.

The second luminaire head comprises a second body 200 identical to the first body 200, a second upper cover 100 covering the upper side of the second body 200, and a second photometric unit with a second support identical to the first support which is releasably attached to the second body 200. The second photometric unit is at least partially extending in the through-hole of the second body 200 and comprises a second electronic assembly at an upper portion thereof and a second light source at a lower portion thereof. The second electronic assembly may be different from the first electronic assembly, or may be the same. The second light source may be different from the first light source, or may be the same.

The second luminaire head further comprises a protection and connection assembly 410' releasably attached to the lower side of the second body 200. The protection and connection assembly 410' comprises a protective casing 420 and a connection part 422 configured for connecting a lower end 421 of the protective casing 420 to a pole P'. Optionally, the second luminaire head may further comprise a first skirt 410 or a second skirt 410 releasably attached to the second body 200 and at least partially surrounding the second body 200. The first skirt 410 may be different from the second skirt 410. In particular, a shape of the first skirt 410 (e.g. a stepped shape) may be different from a shape of the second skirt 410 (e.g. a conical shape).

Figure 10A:
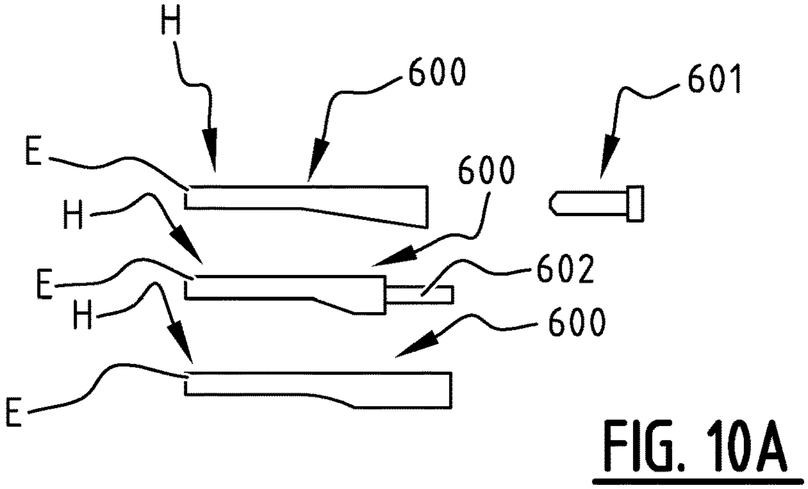
FIGS. 10A-10C respectively illustrate three exemplary embodiments of a bracket of a luminaire head assembly, two exemplary embodiments of a luminaire head assembly, and several exemplary embodiments of a luminaire comprising a luminaire head assembly.
Figure 10B:
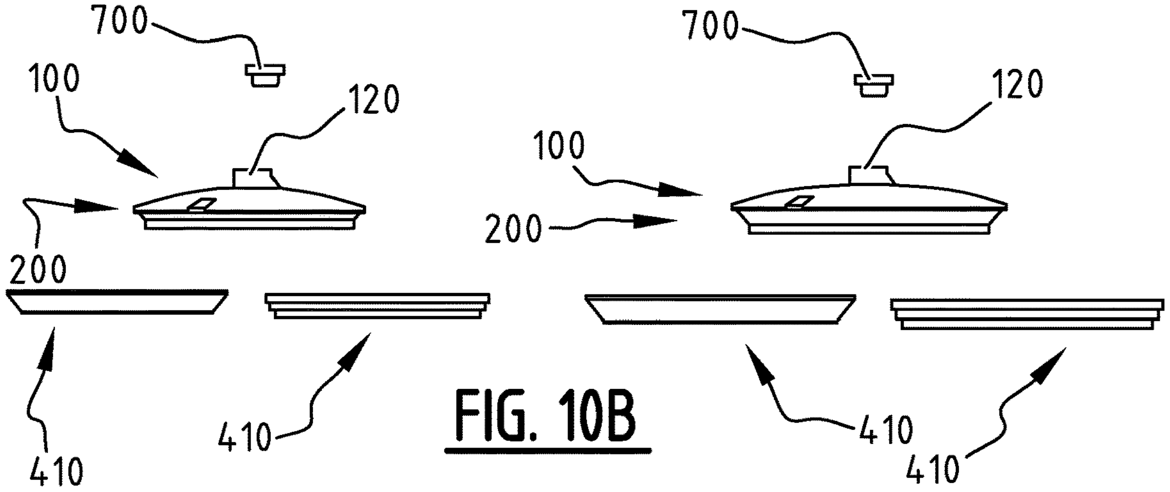
Figure 10C:
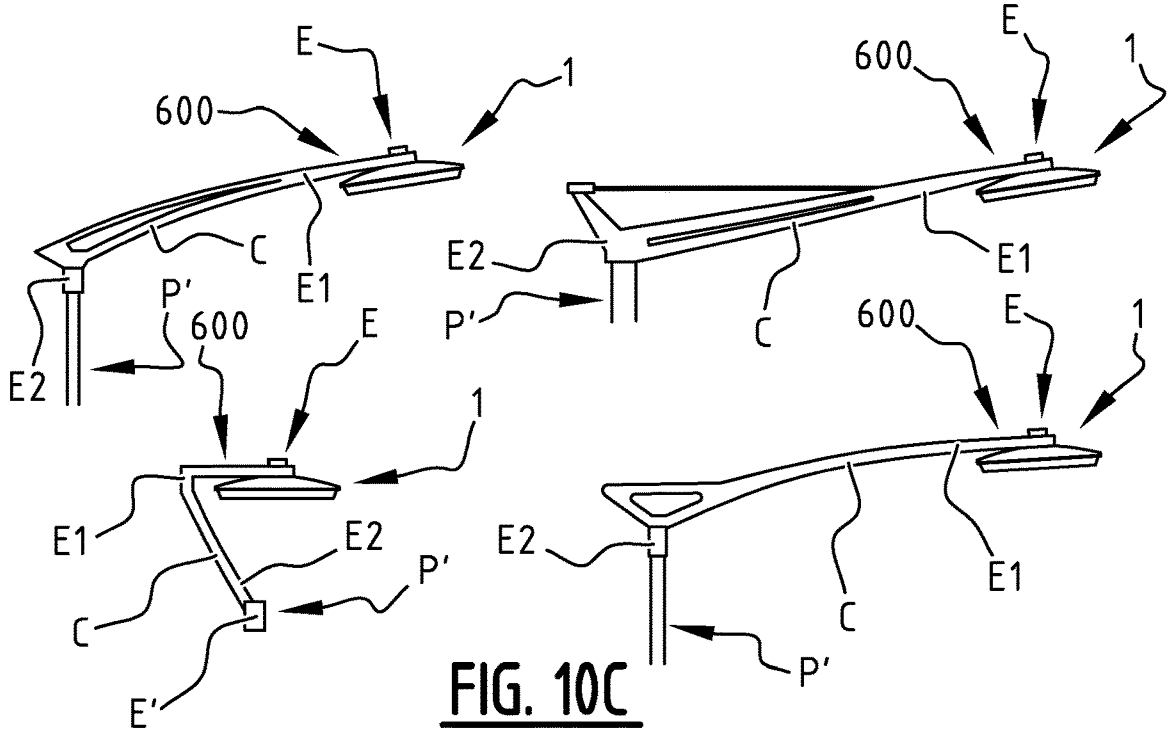

FIGS. 10A-10C respectively illustrate three exemplary embodiments of a bracket of a luminaire head assembly, two exemplary embodiments of a luminaire head assembly, and several exemplary embodiments of a luminaire comprising a luminaire head assembly.

As illustrated in FIG. 10C, the embodiments of FIGS. 10A-10C correspond to the side-entry configuration of the luminaire head assembly. The embodiments illustrated in FIG. 10B correspond to the embodiment of FIGS. 9B and 9C. Hence, the configuration and arrangement of the luminaire head assembly discussed above with respect to FIGS. 9B and 9C apply to the luminaire head assembly of FIG. 10B and will not be repeated here.

As illustrated in FIG. 10A, the luminaire head assembly comprises a bracket 600 releasably attached to the upper cover 100 and configured to fix the upper cover 100 to a pole (see element P' of FIG. 10C). The bracket 600 is provided with a through-hole H at an end E thereof. A socket assembly 700 may extend at least partially in the through-hole H. At an end opposite the end E, the bracket 600 is fixed to the pole. As illustrated in FIG. 10A, three different types of bracket 600 may exist: in the first type (top part of FIG. 10A), the bracket 600 may be provided with a recess at the end opposite said end E, and may comprise a separate protruding element 601, said recess cooperating with said protruding element 601. The protruding element 601 may be configured to be inserted in the recess and secured to the recess. In the second type (center part of FIG. 10A), the bracket 600 may be provided with a protruding portion 602 at the end opposite said end E. In the third type (bottom part of FIG. 10A), the bracket 600 may be provided with a recess at the end opposite said end E.

As illustrated in FIG. 10C, at the end opposite said end E the bracket 600 is fixed to a pole connector C. The pole connector has a first end E1 where the bracket 600 is fixed to the pole connector C, and a second end E2 opposite said first end E1. The pole connector C is fixed to a top end E' of the pole P' at said second end E2. Hence, the pole connector C is configured to use the luminaire head assembly 1 in the side-entry configuration together with a vertical pole P', i.e. with a pole P' suitable for the post-top configuration, in a similar manner as in the embodiment of FIGS. 7A and 7B. The pole connector C may have different shapes and/or sizes, and may cooperate with the two different sizes of luminaire head assembly 1 and/or with the different types of bracket 600.

In an example, as illustrated in the left part of FIG. 10C, the pole connector C may cooperate with the smaller size of luminaire head assembly 1 and with the second type of bracket 600. In this example, the pole connector C may be provided with a recess at the first end E1 in which the protruding portion 602 of the bracket 600 is inserted and secured to.

In another example, as illustrated in the top part of FIG. 10C, the pole connector C may cooperate with the larger size of luminaire head assembly 1 and with the first type of bracket 600. In this example, the protruding element 601 is fixed to the pole connector C at the first end E1.

In yet another example, as illustrated in the right part of FIG. 10C, the pole connector C may cooperate with the smaller size of luminaire head assembly 1 and with the third type of bracket 600. In this example, the pole connector C may be provided with a protruding portion at the first end E1 configured to be inserted in the recess and secured to the recess.

In yet another example, as illustrated in the bottom part of FIG. 10C, the pole connector C may cooperate with the smaller size of luminaire head assembly 1 and with the first type of bracket 600. This embodiment corresponds to the embodiment of FIGS. 7A and 7B.

For the embodiments illustrated in the figures, the assembled luminaire head assembly has an overall round shape, i.e. any one or more of the components of the luminaire head assembly such as the body, the upper cover, the lower cover, the protective casing, the diffusor body, the skirt, may have a round shape. In other embodiments, the luminaire head assembly may have an overall polygonal shape, such as a square or rectangular shape. Thus, any one or more of the components of the luminaire head assembly such as the body, the upper cover, the lower cover, the protective casing, the diffusor body, the skirt, may have an overall polygonal shape. Also mixed shapes are possible. For example the upper cover may be round whilst the protective casing is polygonal or vice versa.

Whilst the principles of the invention have been set out above in connection with specific embodiments, it is to be understood that this description is merely made by way of example and not as a limitation of the scope of protection which is determined by the appended claims.

The invention claimed is:

1. A luminaire head assembly comprising:

a housing provided with a socket assembly;

a light source arranged in said housing; and a bracket releasably attached to said housing, said bracket being configured to fix the housing to a pole, and said bracket having a first end for connection to a pole or pole connector and a second end attached to the housing, wherein the bracket is provided with a through-hole at said second end between two opposite sides thereof, and wherein the socket assembly extends at least partially in said through-hole.

2. The luminaire head assembly according to claim 1, wherein, seen in the mounted position of the luminaire head assembly, the housing has a top surface, and wherein the socket assembly is provided at said top surface.

3. The luminaire head assembly according to claim 2, wherein the socket assembly is arranged substantially at a center of the top surface.

4. The luminaire head assembly according to claim 2, wherein the second end of the bracket is releasably attached to a portion of the top surface, such that a lower surface of the bracket faces the top surface.

5. The luminaire head assembly according to claim 1, wherein the second end of the bracket is provided with channels configured to receive fastening means for fixing the bracket to the housing.

6. The luminaire head assembly according to claim 1, wherein the housing is provided with an outwardly protruding portion extending at least partially in the through-hole and configured to receive the socket assembly.

7. The luminaire head assembly according to claim 1, wherein a shape of the through-hole corresponds to a substantially cylindrical shape.

8. The luminaire head assembly according to claim 6, wherein a shape of the through-hole corresponds to a substantially cylindrical shape, and wherein a diameter of the outwardly protruding portion is between 80% and 95% of a diameter of the through-hole.

9. The luminaire head assembly according to claim 1, wherein the housing is provided with a hole, said hole being configured to pass a cable from the bracket to an inner space of the housing.

10. The luminaire head assembly according to claim 6, wherein the housing is provided with a hole, said hole being configured to pass a cable from the bracket to an inner space of the housing, wherein the outwardly protruding portion is provided with said hole at a lateral surface thereof.

11. The luminaire head assembly according to claim 1, wherein the housing comprises an upper cover and a body which carries a photometric unit, said photometric unit comprising said light source at a lower portion thereof and an electronic assembly at an upper portion thereof, and wherein the second end of the bracket is attached to the upper cover.

12. The luminaire head assembly according to claim 11, wherein the body is provided with a through-hole between an upper side and a lower side, and wherein the photometric unit is releasably attached to said body and at least partially extending in said through-hole.

13. The luminaire head assembly according to claim 11, further comprising a hinge between said upper cover and said body, and an attachment means configured for releasably attaching said body to said upper cover.

14. The luminaire head assembly according to claim 11, wherein the electronic assembly comprises any one or more of the following: a light source driving means, a light source dimming means, surge protection circuitry, electrostatic discharge protection circuitry, connecting means, a fuse, and control and/or driving circuitry for controlling and/or driving a component of the luminaire head assembly.

15. The luminaire head assembly according to claim 11, wherein the socket assembly is connected directly or indirectly to the electronic assembly, or wherein the body is configured to receive at least one of: a socket, an antenna, or a sensor.

16. The luminaire head assembly according to claim 11, further comprising a skirt releasably attached to said body and at least partially surrounding said body.

17. The luminaire head assembly according to claim 11, further comprising a diffusor casing releasably attached to the body, said diffusor casing comprising a transparent or translucent portion.

18. The luminaire head assembly according to claim 1, wherein the socket assembly is configured to receive an external module.

19. The luminaire head assembly according to claim 1, wherein the bracket extends in a longitudinal direction between the first and the second end, and wherein the through-hole has an axis which is at an angle with respect to the longitudinal direction of the bracket.

20. The luminaire head assembly according to claim 1, wherein, seen in the mounted position, the bracket has a lower side and an upper side, wherein the through-hole extends between the lower side and the upper side.

* * * * *